United States Patent
Kim et al.

(10) Patent No.: US 11,169,705 B2
(45) Date of Patent: *Nov. 9, 2021

(54) CONFIGURATION OF APPLICATION EXECUTION SPACES AND SUB-SPACES FOR SHARING DATA ON A MOBILE TOUCH SCREEN DEVICE

(71) Applicant: Samsung Electronics Co., Ltd., Suwon-si (KR)

(72) Inventors: Tae-Soo Kim, Suwon-si (KR); Kang-Tae Kim, Yongin-si (KR); Doo-Hwan Kim, Suwon-si (KR); Chul-Joo Kim, Suwon-si (KR); Seong Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/113,417

(22) Filed: Dec. 7, 2020

(65) Prior Publication Data
US 2021/0089207 A1 Mar. 25, 2021

Related U.S. Application Data

(63) Continuation of application No. 16/983,522, filed on Aug. 3, 2020, now Pat. No. 10,884,620, which is a
(Continued)

(30) Foreign Application Priority Data

Dec. 31, 2012 (KR) .................. 10-2012-0158391
Dec. 31, 2012 (KR) .................. 10-2012-0158413
Dec. 31, 2012 (KR) .................. 10-2012-0158422

(51) Int. Cl.
*G06F 3/0488* (2013.01)
*G06F 16/16* (2019.01)
(Continued)

(52) U.S. Cl.
CPC ........ *G06F 3/04886* (2013.01); *G06F 3/0481* (2013.01); *G06F 3/0483* (2013.01);
(Continued)

(58) Field of Classification Search
CPC .... G06F 3/0481; G06F 3/0483; G06F 3/0486; G06F 3/04883; G06F 3/04886; G06F 9/451; G06F 16/168; G06F 2203/04803
See application file for complete search history.

(56) References Cited

U.S. PATENT DOCUMENTS 5,072,412 A   12/1991   Henderson, Jr. et al.
5,652,876 A    7/1997   Ashe et al.
(Continued)

FOREIGN PATENT DOCUMENTS

CN   1344989 A    4/2002
CN   1458576 A   11/2003
(Continued)

OTHER PUBLICATIONS

Alexander Kulik et al. "The Hold and Move Gesture for Multi Touch Interfaces", Proc. 14th International Conference on Human-Computer Interaction with Mobile Devices and Services—MobileHCI '12, Sep. 21, 2012, pp. 49-57, XP055062355, San Francisco, USA.
(Continued)

*Primary Examiner* — Eric J. Bycer
(74) *Attorney, Agent, or Firm* — Jefferson IP Law, LLP

(57) ABSTRACT

A method of controlling a display device including a touch screen is provided. The method includes setting an application execution space having one or more sub spaces in which windows executing applications are arranged, arranging windows corresponding to one or more applications which are being executed in the sub spaces of the set application execution space, displaying a first sub space corresponding
(Continued)

to one of the one or more sub spaces on the touch screen, receiving a data sharing command for sharing data included in a first window arranged in the first sub space, and sharing the data to be shared by a second window arranged in a second sub space corresponding to one of the one or more sub spaces based on the data sharing command.

14 Claims, 78 Drawing Sheets

Related U.S. Application Data continuation of application No. 16/746,273, filed on Jan. 17, 2020, now Pat. No. 10,776,005, which is a continuation of application No. 16/357,937, filed on Mar. 19, 2019, now Pat. No. 10,540,090, which is a continuation of application No. 14/090,389, filed on Nov. 26, 2013, now Pat. No. 10,282,088.

(60) Provisional application No. 61/734,099, filed on Dec. 6, 2012.

(51) Int. Cl.
  *G06F 3/0481* (2013.01)
  *G06F 3/0483* (2013.01)
  *G06F 3/0486* (2013.01)
  *G06F 9/451* (2018.01)

(52) U.S. Cl.
  CPC ........ *G06F 3/0486* (2013.01); *G06F 3/04883* (2013.01); *G06F 16/168* (2019.01); *G06F 9/451* (2018.02); *G06F 2203/04803* (2013.01)

(56) References Cited

U.S. PATENT DOCUMENTS

| | | |
|---|---|---|
| 6,628,309 B1 | 9/2003 | Dodson et al. |
| 6,686,852 B1 | 2/2004 | Guo |
| 8,269,719 B1 | 9/2012 | Kim |
| 8,271,907 B2 | 9/2012 | Kim et al. |
| 2002/0059288 A1 | 5/2002 | Yagi et al. |
| 2003/0076362 A1 | 4/2003 | Terada |
| 2004/0056903 A1 | 3/2004 | Sakai |
| 2005/0108655 A1 | 5/2005 | Andrea et al. |
| 2005/0188329 A1 | 8/2005 | Cutler et al. |
| 2005/0235220 A1 | 10/2005 | Duperrouzel et al. |
| 2006/0070029 A1 | 3/2006 | Laborczfalvi et al. |
| 2006/0136389 A1 | 6/2006 | Cover et al. |
| 2006/0167861 A1 | 7/2006 | Arrouye et al. |
| 2007/0192726 A1 | 8/2007 | Kim et al. |
| 2007/0296643 A1 | 12/2007 | Ben-Shachar et al. |
| 2008/0034317 A1 | 2/2008 | Fard et al. |
| 2008/0158189 A1 | 7/2008 | Kim |
| 2008/0172609 A1 | 7/2008 | Rytivaara |
| 2008/0214239 A1 | 9/2008 | Hashimoto et al. |
| 2008/0231546 A1 | 9/2008 | Li |
| 2008/0320396 A1 | 12/2008 | Mizrachi et al. |
| 2009/0083655 A1 | 3/2009 | Beharie et al. |
| 2009/0307631 A1 | 12/2009 | Kim et al. |
| 2009/0319672 A1 | 12/2009 | Reisman |
| 2009/0322690 A1 | 12/2009 | Hiltunen et al. |
| 2010/0017744 A1 | 1/2010 | Kikuchi et al. |
| 2010/0053221 A1 | 3/2010 | Kaneko et al. |
| 2010/0062811 A1 | 3/2010 | Park et al. |
| 2010/0066698 A1 | 3/2010 | Seo |
| 2010/0088634 A1 | 4/2010 | Tsuruta et al. |
| 2010/0122195 A1 | 5/2010 | Hwang |
| 2010/0122207 A1 | 5/2010 | Kim et al. |
| 2010/0138780 A1 | 6/2010 | Marano et al. |
| 2010/0138782 A1 | 6/2010 | Rainisto |
| 2010/0214278 A1 | 8/2010 | Miura |
| 2010/0248788 A1 | 9/2010 | Yook et al. |
| 2010/0281481 A1 | 11/2010 | Rainisto et al. |
| 2010/0293504 A1 | 11/2010 | Hachiya |
| 2010/0295789 A1 | 11/2010 | Shin et al. |
| 2010/0313156 A1 | 12/2010 | Louch et al. |
| 2011/0078624 A1 | 3/2011 | Missig et al. |
| 2011/0093580 A1 | 4/2011 | Nagasaka et al. |
| 2011/0099497 A1 | 4/2011 | Fok et al. |
| 2011/0107272 A1 | 5/2011 | Aguilar |
| 2011/0173556 A1 | 7/2011 | Czersinski et al. |
| 2011/0175930 A1 | 7/2011 | Hwang et al. |
| 2011/0202872 A1 | 8/2011 | Park |
| 2011/0252350 A1 | 10/2011 | Chaudhri et al. |
| 2012/0084692 A1 | 4/2012 | Bae |
| 2012/0088548 A1 | 4/2012 | Yun et al. |
| 2012/0096396 A1 | 4/2012 | Ording et al. |
| 2012/0144331 A1 | 6/2012 | Tolonen et al. |
| 2012/0176322 A1 | 7/2012 | Karmi et al. |
| 2012/0210273 A1 | 8/2012 | Seong et al. |
| 2012/0254788 A1 | 10/2012 | Nicholson et al. |
| 2012/0289290 A1 | 11/2012 | Chae et al. |
| 2012/0303476 A1 | 11/2012 | Krzyzanowski et al. |
| 2012/0304112 A1 | 11/2012 | Cutler et al. |
| 2012/0311485 A1 | 12/2012 | Caliendo, Jr. et al. |
| 2013/0222321 A1 | 8/2013 | Buening |

FOREIGN PATENT DOCUMENTS

| | | |
|---|---|---|
| CN | 101352057 A | 1/2009 |
| EP | 2 530 919 A1 | 12/2012 |
| EP | 2530919 A1 | 12/2012 |
| JP | 10-260784 A | 9/1998 |
| JP | 2004-046796 A | 2/2004 |
| JP | 2006-073015 A | 3/2006 |
| JP | 2006-115213 A | 4/2006 |
| JP | 2008-117181 A | 5/2008 |
| JP | 2008-134348 A | 6/2008 |
| JP | 2010-026066 A | 2/2010 |
| JP | 2011-090391 A | 5/2011 |
| KR | 10-0478920 B1 | 3/2005 |
| KR | 10-0650257 B1 | 11/2006 |
| KR | 10-0652626 B1 | 12/2006 |
| KR | 10-0700171 B1 | 3/2007 |
| KR | 10-2009-0016044 A | 2/2009 |
| KR | 10-0900295 B1 | 5/2009 |
| KR | 10-2010-0030968 A | 3/2010 |
| KR | 10-2010-0053811 A | 5/2010 |
| KR | 10-2010-0053823 A | 5/2010 |
| KR | 10-2010-0071280 A | 6/2010 |
| KR | 10-2010-0107377 A | 10/2010 |
| KR | 10-2011-0093541 A | 8/2011 |
| KR | 10-2011-0129750 A | 12/2011 |
| KR | 10-2012-0033516 A | 4/2012 |
| WO | 2008/090902 A1 | 7/2008 |
| WO | 2009/017175 A1 | 2/2009 |
| WO | 2009/028892 A2 | 3/2009 |

OTHER PUBLICATIONS

European Examination report dated Feb. 17, 2021, issued in European Application No. 19187731.5-1216.
Unity Compiz Einstellungen-Unity-Wiki-ubuntuusers.de, XP055440653.
"GiMeSpace Desktop Extenders", https://web.archive.org/web/20121127132315/bttp://gimespace.co, XP055440633.
Korean Office Action dated Feb. 28, 2019, issued in Korean Patent Application No. 10-2012-0158413.
Korean Office Action dated Feb. 28, 2019, issued in Korean Patent Application No. 10-2012-0158422.
"How to change the default program a file opens with in Windows 7," retrieved on Jan. 10, 2016, from http://www.bleepingcomputer.com/tutorials/chang-file-association-in-windows-7, published on Sep. 28, 2011.
Zardetto, Sharon, "Take control of how files open," retrieved using the Internet Archive copy from Apr. 2, 2012, from http://www.macworld.com/article/1152586/openwith.html, published on Jul. 12, 2010.

(56) References Cited

OTHER PUBLICATIONS

"Improving your desktop experience," published on Sep. 19, 2008, retrieved on Jun. 11, 2016 from http://bla.thera.be/article/improving-your-desktop-experience, 4 pages.

"Independent Virtual Desktops on Multiple Monitors," archive copy from Sep. 3, 2011, stored at the Internet Archive, retrieved on Jun. 11, 2016, from http://www.actualtools.com/virtualdesktops/independent_virtual_desktops_on_multiple_monitors.shtml, 4 pages.

"Unity Compiz settings" (English translation), retrieved from https://wiki.ubuntuusers.de/Archiv/Unity/Unity_Compiz_Einstellungen/ on Apr. 1, 2018. Translated by Google Chrome. 12 pages.

Mauro Graziani Compiz Tips & Tricks,XP055552426, Feb. 6, 2019.

GNU Image Manipulation Program User Manual, XP 055627526. Dated Jul. 15, 2007. pp. 62-66.

Drag & Drop, XP 055627518. Dated Dec. 3, 2016. pp. 1-2. https://www.linuxquestions.org/questions/slackware-14/drag-and-drop-506607/.

European Search Report dated Oct. 18, 2019, issued in European Application No. 19187731.5-1216.

Korean Office Action dated Sep. 25, 2019, issued in Korean Application No. 10-2012-0158413.

European Search Report dated Mar. 1, 2019 issued in European Patent Application No. 13195035.4.

Korean Examination Report dated Jul. 10, 2020, issued in Korean Application No. 10-2020-0060540.

Korean Examination report dated Feb. 28, 2020, issued in Korean Application No. 10-2013-0091554.

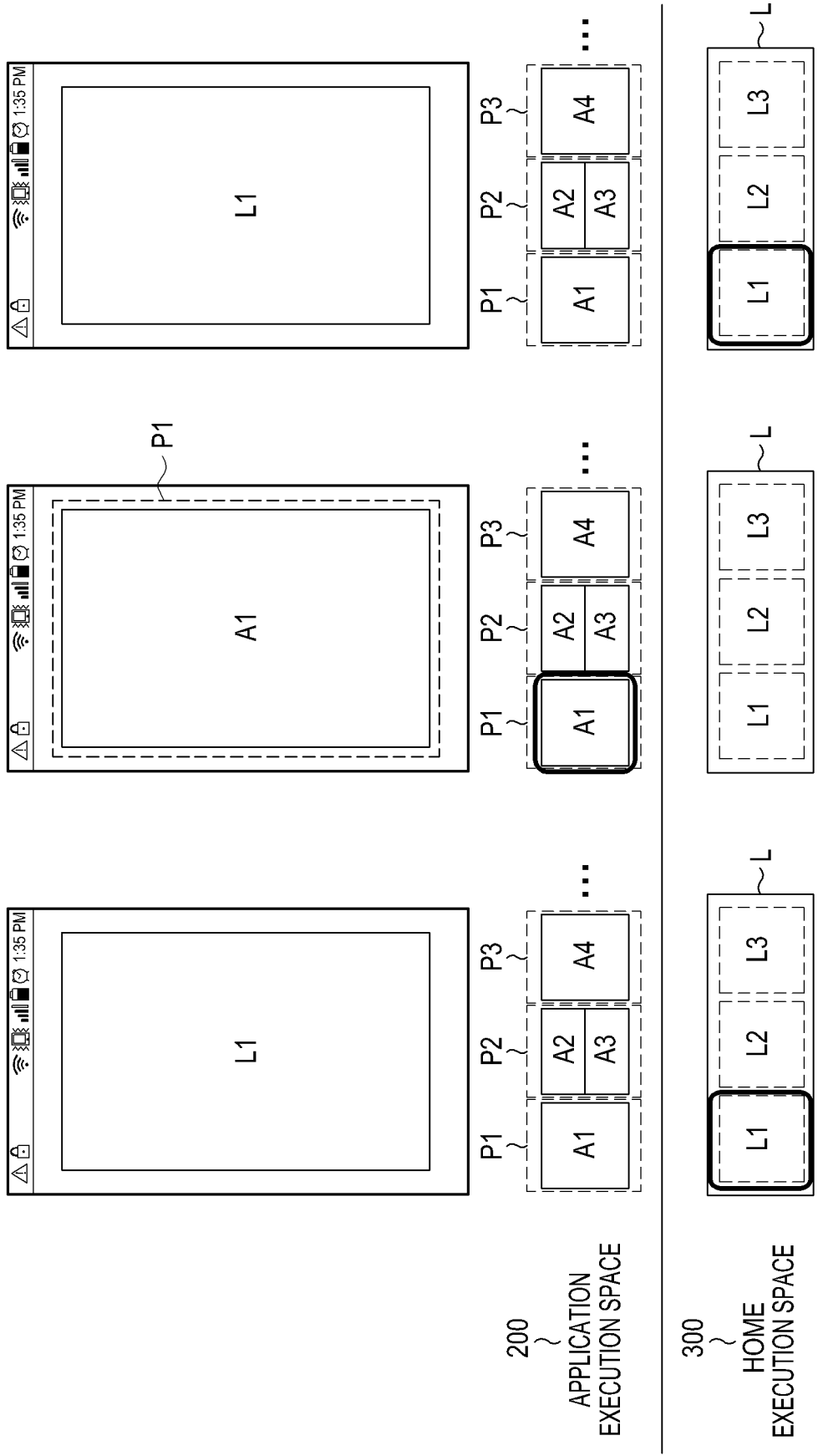

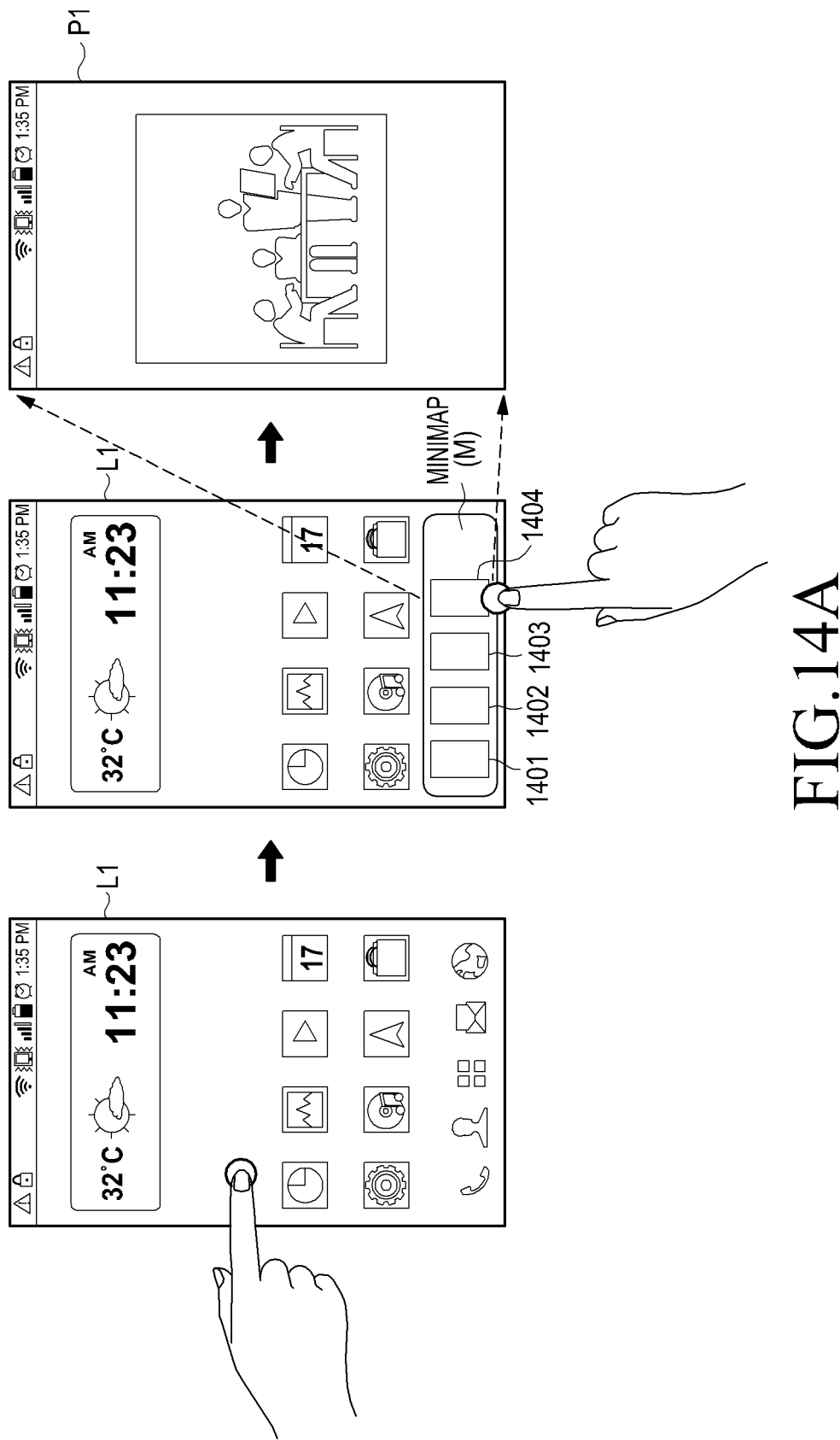

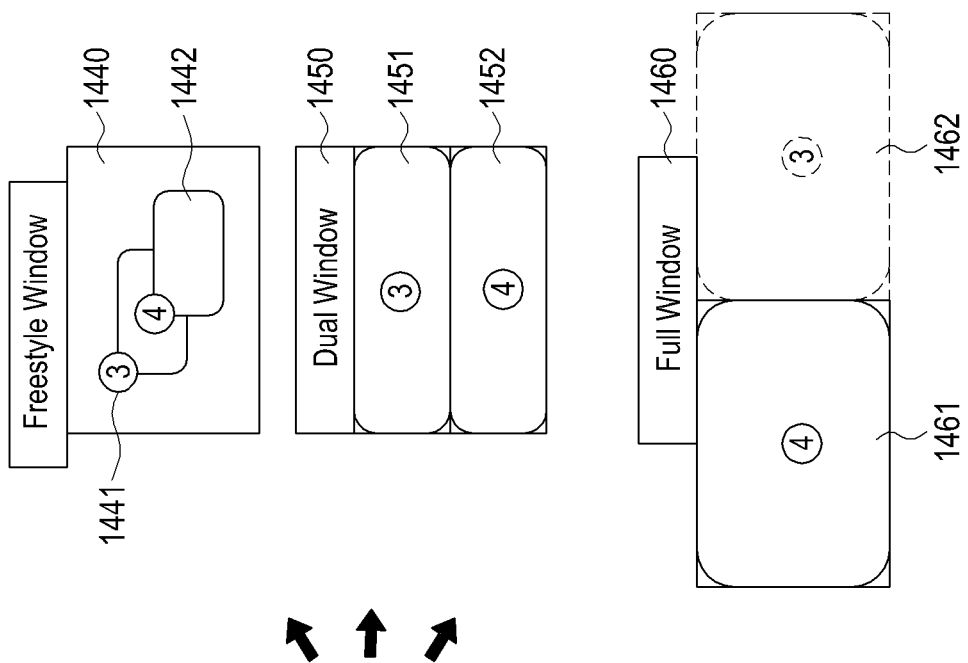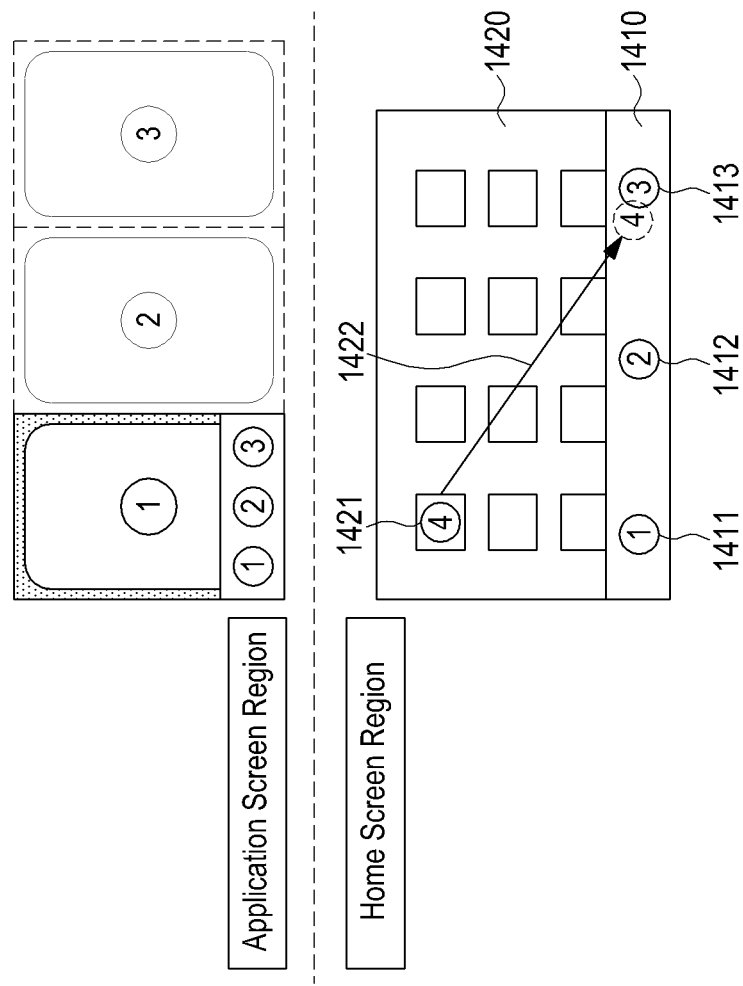
FIG.15

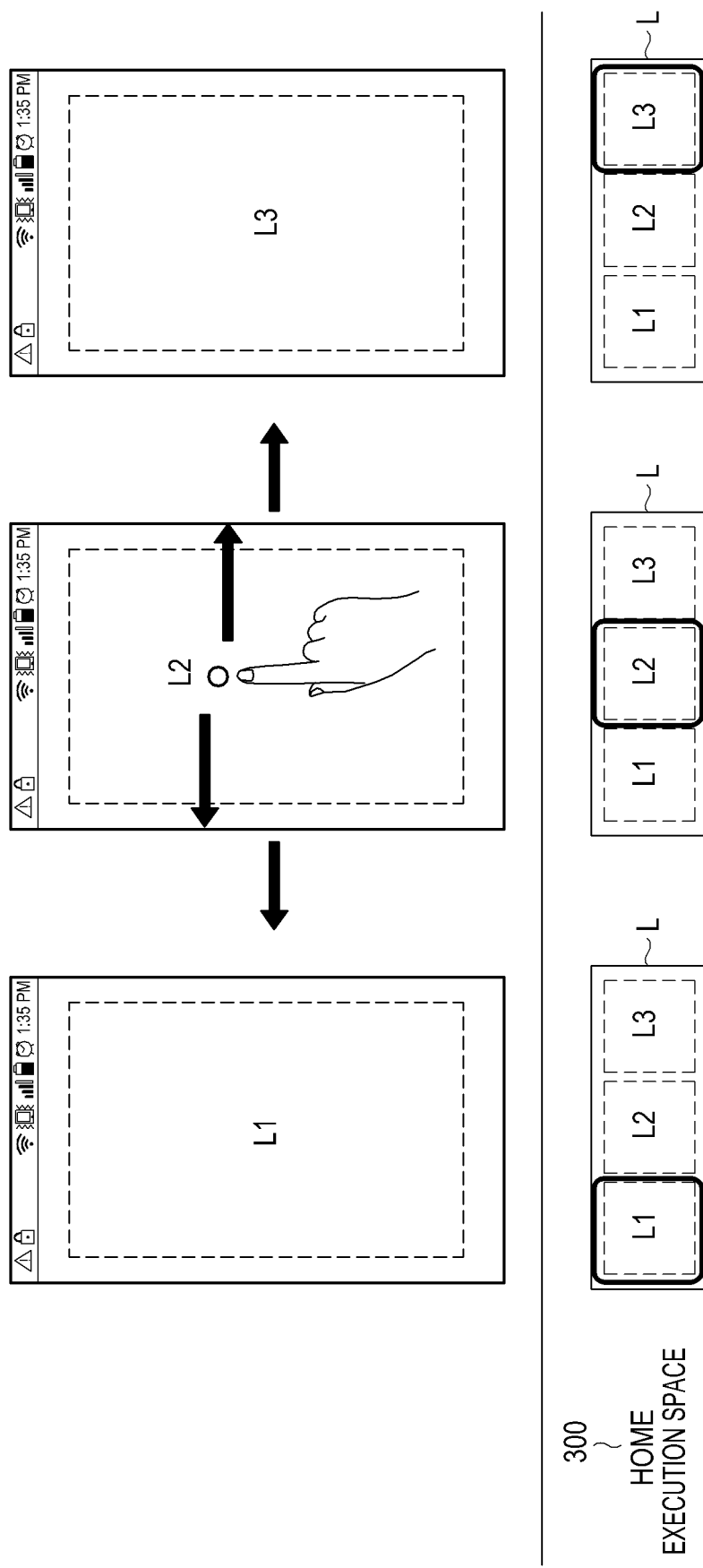

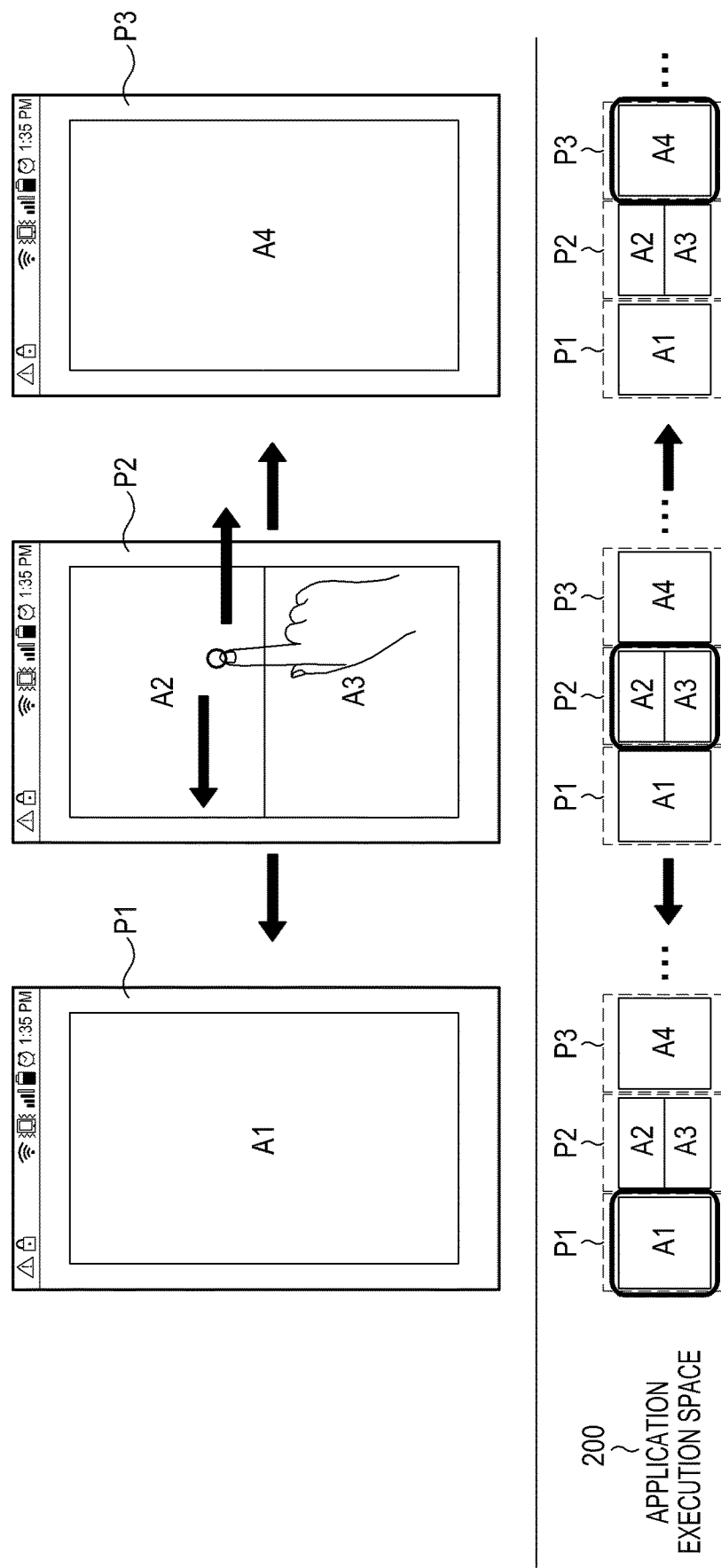

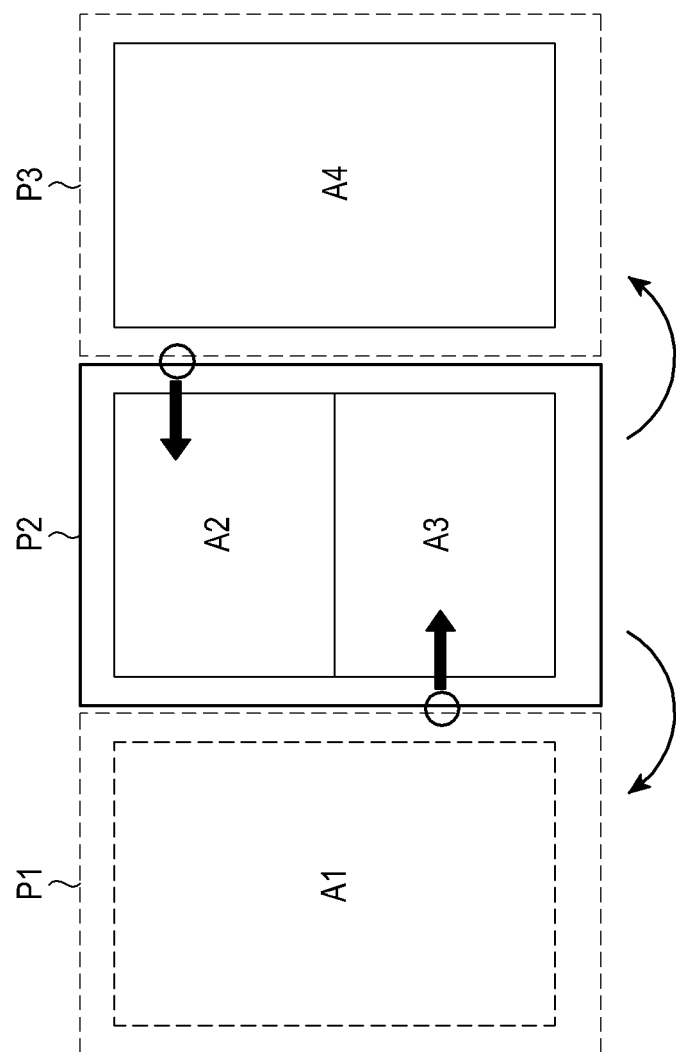

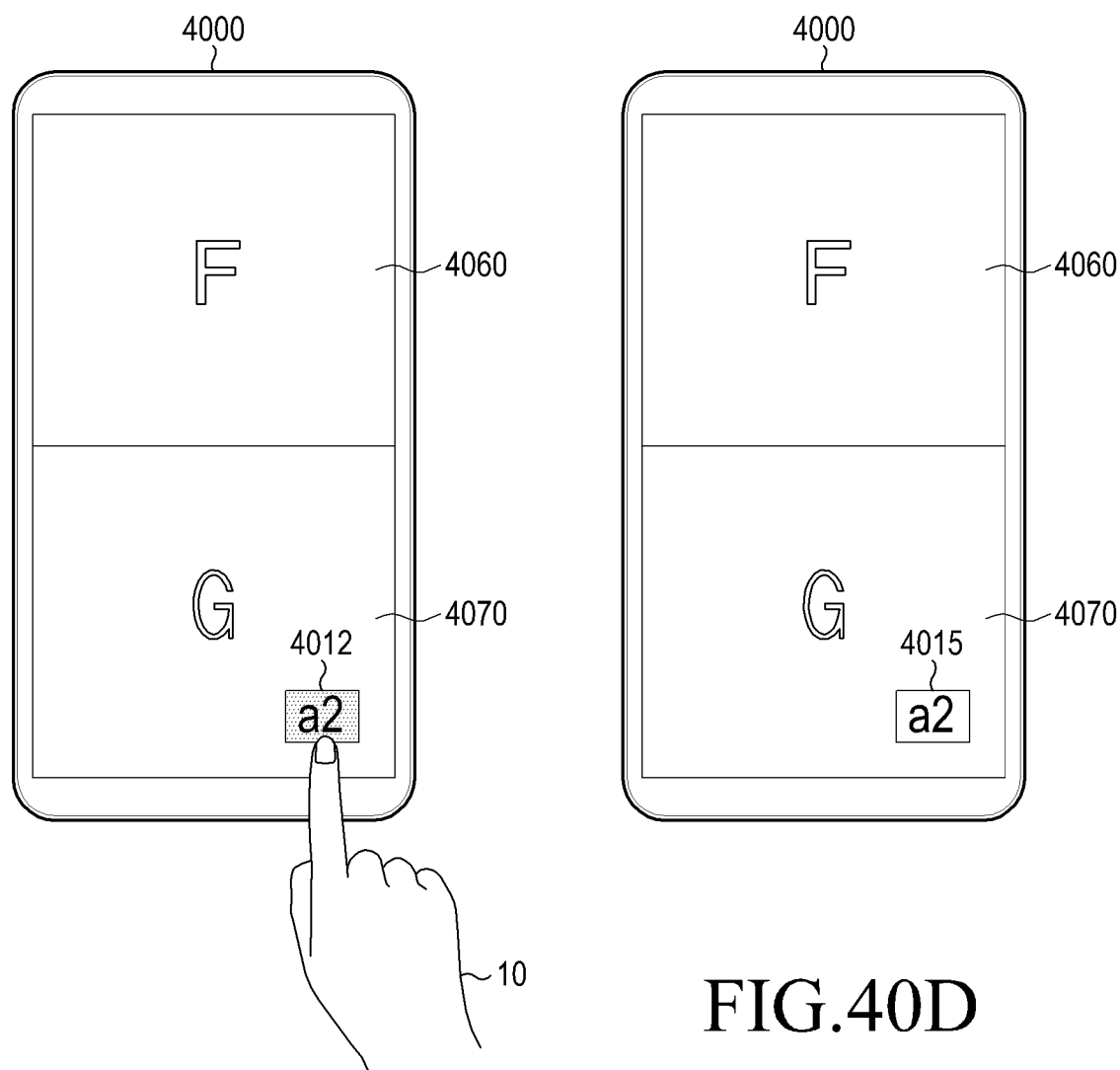

CONFIGURATION OF APPLICATION EXECUTION SPACES AND SUB-SPACES FOR SHARING DATA ON A MOBILE TOUCH SCREEN DEVICE

CROSS-REFERENCE TO RELATED APPLICATION(S)

This application is a continuation of prior application Ser. No. 16/983,522, filed on Aug. 3, 2020, which has issued as U.S. Pat. No. 10,884,620 on Sep. 15, 2020; which is a continuation application of prior application Ser. No. 16/746,273 filed on Jan. 17, 2020, which has issued as U.S. Pat. No. 10,776,005 on Sep. 15, 2020; which is a continuation application of prior application Ser. No. 16/357,937, filed on Mar. 19, 2019, which has issued as U.S. Pat. No. 10,540,090 on Jan. 21, 2020; which is a continuation of prior application Ser. No. 14/090,389, filed on Nov. 26, 2013, which has issued as U.S. Pat. No. 10,282,088 on May 7, 2019; and which claimed priority under 35 U.S.C. § 119(e) of a U.S. Provisional Application Ser. No. 61/734,099 filed on Dec. 6, 2012, in the U.S. Patent and Trademark Office and claimed under 35 U.S.C. § 119(a) of a Korean Patent Application No. 10-2012-0158413, filed on Dec. 31, 2012 in the Korean Intellectual Property Office, of a Korean Patent Application No. 10-2012-0158422, filed on Dec. 31, 2012 in the Korean Intellectual Property Office and of a Korean Patent Application No. 10-2012-0158391, filed on Dec. 31, 2012 in the Korean Intellectual Property Office, the entire disclosure of each of which is hereby incorporated by reference herein in its entirety.

TECHNICAL FIELD

The present disclosure relates to a display device and a method of controlling the same. More particularly, the present disclosure relates to a display device which controls a display of a window in which an application is executed, and a method of controlling the same.

BACKGROUND

A desktop computer has at least one display device (for example, a monitor). A mobile device (for example, a mobile phone, a smart phone, or a tablet PC) using a touch screen typically has one display device.

A user of the desktop computer may divide a screen of the display device according to a working environment (for example, horizontally or vertically divide the screen while displaying a plurality of windows). When a web browser is executed, the user can move in an up or down direction of the web page by using a page up button or a page down button arranged in a keyboard. When the user uses a mouse instead of the keyboard, the user can move in the up or down direction of the web page by selecting a scroll bar located in a side part of the web page by using a cursor. Further, the user can move in the up or down direction of the web page by selecting a top button displayed as a text or an icon located in a bottom part of the web page.

The mobile device has a smaller size of the displayed screen as compared to the desktop computer and has a limitation in an input. It is accordingly difficult for the user to divide the screen of the mobile device.

Further, the mobile device can execute various applications such as basic applications produced by a manufacturer of the mobile device and then installed in the mobile device and additional applications downloaded from an application store through the Internet. The additional applications may be developed by general users and registered in an application store. Accordingly, anyone can freely sell applications to users of the mobile device through the application selling site. Accordingly, upwards of hundreds of thousands of free or paid applications are provided to the current mobile devices according to types of mobile devices.

Although various applications which simulate consumers' curiosity and satisfy consumers' demands are provided to the mobile device, since the mobile device is provided to have a portable size, it has a limitation in a size and a User Interface (UI) thereof. Accordingly, the users feel inconvenience in executing a plurality of applications in the mobile device. For example, when one application is executed in the mobile device, the application is displayed in an entire display area. Further, when the user desires to execute another application, the user should first end the currently executed application and then select an execution key for executing the desired application. In order to execute several applications in the mobile device, processes of executing and ending the respective applications should be repeated, which is cumbersome. Further, a method of simultaneously executing the several applications in the mobile device has not been provided.

A mobile device of the related art does not define an execution space designated for each application. Accordingly, in switching an application screen which is being executed to another application screen, the conventional mobile device is required to end the application which is being executed, return to a home screen, and then execute another application in the home screen. Further, when sharing data between applications, the conventional mobile device is required to copy data from one application, return to a home screen, and then execute another application to paste the data.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a display device that shares data in an application execution space, and a method of controlling the same.

In accordance with an aspect of the present disclosure, a method of controlling a display device including a touch screen is provided. The method includes setting an application execution space having one or more sub spaces in which windows executing applications are arranged, arranging windows corresponding to one or more applications which are being executed in the sub spaces of the set application execution space, displaying a first sub space corresponding to one of the one or more sub spaces on the touch screen, receiving a data sharing command for sharing data included in a first window arranged in the first sub space, and sharing the data to be shared by a second window arranged in a second sub space corresponding to one of the one or more sub spaces based on the data sharing command.

In accordance with another aspect of the present disclosure, a display device is provided. The display device includes a controller configured to set an application execution space having one or more sub spaces in which windows executing applications are arranged and to arrange windows corresponding to one or more applications which are being executed in the sub spaces of the set application execution space, and a touch screen configured to display a first sub space corresponding to one of the one or more sub spaces and to receive a data sharing command for sharing data included in a first window arranged in the first sub space, wherein the controller shares the data to be shared by a second window arranged in a second sub space corresponding to one of the one or more sub spaces based on the data sharing command.

In accordance with another aspect of the present disclosure, a method of controlling a display device including a touch screen is provided. The method includes displaying a first window including data to be shared on a first page, receiving a drag gesture for the data to be shared, and sharing the data to be shared with a window corresponding to a point where the drag gesture ends.

In accordance with another aspect of the present disclosure, a display device is provided. The display device includes a touch screen configured to display a first window including data to be shared on a first page and to receive a drag gesture for the data to be shared, and a controller configured to share the data to be shared with a window corresponding to a point where the drag gesture ends.

In accordance with another aspect of the present disclosure, a method of controlling a display device including a touch screen transmitting/receiving data to/from another display device is provided. The method includes setting an application execution space having one or more sub spaces in which windows executing applications are arranged, arranging windows corresponding to one or more applications which are being executed in the sub spaces of the set application execution space, setting to display a first sub space corresponding to one of the one or more sub spaces on the touch screen, displaying a second sub space on another display device, and sharing data to be shared of a first window arranged in the first sub space by a second window of the second sub space.

In accordance with another aspect of the present disclosure, a display device is provided. The display device includes a controller configured to set an application execution space having one or more sub spaces in which windows executing applications are arranged, to arrange windows corresponding to one or more applications which are being executed in the sub spaces of the set application execution space, to control to display a first sub space corresponding to one of the one or more sub spaces on the touch screen, and to control to display a second sub space on another display device, a touch screen configured to display the first sub space, and a communication unit configured to share data to be shared of a first window arranged in the first sub space by a second window of the second sub space.

According to various embodiments of the present disclosure, the user can easily share data to be shared with another window. Also, the user can share the data with a desired page and a desired window in the application execution space, thereby maximizing the user's convenience.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 12A, 12B, and 12C illustrate mutual switching between a launcher screen of a home execution space and a page of an application execution space according to an embodiment of the present disclosure;

FIGS. 14A and 14B illustrate a case where a display change event is generated based on a page selection on a minimap according to an embodiment of the present disclosure;

FIG. 15 illustrates a minimap execution based on a user's gesture according to an embodiment of the present disclosure;

FIGS. 16A, 16B, and 16C illustrate a method of displaying switching between views in a home execution space according to an embodiment of the present disclosure;

FIGS. 17A, 17B, and 17C illustrate a method of displaying switching between pages in an application execution space according to an embodiment of the present disclosure;

FIGS. 18A, 18B, and 18C illustrate switching between pages in an application execution space based on a gesture input of a user according to an embodiment of the present disclosure;

FIGS. 40A, 40B, 40C, and 40D illustrate a data sharing method according to an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
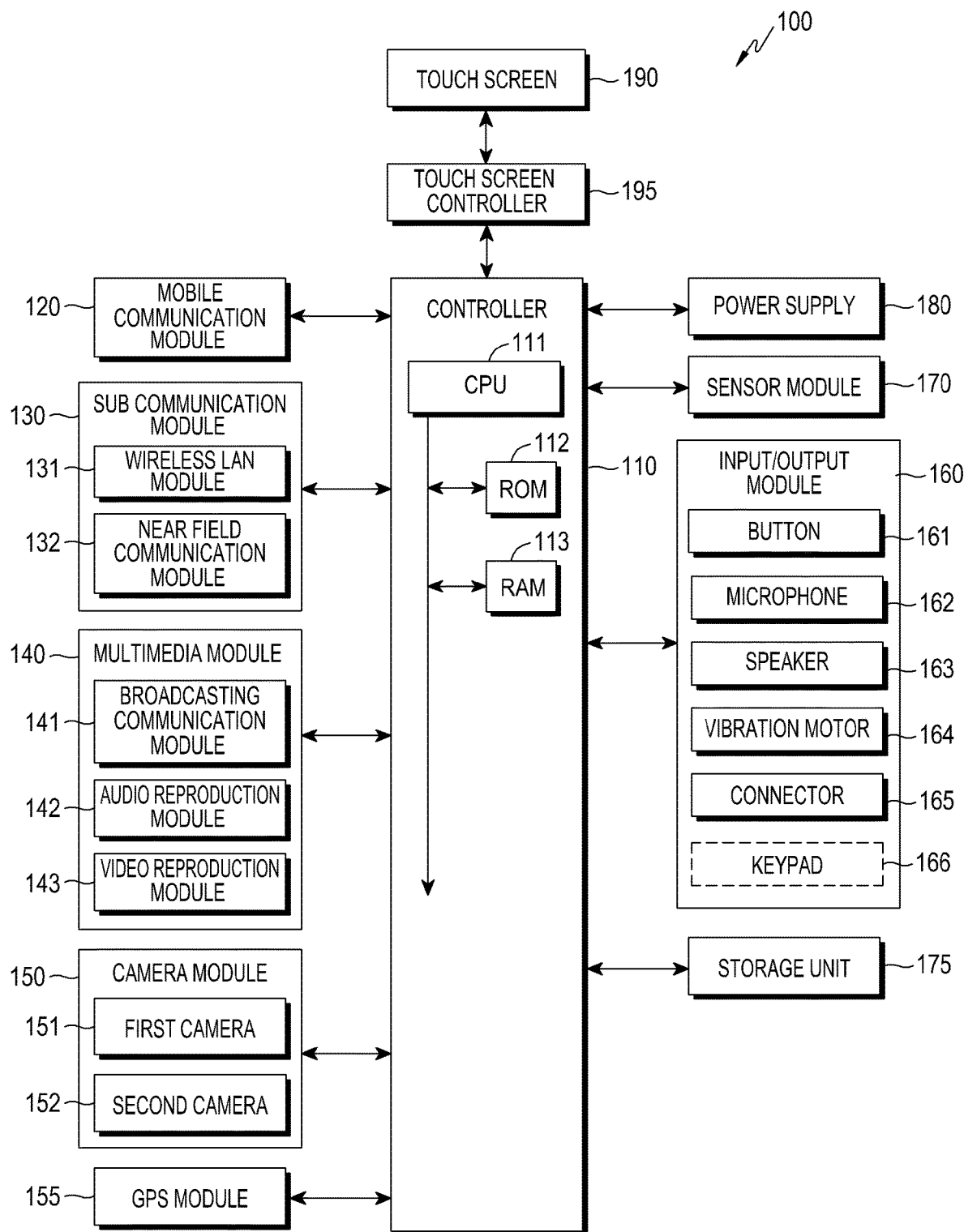
FIG. 1 is a block diagram schematically illustrating a device according to an embodiment of the present disclosure.

FIG. 1 is a block diagram schematically illustrating a device according to an embodiment of the present disclosure.

Referring to FIG. 1, a display device 100 may be connected to an external device (not shown) by using a mobile communication module 120, a sub communication module 130, and a connector 165. The "external device" includes a different device (not shown) from the display device 100, a mobile phone (not shown), a smart phone (not shown), a tablet Personal Computer (PC) (not shown), and a server (not shown).

Referring to FIG. 1, the display device 100 includes a touch screen 190 and a touch screen controller 195. The display device 100 also includes a controller 110, the mobile communication module 120, the sub communication module 130, a multimedia module 140, a camera module 150, a Global Positioning System (GPS) module 155, an input/output module 160, a sensor module 170, a storage unit 175, and a power supply 180. The sub communication module 130 includes at least one of a wireless LAN module 131 and a near field communication module 132, and the multimedia module 140 includes at least one of a broadcasting communication module 141, an audio reproduction module 142, and a video reproduction module 143. The camera module 150 includes at least one of a first camera 151 and a second camera 152, and the input/output module 160 includes at least one of a button 161, a microphone 162, a speaker 163, a vibration motor 164, the connector 165, and a keypad 166.

The controller 110 may include a Central Processing Unit (CPU) 111, a Read-Only Memory (ROM) 112 for storing a control program for controlling the display device 100, and a Random Access Memory (RAM) 113 for storing a signal or data input to the display device 100 or used as a storage area for an operation performed in the display device 100. The CPU 111 may include a single core, a dual core, a triple core, or a quad core. The CPU 111, the ROM 112, and the RAM 113 may be connected through an internal bus.

The controller 110 may control the mobile communication module 120, the sub communication module 130, the multimedia module 140, the camera module 150, the GPS module 155, the input/output module 160, the sensor module 170, the storage unit 175, the power supplier 180, a first touch screen 190*a*, a second touch screen 190*b*, and the touch screen controller 195.

The mobile communication module 120 connects the display device 100 with the external device through mobile communication by using at least one or a plurality of antennas (not shown) according to a control of the controller 110. The mobile communication module 120 transmits/receives a wireless signal for voice phone communication, video phone communication, a Short Message Service (SMS), or a Multimedia Message Service (MMS) to/from a mobile phone (not shown), a smart phone (not shown), a tablet PC, or another device (not shown) having a phone number input into the display device 100.

The sub communication module 130 may include at least one of the wireless LAN module 131 and the near field communication module 132. For example, the sub communication module 130 may include only the wireless LAN module 131, only the near field communication module 132, or both the wireless LAN module 131 and the near field communication module 132.

The wireless LAN module 131 may be connected to the Internet in a place where a wireless Access Point (AP) (not shown) is installed, according to a control of the controller 110. The wireless LAN module 131 supports a wireless LAN standard (IEEE802.11x) of the Institute of Electrical and Electronics Engineers (IEEE). The near field communication module 132 may wirelessly perform near field communication between the display device 100 and a video forming device (not shown) according to a control of the controller 110. Near field communication techniques may include Bluetooth, Infrared Data Association (IrDA) and the like.

The display device 100 may include at least one of the mobile communication module 120, the wireless LAN module 131, and the near field communication module 132. For example, the display device 100 may include a combination of the mobile communication module 120, the wireless LAN module 131, and the near field communication module 132 according to a capability of the display device 100.

The multimedia module 140 may include the broadcasting communication module 141, the audio reproduction module 142, and the video reproduction module 143. The broadcasting communication module 141 may receive a broadcasting signal (for example, a TV broadcasting signal, a radio broadcasting signal, or a data broadcasting signal) and broadcasting additional information (for example, Electric Program Guide (EPS) or Electric Service Guide (ESG)) broadcast from a broadcasting station through a broadcasting communication antenna (not shown) according to a control of the controller 110. The audio reproduction module 142 may reproduce a digital audio file (for example, a file having an extension of mp3, wma, ogg or wav) stored or received according to a control of the controller 110. The video reproduction module 143 may reproduce a digital video file (for example, a file having an extension of mpeg, mpg, mp4, avi, mov or mkv) stored or received according to a control of the controller 110. The video reproduction module 143 may reproduce the digital audio file.

The broadcasting communication module 141 may be omitted from the multimedia module 140. Similarly, the audio reproduction module 142 or the video reproduction module 143 of the multimedia module 140 may be included in the controller 110.

The camera module 150 may include at least one of the first camera 151 and the second camera 152 for photographing a still image or a video according to a control of the controller 110. The first camera 151 or the second camera 152 may include an auxiliary light source (for example, a flash (not shown)) for providing an amount of light required for photography. The first camera 151 may be disposed in a front surface of the display device 100, and the second camera 152 may be disposed in a rear surface of the display device 100. The first camera 151 and the second camera 152 may also be disposed to be adjacent to each other (for example, an interval between the first camera 151 and the second camera 152 is larger than 1 cm or smaller than 8 cm), and thus a three-dimensional still image or a three-dimensional video may be photographed.

The GPS module 155 may receive a radio wave from a plurality of GPS satellites (not shown) in Earth orbit and calculate a position of the display device 100 by using Time of Arrival from the GPS satellites (not shown) to the display device 100.

The input/output module 160 may include at least one of the plurality of buttons 161, the microphone 162, the speaker 163, the vibration motor 164, the connector 165, and the keypad 166.

The buttons 161 may be formed in a front surface, a side surface, or a rear surface of the housing of the display device 100, and may include at least one of a power/lock button (not shown), a volume button (not shown), a menu button, a home button, a back button, and a search button 161.

The microphone 162 receives a voice or a sound and generates an electrical signal according to a control of the controller 110.

The speaker 163 may output sounds corresponding to various signals (for example, a wireless signal, a broadcasting signal, a digital audio file, a digital video file, photographing a picture or the like) of the mobile communication module 120, the sub communication module 130, the multimedia module 140, or the camera module 150 to an outside of the display device 100 according to a control of the controller 110. The speaker 163 may output sounds (for example, a button control sound or a ring back tone corresponding to phone communication) corresponding to functions performed by the display device 100. One or more speakers 163 may be formed in a proper position or positions of the housing of the display device 100.

The vibration motor 164 may convert an electrical signal to a mechanical vibration according to a control of the controller 110. For example, the vibration motor 164 may operate when the display device 100 in a vibration mode receives voice phone communication from another device (not shown). One or more vibration motors 164 may be formed within the housing of the display device 100. The vibration motor 164 may operate in response to a touch action of the user on the touch screen 190 and continuous motions of the touch on the touch screen 190.

The connector 165 may be used as an interface for connecting the display device 100 with an external device (not shown) or a power source (not shown). The connector 165 may transmit data stored in the storage unit 175 of the display device 100 to the external device (not shown) through a wired cable connected to the connector 165 or receive the data from the external device (not shown) according to a control of the controller 110. Power may be input or a battery (not shown) may be charged from the power source (not shown) through the wired cable connected to the connector 165.

The keypad 166 may receive a key input from the user to control the display device 100. The keypad 166 includes a physical keypad (not shown) formed in the display device 100 or a virtual keypad (not shown) displayed on the touch screen 190. The physical keypad (not shown) formed in the display device 100 may be omitted according to a capability or a structure of the display device 100.

The sensor module 170 includes at least one sensor for detecting a state of the display device 100. For example, the sensor module 170 may include a proximity sensor for detecting whether the user is close to the display device 100, an illumination sensor (not shown) for detecting an amount of light adjacent to the display device 100, or a motion sensor (not shown) for detecting an operation of the display device 100 (for example, a rotation of the display device 100, or an acceleration or vibration applied to the display device 100). At least one sensor may detect the state, generate a signal corresponding to the detected state, and transmit the generated signal to the controller 110. The sensor of the sensor module 170 may be added or omitted according to a capability of the display device 100.

The storage unit 175 may store signals or data input/output in accordance with operations of the mobile communication module 120, the sub communication module 130, the multimedia module 140, the camera module 150, the GPS module 155, the input/output module 160, the sensor module 170, and the touch screen 190 according to a control of the controller 110. The storage unit 175 may store a control program for controlling the display device 100 or the controller 110 and applications.

The term "storage unit" includes a memory card (not shown) (for example, an SD card or a memory stick) mounted to the storage unit 175, the ROM 112 or the RAM 113 within the controller 110, or the display device 100. The storage unit may include a nonvolatile memory, a volatile memory, a Hard Disk Drive (HDD), or a Solid State Drive (SSD).

The power supplier 180 may supply power to one battery or a plurality of batteries (not shown) disposed in the housing of the display device 100 according to a control of the controller 110. The one battery or the plurality of batteries (not shown) supply power to the display device 100. The power supplier 180 may supply power input from an external power source (not shown) through the wired cable connected to the connector 165 to the display device 100.

The touch screen 190 may provide a user interface corresponding to various services (for example, phone communication, data transmission, broadcasting, and photographing a picture) to the user. The touch screen 190 may transmit an analog signal corresponding to at least one touch input into the user interface to the touch screen controller 195. The touch screen 190 may receive at least one touch through a body part of the user (for example, fingers including a thumb) or a touchable input means. Also, the touch screen 190 may receive a continuous motion of one touch among at least one touch. The touch screen 190 may transmit an analog signal corresponding to the continuous motion of the input touch to the touch screen controller 195.

The touch according to the present disclosure is not limited to a touch between the touch screen 190 and the body part of the user or the touchable input means, but may include a non-touch (for example, a case where a detectable interval between the touch screen 190 and the body part of the user or the touchable input means is equal to or smaller than 1 mm). The detectable interval of the touch screen 190 may be changed according to a capability of a structure of the display device 100.

The touch screen 190 may be implemented in, for example, a resistive type, a capacitive type, an infrared type, or an acoustic wave type.

The touch screen controller 195 converts the analog signal received from the touch screen 190 to a digital signal (for example, X and Y coordinates) and transmits the digital signal to the controller 110. The controller 110 may control the touch screen 190 by using the digital signal received from the touch screen controller 195. For example, the controller 110 may allow a shortcut icon (not shown) displayed on the touch screen 190 to be selected or executed in response to the touch. Further, the touch screen controller 195 may be included in the controller 110.

Figure 2A:
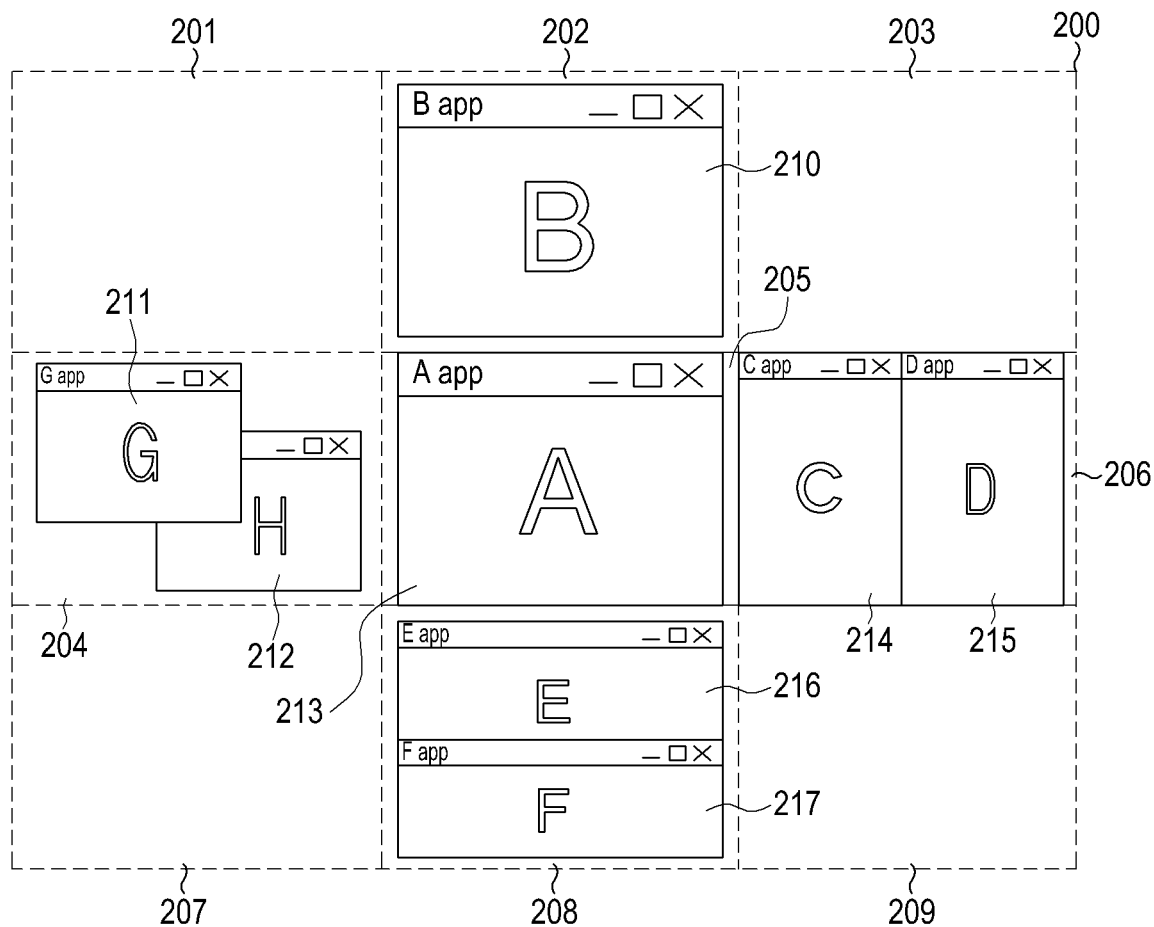
FIGS. 2A and 2B illustrate an application execution space according to the present disclosure.
Figure 2B:
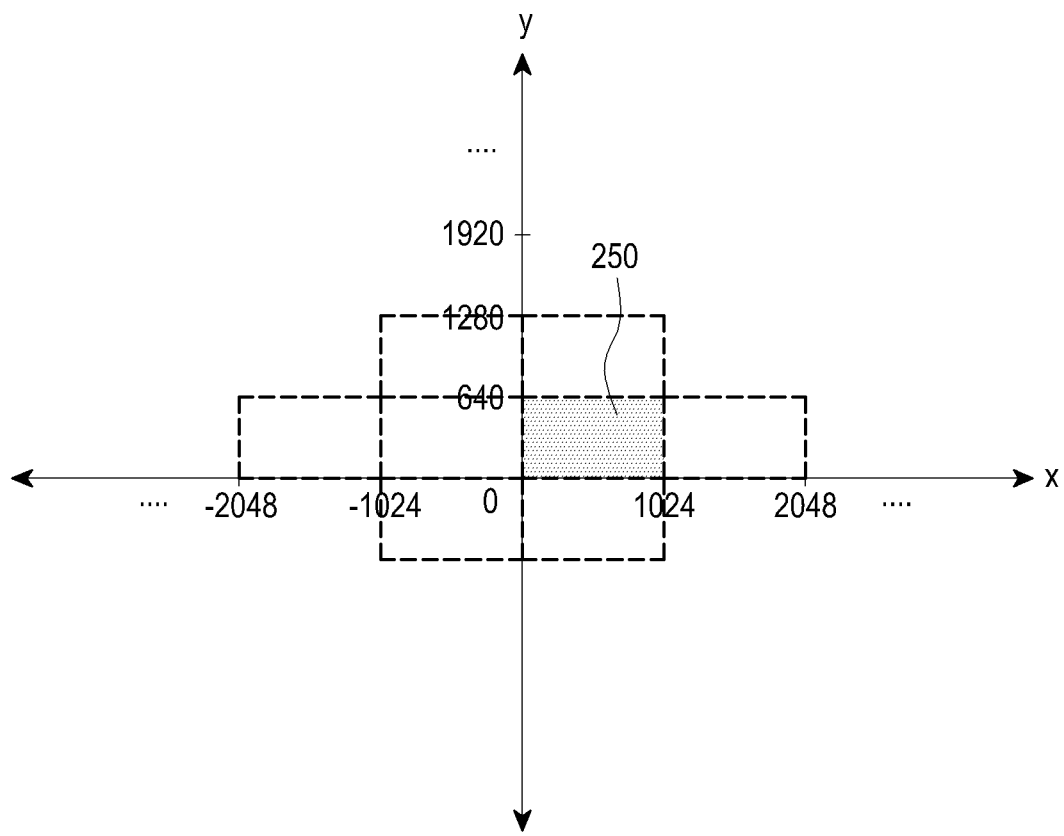

FIGS. 2A and 2B illustrate an application execution space according to the present disclosure.

Referring to FIG. 2A, the display device 100 may define an application execution space 200 which is a virtual area including an area of the touch screen 190. The display device 100 may set coordinates with respect to the entire application execution space 200. For example, the display device 100 may set coordinates having a size of 900×900 with respect to the entire application execution space 200. A coordinate value of an x axis may be a value from −300 to 600 and a coordinate value of a y axis may be a value from −300 to 600.

The display device 100 may divide the application execution space 200 into nine sub spaces 201 to 209 and define the nine sub spaces 201 to 209. The sub spaces 201 to 209 refer to spaces in which a window executing an application can be arranged, and a plurality of windows as well as one window can be arranged in one sub space of the display device 100. The display device 100 may define a first sub space 201 in which a value from −300 to 0 is set with respect to the x axis and a value from 0 to 300 is set with respect to the y axis. The display device 100 may set a coordinate value with respect to each sub space. A result of the setting may be as shown in Table 1.

TABLE 1

| Sub space index | Range of an x axis coordinate value | Range of a y axis coordinate value |
| --- | --- | --- |
| 1 | −300~0 | 300~600 |
| 2 | 0~300 | 300~600 |
| 3 | 300~600 | 300~600 |
| 4 | −300~0 | 0~300 |
| 5 | 0~300 | 0~300 |
| 6 | 300~600 | 0~300 |
| 7 | −300~0 | −300~0 |
| 8 | 0~300 | −300~0 |
| 9 | 300~600 | −300~0 |

At least one window executing an application may be arranged within each of the sub spaces 201 to 209. For example, a first window 210 executing an application B may be arranged in the second sub space 202. A second window 211 executing an application G and a third window 212 executing an application H may be arranged in the fourth sub space 204. A fourth window 213 executing an application A may be arranged in the fifth sub space 205 through an entire screen. A fifth window 214 executing an application C and a sixth window 215 executing an application D may be arranged in left and right sides of the sixth sub space 206 in a split mode, respectively. A seventh window 216 executing an application E and an eighth window 217 executing an application F may be arranged in upper and lower sides of the eighth sub space 207 in the split mode, respectively. The display device 100 may arrange at least one window executing an application in each of the sub spaces 201 to 209.

The display device 100 may physically display one of the sub spaces 201 to 209, for example, the fifth sub space 205 on the touch screen 190. The display device 100 may display, for example, the fourth window 213 executing the application A of the fifth sub space 205.

The display device 100 may display another sub space based on an input display change gesture. For example, when a user inputs a rightward drag gesture into the touch screen 190, the display device 100 may display the sixth sub space 206 on the touch screen 190. The controller 110 may reset an x axis coordinate value of an area physically displayed on the touch screen 190 to a value from 0 to 300 and a y axis coordinate value to a value from 0 to 300, and also reset the remaining sub space coordinates based on the reset values. A configuration of changing and then displaying the sub spaces is described below.

The controller 110 may manage each of the sub spaces 201 to 209 in the unit of pages. For example, when the user inputs the display change gesture from the fifth sub space 205 to the sixth sub space 206 as described above, the controller 110 changes the displayed fifth sub space 205 into the sixth sub space 206 in the unit of sub spaces, (i.e., in the unit of pages). The controller 110 may simultaneously display a part of the fifth sub space 205 and a part of the sixth sub space 206 to animate the display change from the fifth sub space 205 to the sixth sub space 206 while changing the display, but does not display a mixed image of the part of the fifth sub space 205 and the part of the sixth sub space 206.

The controller 110 may manage each of the sub spaces 201 to 209 in the unit of pixels as opposed to pages. For example, when the user inputs the display change gesture from the fifth sub space 205 to the sixth sub space 206, the controller 110 may change the displayed fifth sub space 205 into the sixth sub space 206 in the unit of pixels. The controller 110 may change a range of the x axis of the physically displayed coordinate one by one such that the range is changed from (0, 300) to (1, 301), (2, 302), and so forth. As described above, the mixed image of the part of the fifth sub space 205 and the part of the sixth sub space 206 may be displayed on the touch screen 190.

Although coordinates having a size of 900×900 are set with respect to the entire application execution space 200, a coordinate value is set to a value from −300 to 600 with respect to the x axis, and a value frame −300 to 600 is set with respect to the y axis in FIG. 2A as an example, the coordinate value of the application execution space 200 can be set to another value. Further, in the application execution space 200 according to the present disclosure, a size of each sub space, for example, the page may be determined according to a size of the physical display area, for example, the touch screen 190.

FIG. 2B illustrates a case where a size of a physical display area of an application execution space according to another embodiment of the present disclosure is 1024×640.

Referring to FIG. 2B, one page may have a maximum size of 1024×640 as indicated by a reference numeral 250. At least one page is included in + and − directions of the x axis based on (0, 0), and at least one page is included in + and − directions of the y axis. Although FIG. 2B illustrates a maximum page size of 1024×640 as an example, a size of the application execution window may be larger or smaller according to a size of the display area. The size of the page has no limitation as long as it does not exceed a maximum size, and at least one application execution window may be arranged on each page.

Figure 3:
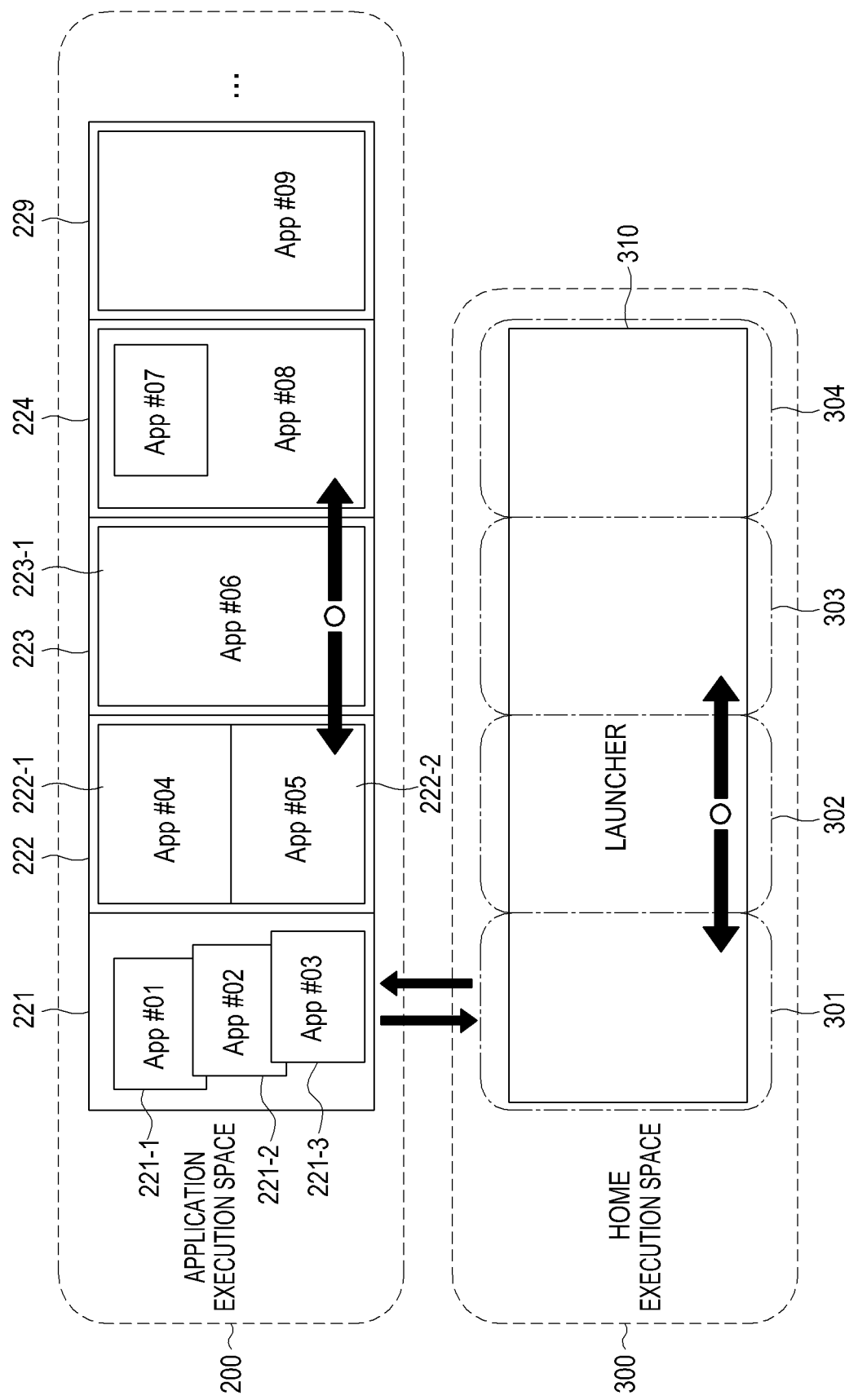
FIG. 3 illustrates a home execution space and an application execution space according to an embodiment of the present disclosure.

FIG. 3 illustrates a home execution space and an application execution space according to an embodiment of the present disclosure.

Referring to FIG. 3, the terminal 100 may define the home execution space 300 and the application execution space 200 as divided areas separated from each other. For example, the terminal 100 may set a coordinate with respect to the application execution space 200 by using a virtual space. As described in FIGS. 2A and 2B, the terminal 100 may set the coordinate having a predetermined size with respect to the application execution space 200, and a coordinate value (x, y) thereof may be set to be separated from the home execution space 300.

The home execution space 300 may be a space where a launcher related to the home screen of the terminal 100 is executed and a launcher screen 310 according to the execution of the launcher is generated. The launcher refers to an application associated with the home screen and corresponds to a home application different from a general application. For example, when the terminal 100 is turned on, the launcher may be executed in the home execution space 300 and the launcher screen 310 by the launcher is generated to be displayed on the touch screen 190. For example, the launcher screen 310 may include a home screen, and a desktop (background screen), a tray including shortcut icons for executing frequently used applications, various menus, or a thumbnail image of an executable application may be displayed on the home screen. The home execution space 300 may be defined as one logical space and displayed by a plurality of views 301 to 304 according to a size of the physical display area, (i.e., the touch screen) as necessary.

The application execution space 200 is a space where an application is executed and an application execution window according to the execution of the application is generated. The application may include a game application, a video reproduction application, a map application, a memo application, a broadcasting application, a sports support application, a payment application, a picture editing application and the like, but the application according to present disclosure is not limited thereto.

The application execution space 200 may include a plurality of sub spaces, for example, a plurality of pages 221 to 229 which can independently execute a plurality of applications App #01 to App #n or execute two or more applications, and the pages may be added or deleted in the application execution space 200. A size of each of the pages may be the same as the size of the display area, that is, the touch screen 190. Each of the plurality of pages 221 to 229 may display one application execution window or two or more application execution windows, (i.e., a multi window). As illustrated in FIG. 3, three application execution windows 221-1, 221-2, and 222-3 may be displayed on one page 221, two application execution windows 222-1 and 222-3 may be displayed on one page 222, and one application execution window 223-1 may be displayed on one page 223. The application execution space 200 may include the desktop (background screen) like the home execution space 300 or the desktop may be set according to a selection by the user.

According to an embodiment of the present disclosure, the terminal 100 can display switching between pages in the application execution space 200, switching between views in the home execution space 300, and switching from a page of the application execution space 200 to a view of the home execution space 300.

According to an embodiment of the present disclosure, the controller 110 may include a framework to process the application execution space 200 and the home execution space 300.

Figure 4:
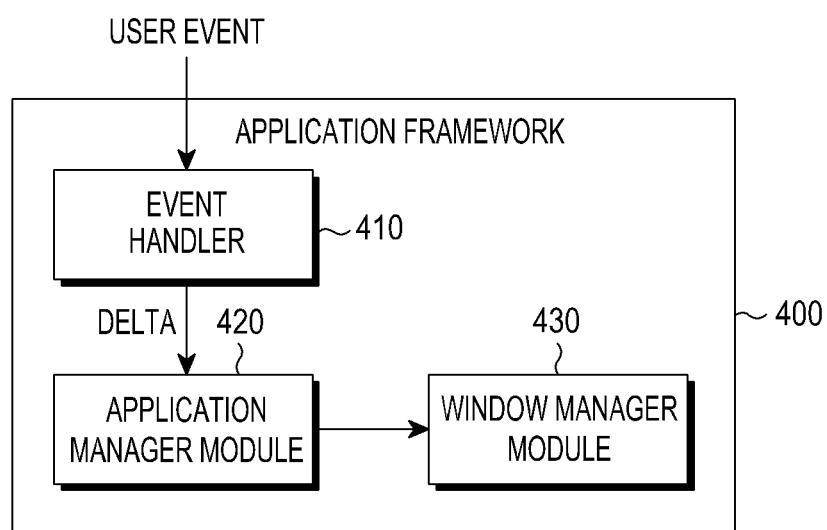
FIG. 4 illustrates a an application framework according to an embodiment of the present disclosure.

FIG. 4 illustrates a concept describing an application framework according to the present disclosure.

Referring to FIG. 4, an application framework 400 processes the application execution space 200 and the home execution space 300 according to a corresponding event based on an event input by the user. The application framework 400 may include an event handler 410, an application manager module 420, and a window manager module 430.

When the user inputs a display change event in the application execution space 200, the event handler 410 detects the corresponding display change event. For example, when the display change event is for scrolling a screen, the event handler 410 may generate a space moving event by a scrolled delta and transmit the generated space moving event to the application manager module 420. The application manager module 420 serves as an interface for transmitting information transmitted from the application to the window manager module 430. For example, when the user inputs a predetermined user gesture, such as a flick in an application mode, the application manger module 420 transmits movement length information for moving the application by a movement length corresponding to the input flick to the window manager module 430.

The application manager module 420 may directly approach the window manager module 430 to transmit data received from the application and to receive a result thereof from the application. For example, the application manager module 420 transmits movement length information received from the event handler 410 to the window manager module 430 to indicate that the application has been moved, and allows the window manager module 430 to move the application by a movement length.

The window manager module 430 corresponds to an object managing information on a position to which the application has been moved, which manages a page and information on a position where each application is executed.

A display operation using the home execution space 300 and the application execution space 200 can be performed through the above described application framework 400.

Figure 5A:
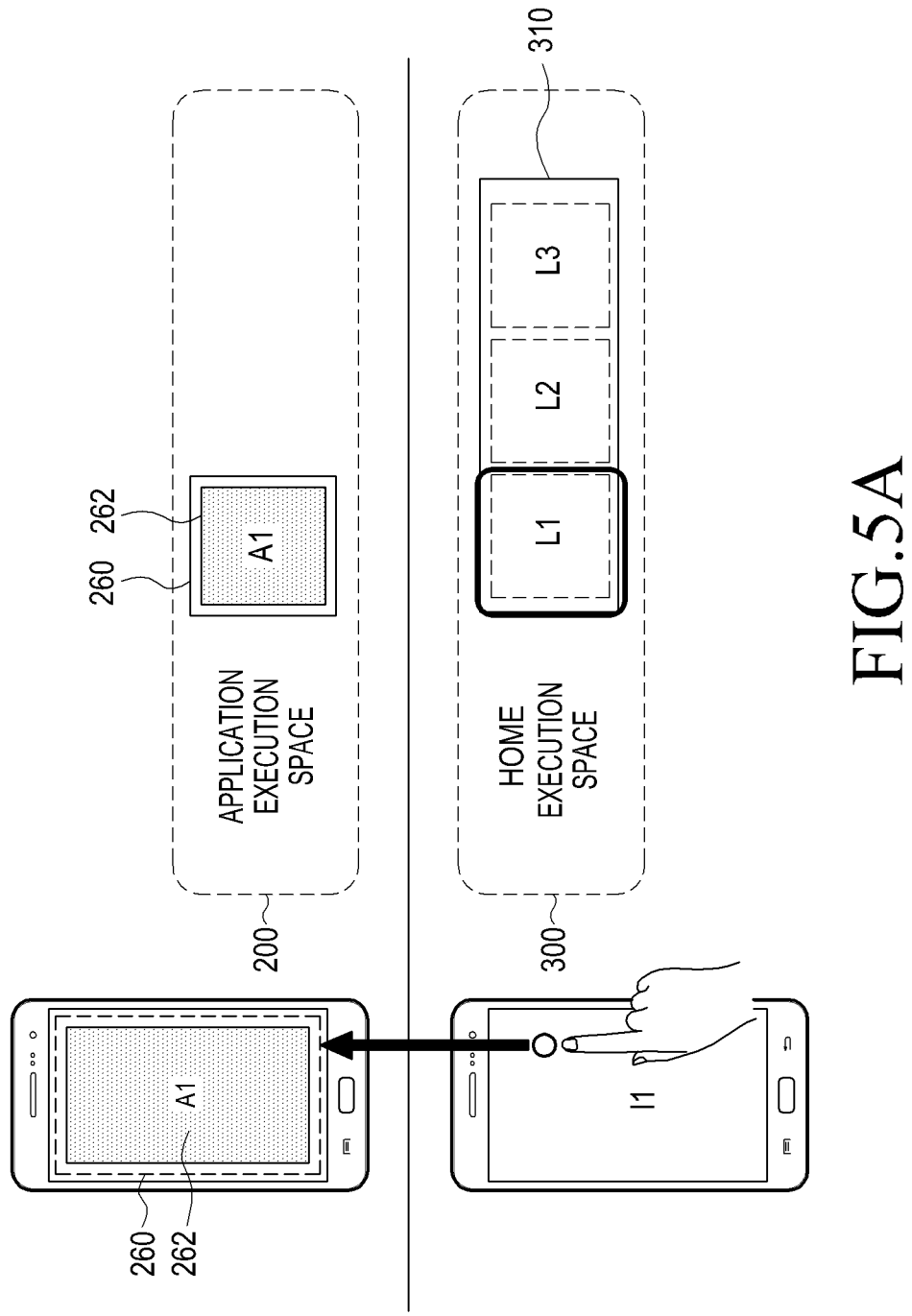
FIG. 5A is a diagram illustrating a method of executing an application in a home execution space according to an embodiment of the present disclosure.
Figure 5B:
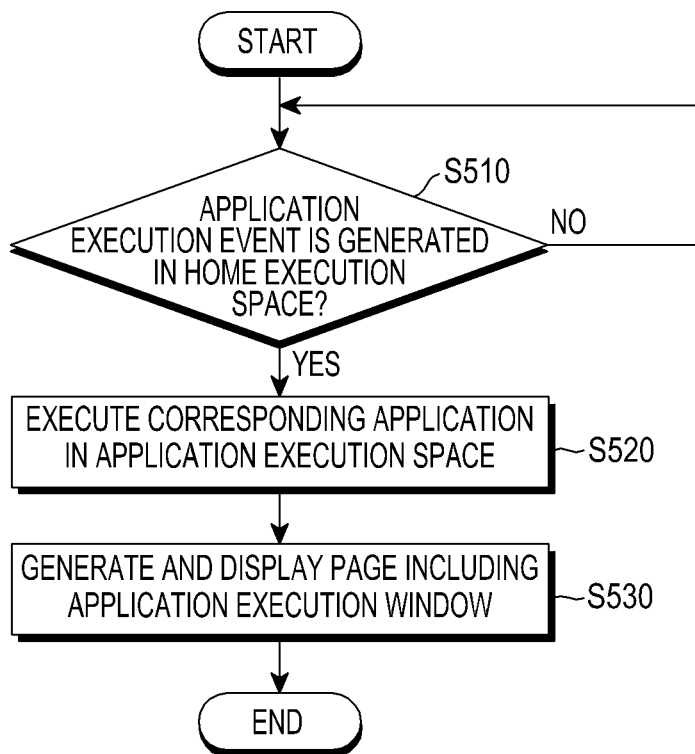
FIG. 5B is a flowchart illustrating a process of executing an application in a home execution space according to an embodiment of the present disclosure.

FIG. 5A is a diagram describing a method of executing an application in a home execution space according to an embodiment of the present disclosure, and FIG. 5B is a flowchart illustrating a process of executing an application in a home execution space according to an embodiment of the present disclosure.

Referring to FIGS. 5A and 5B, the display device 100 determines whether an application execution event by the user is generated in a state where the launcher screen 310 using the home execution space 300 is displayed in operation S510.

The display device 100 may execute the application according to the generation of the application execution event by the user in the state where the launcher screen 310 using the home execution space 300 is displayed. The launcher screen 310 may have one view corresponding to a size of the touch screen 190 or may be divided into a plurality of views L1, L2, and L3 when the launcher screen 310 is larger than the touch screen 190. Only one view L1 of the plurality of views may be displayed on the touch screen 190.

The user may generate the application execution event by using an icon for executing the application in the view L1 of the launcher screen 130, by selecting the application from recently executed application lists (Recent apps), or by selecting the application from a predetermined tray.

When the application execution event is generated in the home execution space 300, the display device 100 executes the corresponding application A1 in the application execution space 200 in operation S520. The display device 100 generates and displays a page 260 including an application execution window 262 in the application execution space 200 in operation S530.

Figure 6A:
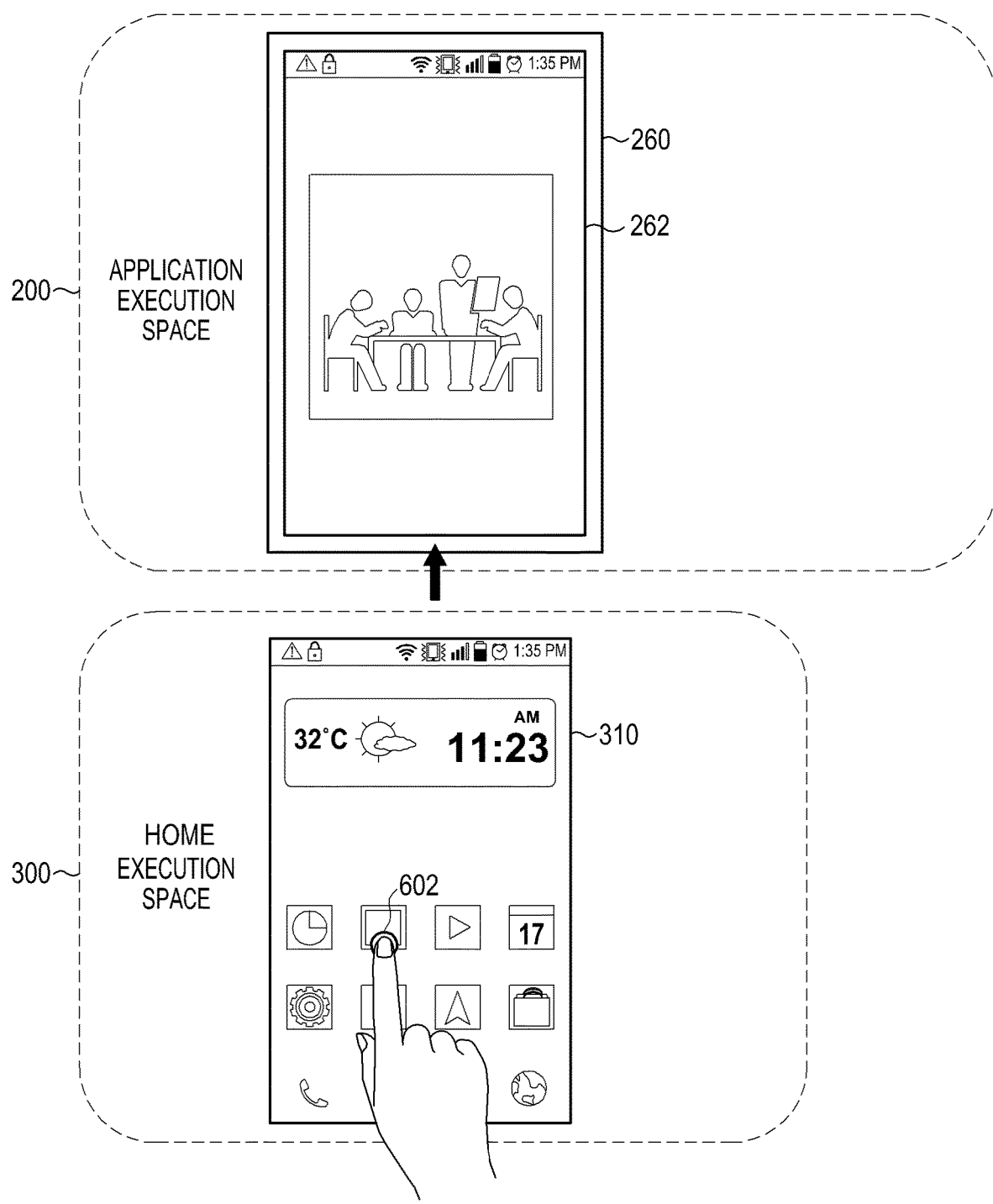
FIGS. 6A and 6B illustrate a process of executing an application in a launcher screen according to an embodiment of the present disclosure.
Figure 6B:
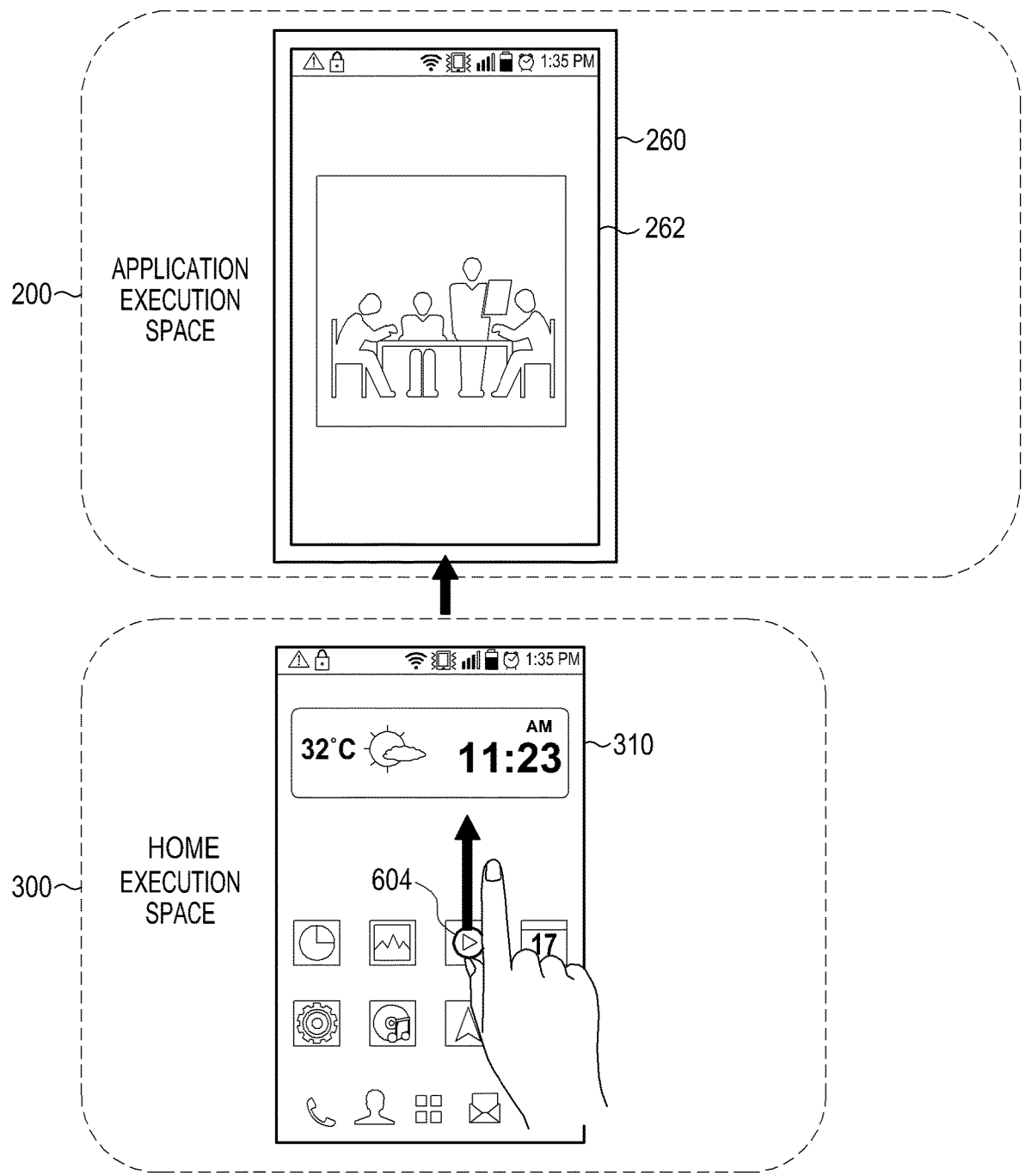

FIGS. 6A and 6B illustrate a process of executing an application in a launcher screen according to an embodiment of the present disclosure.

Referring to FIG. 6A, when an icon 602 corresponding to the application which is desired to be executed by the user is touched on the launcher screen 310 generated and displayed using the home execution space 300, the corresponding application is executed in the application execution space 200 and thus the page 260 including the application execution window 262 may be generated.

Referring to FIG. 6B, when an icon corresponding to the application which is desired to be executed by the user is selected from the launcher screen 310 generated and displayed using the home execution space 300 and then dragged in a predetermined direction (for example, a top, bottom, left, or right direction), the corresponding application is executed in the application execution space 200 and thus the page 260 including the application execution window 262 may be generated. An embodiment of the present disclosure illustrates a case where, when the icon 604 is touched and then dragged in a top direction, the corresponding application is executed in a space corresponding to the top direction of the application execution space 200.

In a recent application list 312, recently executed applications are arranged in an execution order or pages generated according to the recently executed applications are sequentially arranged.

Figure 7:
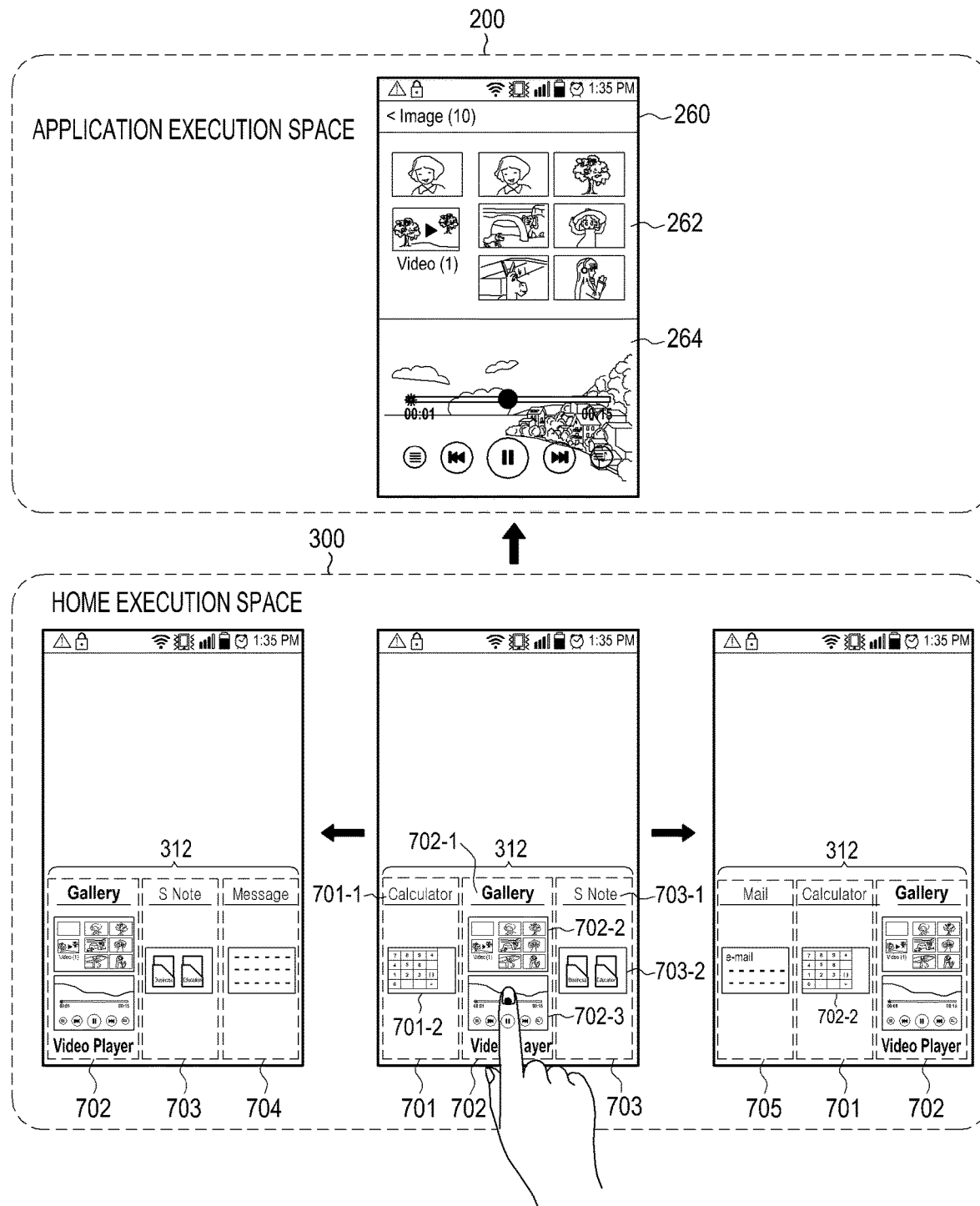
FIG. 7 illustrates a process of executing an application in a recent application list according to an embodiment of the present disclosure.

FIG. 7 illustrates an example of sequentially arranging recent pages according to an embodiment of the present disclosure.

Referring to FIG. 7, each page includes an application name and a thumbnail of one or a plurality of executed application execution windows. A recently executed application list includes a page 701 including a name 701-1 and a thumbnail 701-2 of a calculator application execution window, a page 702 including names 702-1 and 702-3 and thumbnails 702-2 and 702-4 of a video player application execution window, and a page 703 including a name 703-1 and a thumbnail 703-2 of an S note application execution window.

In the application execution window of each page, the application name, a border or underline displayed together with the application name, and the thumbnail may be displayed with different sizes, different colors, or different display schemes in order to distinguish whether the application execution window is in a resumed state or paused state. For example, a name of the application in the resumed state may be displayed with a first color, and a name of the application in the paused state may be displayed with a second color. The name or a border of the thumbnail of the application in the resumed state may be displayed with the first color, and the name or a border of the thumbnail of the application in the paused state may be displayed with the second color. For example, in FIG. 7, the application names 702-1 and 702-3 in the page 702 are displayed differently from the names 701-1 and 703-1 of the application windows in the paused state in the pages 701 and 703 in order to distinguish the page including the application window which is being executed from the pages in the paused state.

When the thumbnail of the application in the resumed state is selected through a touch input by the user, a page including a corresponding application execution window is generated and displayed by using the application execution space 200. When the thumbnail of the application in the paused state is selected through a touch input by the user, a new page is generated by using the application execution space 200 and a corresponding application execution window is included in the generated page. At this time, the paused state in the recent application list 312 is changed into the resumed state.

For example, referring to FIG. 7, when the thumbnail 702-2 of the gallery application execution window included in the page 702 is touched by the user, the page 260 including the corresponding gallery application execution window 262 is generated and displayed by using the application execution space 200. At this time, the video player application execution window 264 included also in the page 260 may be displayed together.

Meanwhile, pages included in the recent application list 312 may be displayed after a movement according to a scroll request of the user. The scroll request may be made by a left or right drag input, or an up or down drag input. An embodiment of the present disclosure describes a case where the recent application list 312 moves according to the left or right drag input.

Specifically, when the user touches and then drags a screen in a left direction in FIG. 7, the recent application list 312 is moved in the left direction, the page located in a left side disappears, and a next page 704 located in a right side appears as illustrated in FIG. 7. When the user touches and then drags a screen in a right direction in FIG. 7, the recent application list 312 is moved in the right direction, the page 703 located in a right side disappears, and a previous page 705 located in a left side appears.

Accordingly, the user can easily identify and control the pages of the application execution space 200 even in the home execution space 300 by using the recent application list 312.

FIGS. 8A to 8D illustrate a process of executing an application from a tray according to an embodiment of the present disclosure.

Figure 8A:
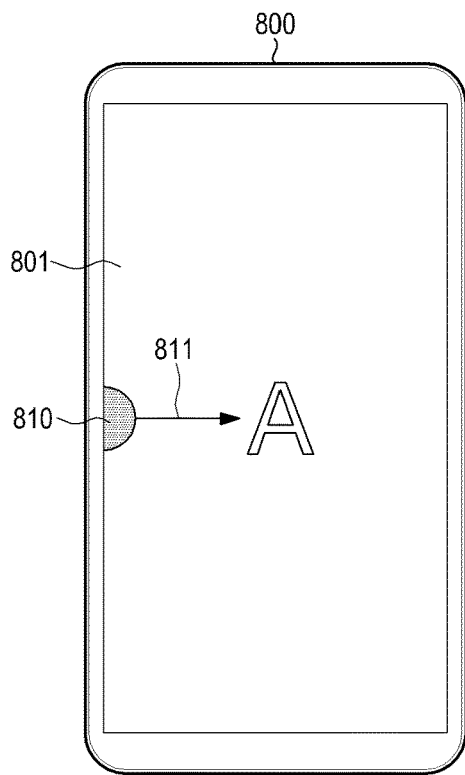
FIGS. 8A, 8B, 8C, and 8D illustrate a process of executing an application from a tray according to an embodiment of the present disclosure.

Referring to FIG. 8A, a display device 800 displays a first window 801 executing a first application A. The display device 800 may display a tray call button 810 at a left center of the first window 801. The tray call button 810 has a semicircle shape. When the tray call button 810 is touched, the tray opens in a right direction, which matches a users' intuition. However, it may be easily understood by those skilled in the art that the tray call button 810 may have any shape. The user can call the tray by touching the tray call button 810 or inputting a drag gesture 811 in a right direction. Since the tray call button 810 calls the application list, the tray call button 810 may be more generally named an application list call button.

Figure 8B:
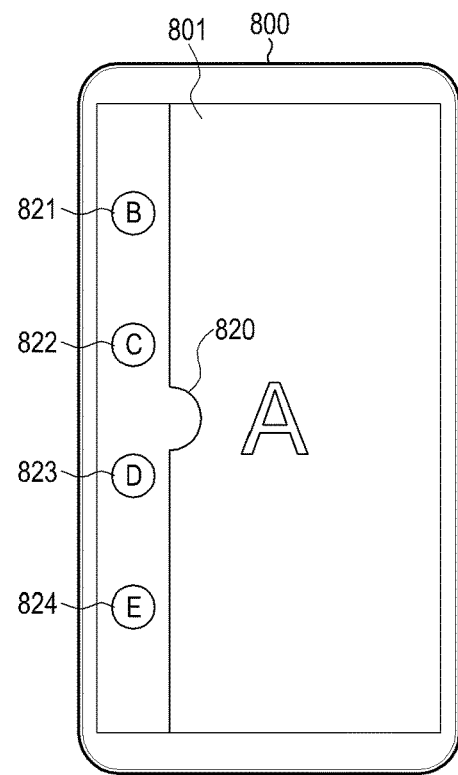

FIG. 8B illustrates a called tray. In response to a tray call command such as the touch or drag of the tray call button, a controller (not shown) controls to display a tray 820 displaying a list of executable applications. The controller (not shown) controls to display thumbnail images 821, 822, 823, and 824 of the executable applications on the tray 820. The controller (not shown) may control to display all applications stored in a storage unit (not shown) on the tray 820. Alternatively, the controller (not shown) may identify attributes of the stored application and control to display an application which can operate in a multi window mode on the tray 820. The tray 820 also may be more generally named an application list.

Figure 8C:
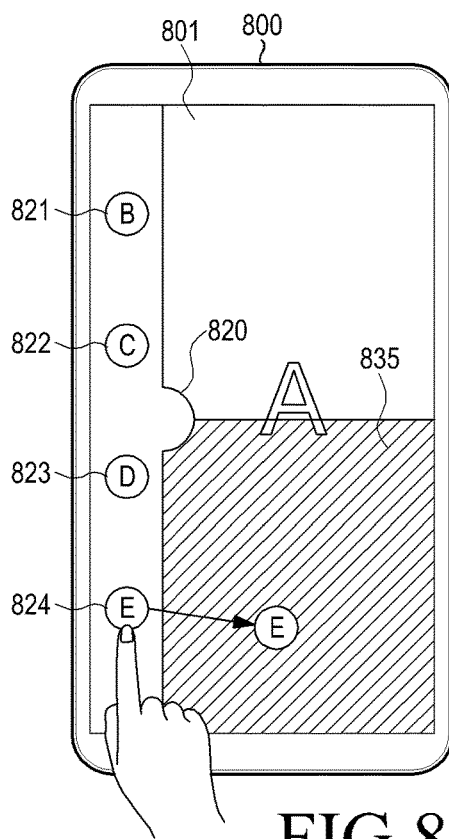
Figure 8D:
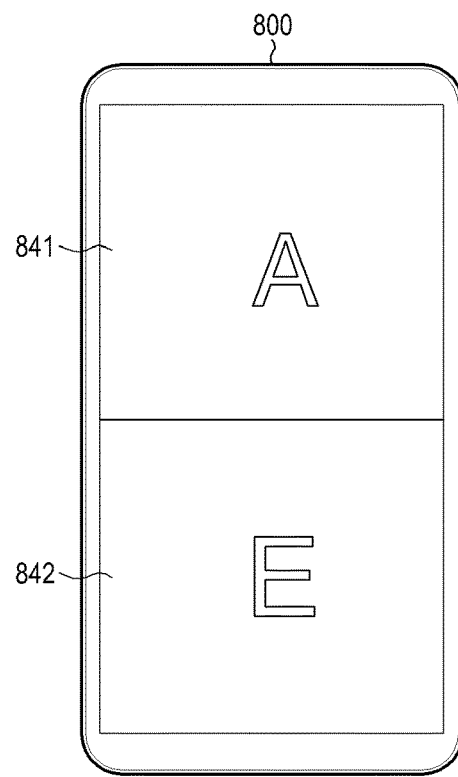

After touching an application desired to be executed, for example, a fifth application E, the user may input a drag gesture 830 toward an area 835 in which the user desires to execute the application. Referring to FIG. 8C, when the user inputs the drag gesture 830 toward the area 835 in which the user desires to execute the application, the controller (not shown) changes a color or brightness of the area in which the application can be executed. Accordingly, the user may identify a shape of the window to be executed in the area 835 in which the user desires to execute the application before a final execution of the application, which may be named a ghost-view.

The user may stop the drag input 830 in the area 835 in which the user desires to execute the application. The gesture may be named a drag and drop. When the area 835 in which the user desires to execute the application is determined, the display device 800 reduces a first window 841 executing the first application A and displays the reduced first window 841 on the upper half of an entire screen, and displays a fifth window 842 executing the fifth application E on the lower half. As described above, displaying the two windows 841 and 842 not to overlap each other may be named a split mode, which will be described below in more detail.

Figure 9A:
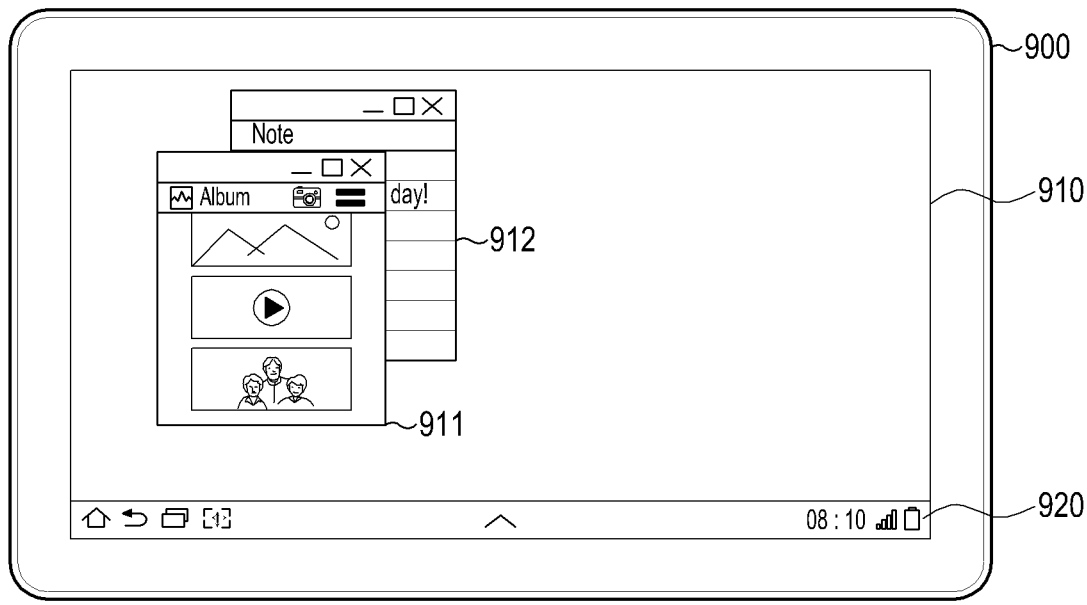
FIGS. 9A and 9B illustrate a freestyle mode and a split mode according to an embodiment of the present disclosure.
Figure 9B:
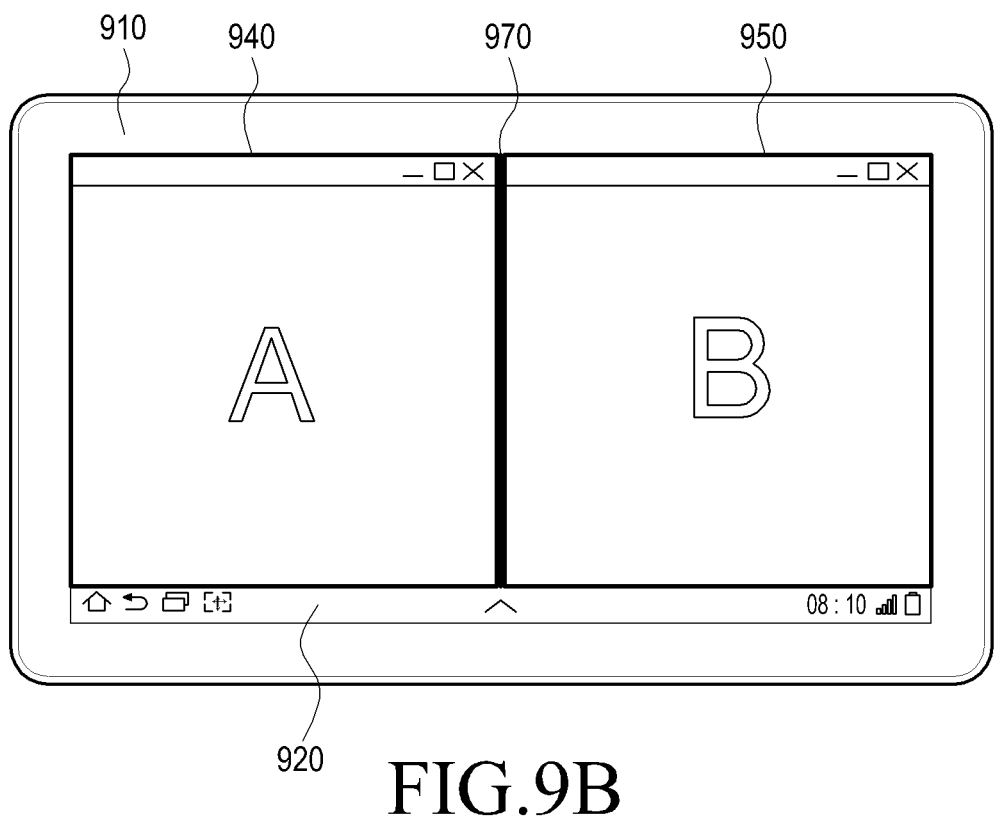

FIGS. 9A and 9B illustrate a freestyle mode and a split mode according to an embodiment of the present disclosure.

Referring to FIG. 9A, a display device 900 includes a touch screen 910. The touch screen 910 displays a plurality of windows 911 and 912. A lower bar 920 is displayed on a lower end of the touch screen 910. As described above, a display mode in which the plurality of windows 911 and 912 overlap each other based on a display order of each window may be named the freestyle mode.

The window may be an area including an execution screen of a particular application and a title bar and a control area of an executed application. Objects related to the application may be displayed on the application execution screen. The objects may have various shapes, such as text, a symbol, an icon, a button, a checkbox, a picture, a video, a web, a map, and the like. When the user touches the object, a function or an event predetermined for the object may be executed in a corresponding application. The object may be called a view according to an operating system. The title bar may include at least one control key for controlling a display of the window. For example, the control key may be a window display minimizing button, a window display maximizing button, or a window end button.

Applications are programs independently implemented by a manufacturer of the display device 900 or an application developer. Accordingly, a pre-execution of one application is not required to execute another application. Further, although one application ends, another application can be continuously executed.

The applications are distinguished from a complex function application (or dual application) generated by adding some functions (memo function and message transmission/reception function) provided by another application to functions of one application in that the applications are independently implemented programs. However, the complex function application is a single application newly produced to have various functions and thus has differences from conventional applications. Accordingly, the complex function application provides only limited functions without providing various functions unlike the conventional applications. Further, users have the burden of separately purchasing such a new complex function application.

The controller 110 controls such that a plurality of windows 911 and 912 are displayed to partially overlap each other. The controller 110 may assign a display order to each of the windows 911 and 912. For example, the controller 110 may assign a first display order to the window 911 and a second display order to the window 912. Accordingly, the controller 110 displays the window 911 having a relatively higher display order to cover the window 912. A part of the window 912 having a relatively lower display order which overlaps the window 911 having the relatively higher order is not displayed.

The controller 110 may assign a highest display order to a window into which a control event has been most recently input. For example, when the user touches the window 911, the controller 110 assigns the highest display order to the window 911.

FIG. 9B illustrates an example of displaying two applications on a main display screen 910 in the split mode. When the user executes a plurality of applications, a controller (not shown) may simultaneously execute the plurality of applications and display the applications on the main screen 910.

In the split mode, a first window 940 and a second window 950 may be displayed on the main screen 910 so as not to overlap each other. For example, as illustrated in FIG. 9B, when the main screen 910 is divided into two parts, the first window 940 may be displayed on the left half of the main screen 910 and the second window 950 may be displayed on the right half of the main screen 910. Although the first window 940 and the second window 950 are arranged close to each other while sharing a common boundary 970, they do not overlap each other. The common boundary 970 is located between the first window 940 and the second window 950.

Figure 10A:
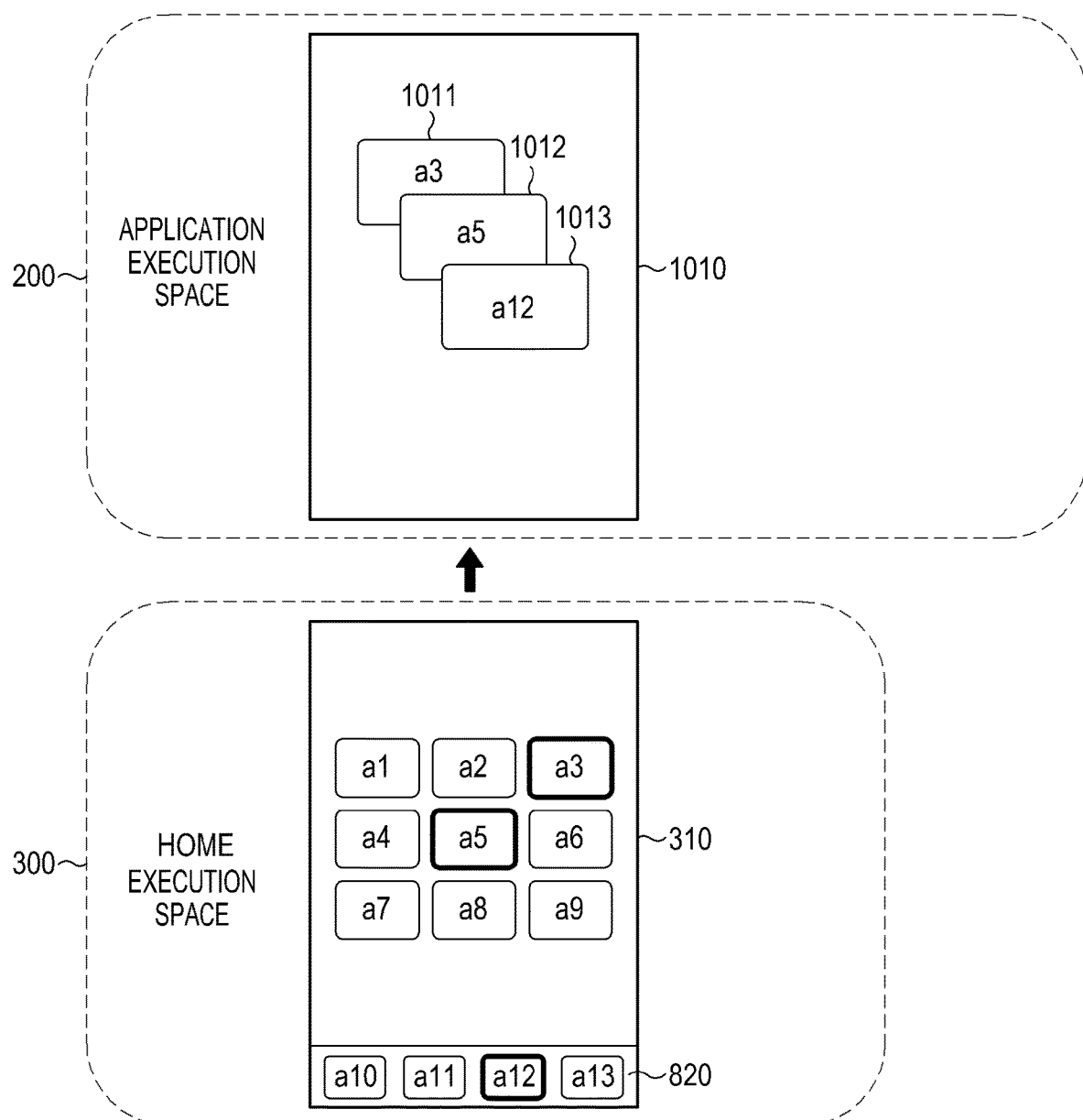
FIGS. 10A and 10B illustrate a process of executing a plurality of applications by a touch input of a user according to an embodiment of the present disclosure.
Figure 10B:
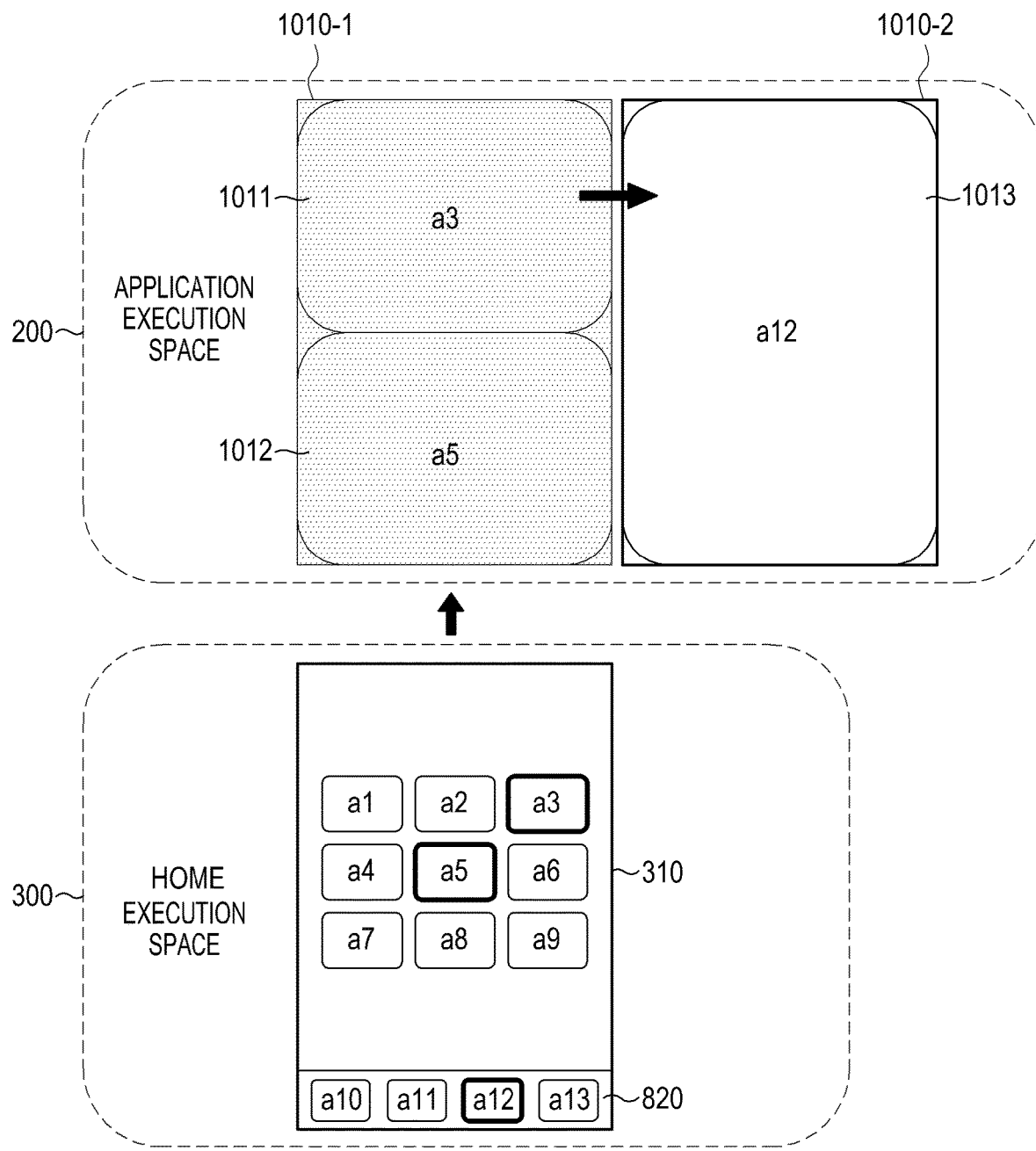

FIGS. 10A and 10B illustrate executing a plurality of applications through a touch input by the user according to an embodiment of the present disclosure.

FIG. 10A illustrates an embodiment of the present disclosure in which a plurality of applications are executed by a touch input of the user in the freestyle mode.

Referring to FIG. 10A, the display device 100 may display a plurality of application icons a1 to a9 and a tray 820 including a list of executable applications a10 to a13 on the launcher screen 310 by using the home execution space 300.

The display device 100 may execute the plurality of applications in the launcher screen 310 or the tray 820 according to a touch input of the user. As the user touches a plurality of applications, for example, first to third applications a3, a5, and a12, the display device 100 may execute each of the first to third applications a3, a5, and a12 in the application execution space 300. In the freestyle mode, the display device 100 may display all of a plurality of application execution windows, for example, all of first to third application execution windows 1011, 1012, and 1013 in a first page 1010.

FIG. 10B illustrates an embodiment of the present disclosure in which a plurality of applications are executed by a touch input of the user in the split mode.

Referring to FIG. 10B, in the split mode, the display device 100 may execute two application execution windows per page. When the applications a3, a5, and a12 are sequentially executed, the first and second application execution windows 1011 and 1012 may be executed together in a first page 1010-1 and the third application execution window 1013 may be executed in a second page 1010-2.

The case where the plurality of applications are executed by the user's touch input has been described in FIGS. 10A and 10B. According to another embodiment of the present disclosure, a plurality of applications may be executed according to a drag and drop input by the user.

Figure 11A:
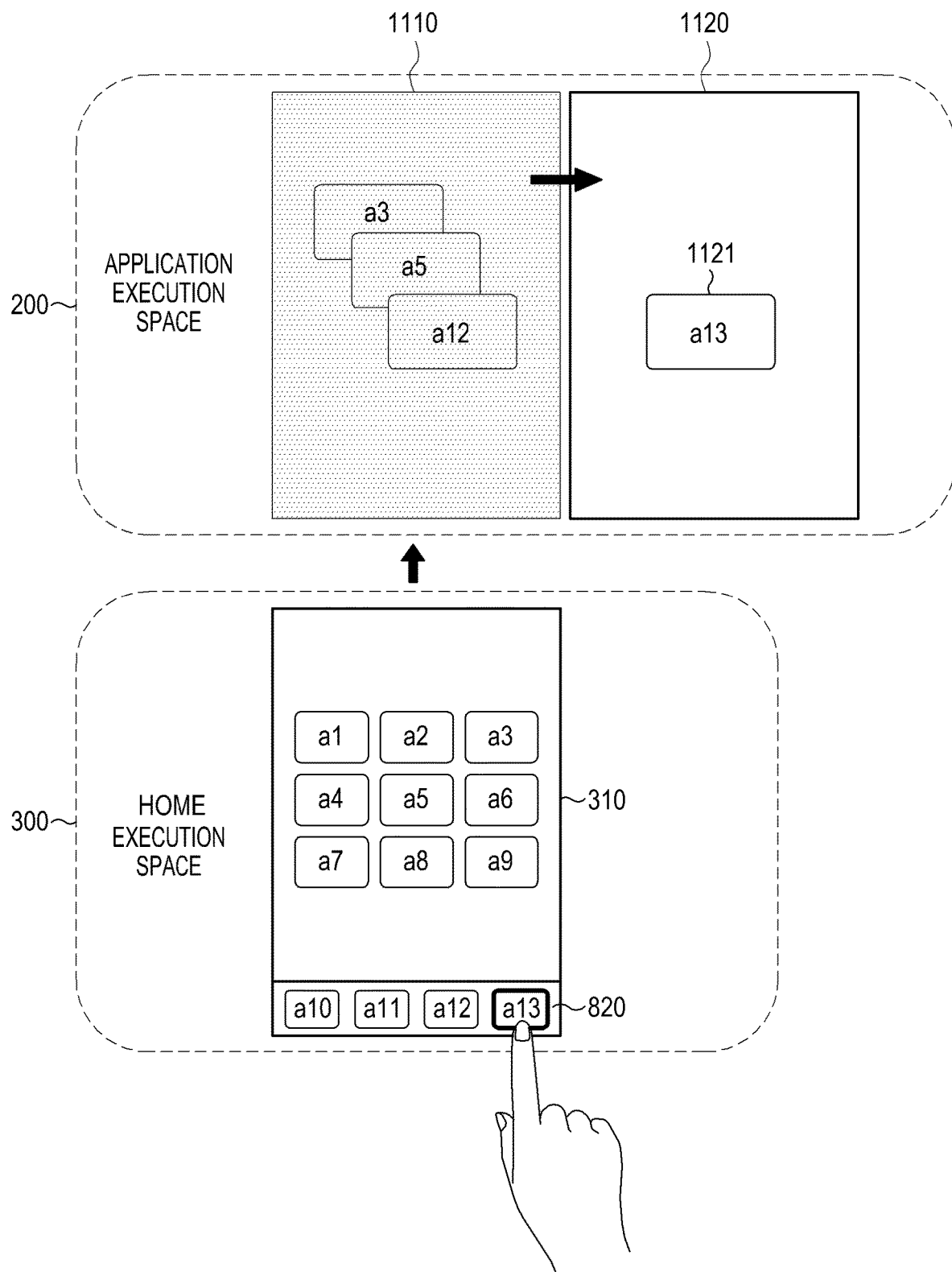
FIGS. 11A and 11B illustrate a process of executing a plurality of applications according a drag and drop input by a user according to an embodiment of the present disclosure.
Figure 11B:
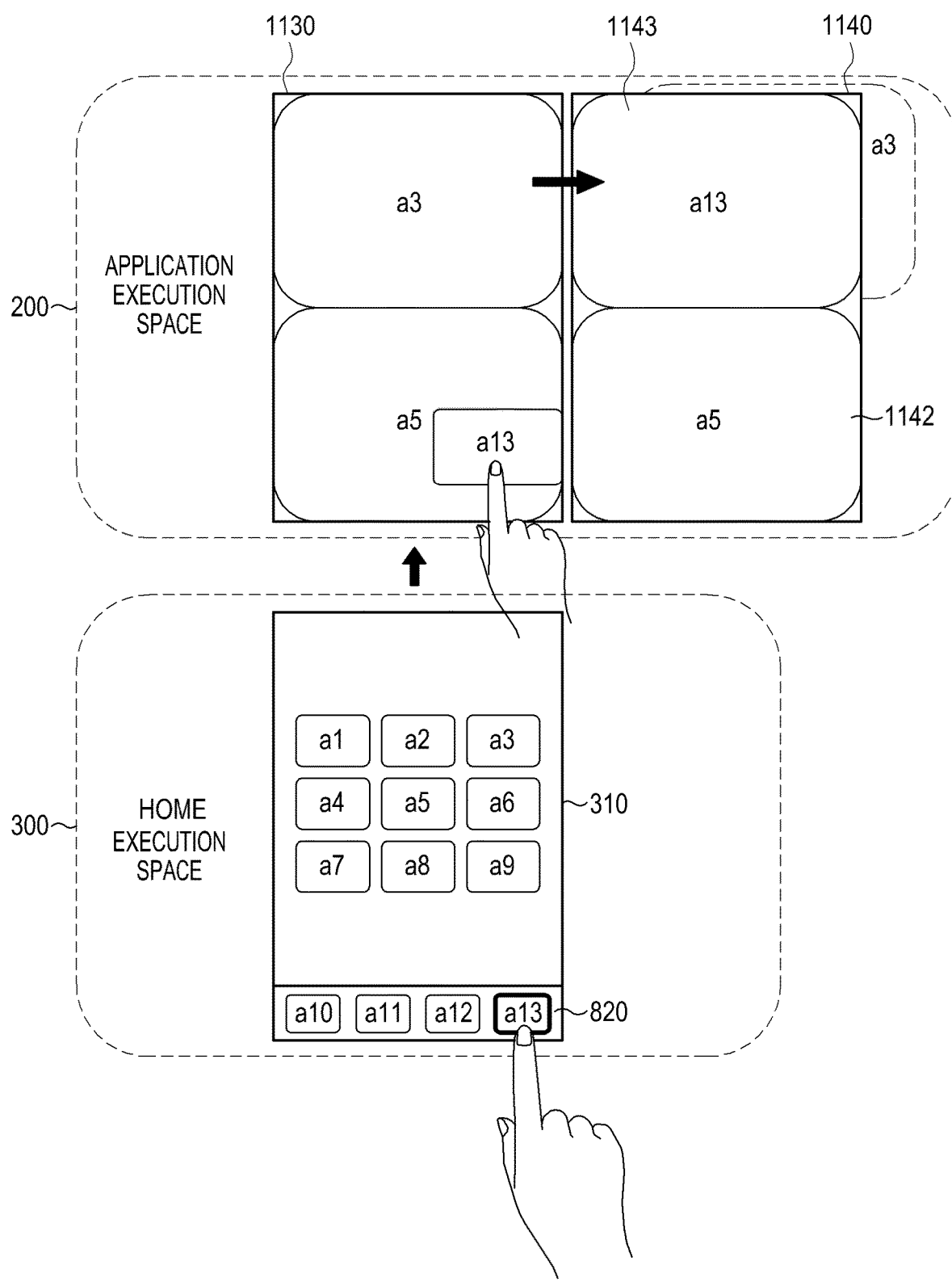

FIGS. 11A and 11B illustrate executing a plurality of applications according to a drag and drop input by the user according to an embodiment of the present disclosure.

Referring to FIG. 11A, an embodiment in which a plurality of applications are executed by a drag and drop input of the user in the freestyle mode is illustrated. The display device 100 may display a plurality of application icons a1 to a9 and a tray 820 including a list of executable applications a10 to a13 on the launcher screen 310 by using the home execution space 300. As the user drags and drops a fourth application a13 from the tray 820 to the application execution space 200 while a plurality of applications, for example, the first to third applications a3, a5, and a12, are executed in a first page 1110 by using the application execution space 200, the display device 100 may execute the fourth application a13 in a second page 1120 of the application execution space 300 to generate and display a fourth application execution window 1121.

Referring to FIG. 11B, an embodiment in which a plurality of applications are executed by a drag and drop of the user in the split mode is illustrated. While the first and second applications a3 and a5 are executed in a first page 1130 by using the application execution space 200, the third application a13 of the tray 820 is dragged and dropped to the application execution space 200 by the user. Accordingly, the third application a13 is executed in a second page 1140 of the application execution space 300 instead of the first application a3, and a second application execution window 1142 and a third application execution window 1143 may be generated and displayed.

As described above, while the application is executed in the application execution space 200 and the page including the corresponding application execution window is generated, a mutual switching display between the page including the application execution window and the launcher screen 310 of the home execution space 300 becomes possible.

FIGS. 12A to 12C illustrate mutual switching between a launcher screen of a home execution space and a page of an application execution space according to an embodiment of the present disclosure.

Referring to FIGS. 12A to 12C, the display device 100 executes a launcher L having first to third views L1, L2, and L3 by using the home execution space 300 and executes first to fourth applications A1, A2, A3, and A4 by using the application execution space 200. The first application A is executed in a first page P1, the second and third applications are executed in a second page P2, and the fourth application A4 is executed in a third page.

The display device 100 displays the first view L1 of the launcher L of the home execution space 300 on the touch screen 190 as illustrated in FIG. 12A, and then may switch the displayed first view L1 to the first page P1 of the application execution space 200 and display the switched first page P1 on the touch screen 190 according to generation of a display change event as illustrated in FIG. 12B. The display device 100 displays the first page P1 of the application execution space 20 on the touch screen 190 as illustrated in FIG. 12B, and then may switch the displayed first page P1 to the first view L1 of the launcher L of the home execution space 300 and display the switched first view L1 on the touch screen 190 according to generation of a display change event as illustrated in FIG. 12C. The display change event may be generated according to a gesture input by the user.

Figure 13A:
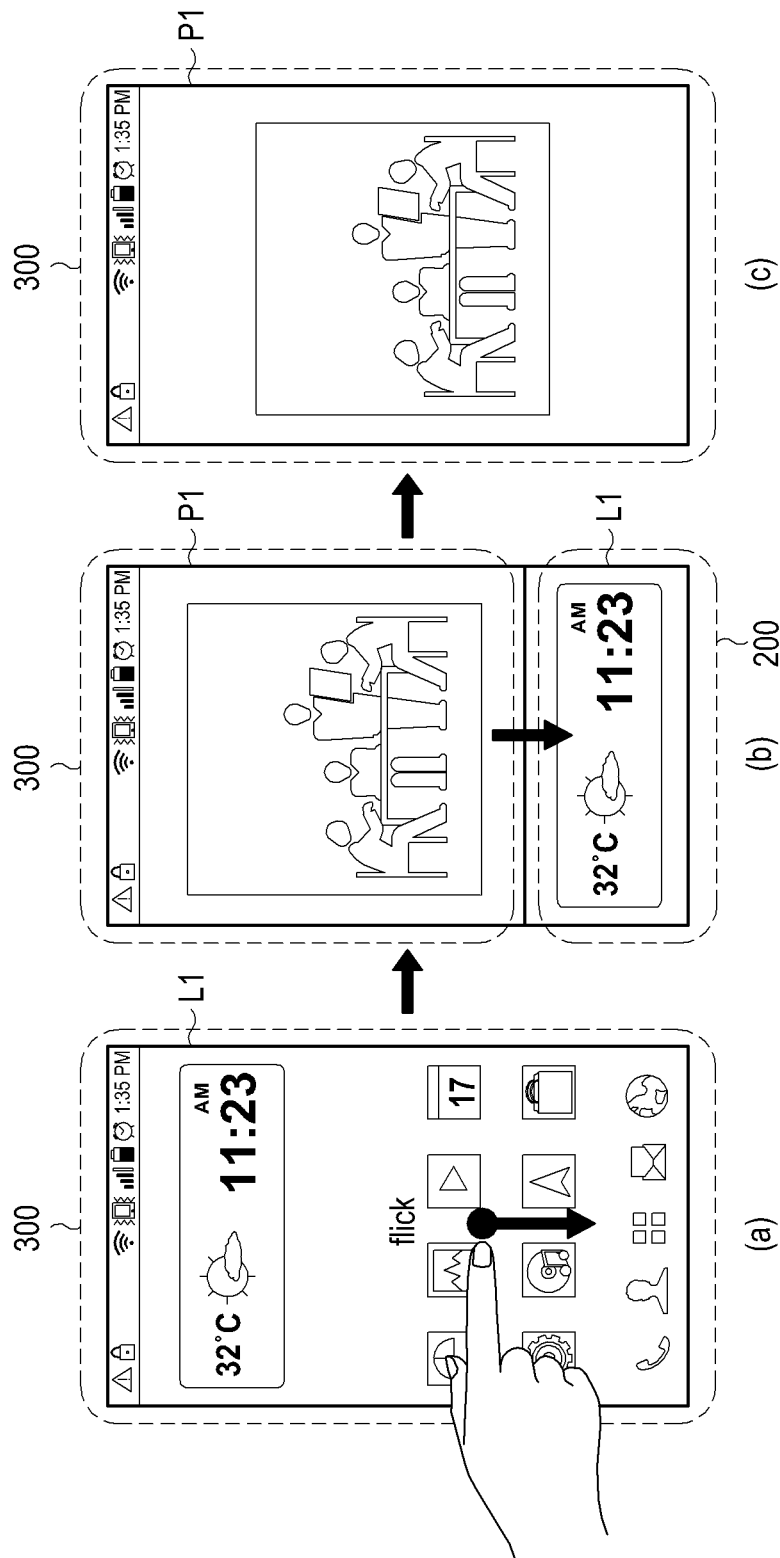
FIGS. 13A and 13B illustrate a case where a display change event is generated based on a gesture input according to an embodiment of the present disclosure.
Figure 13B:
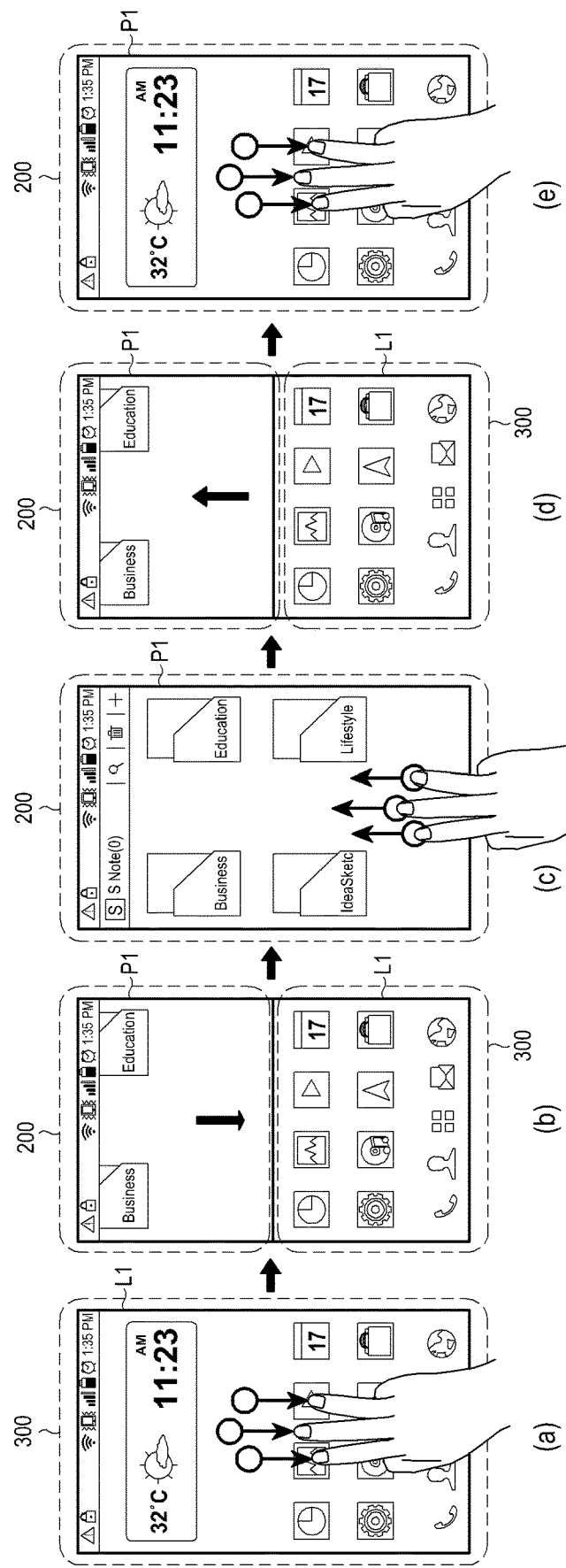

FIGS. 13A and 13B illustrate cases where a display change event is generated by a gesture input according to an embodiment of the present disclosure.

FIG. 13A illustrate a case where a display change event is generated by a flick of the user according to an embodiment of the present disclosure. Referring to FIG. 13A, as a gesture of flicking the first view L1 of the home screen in a bottom direction is input, the first page P1 of the application execution space may be displayed. This enables the user to recognize a concept that the application execution space exists in a higher level of the home screen, which matches a user's intuition. A widget displayed on an upper part of the first view L1 may be also displayed on a lower part of the first page P1 of the application execution space in (b) of FIG. 13A, but the widget may not be displayed in (c) of FIG. 13A. An animation effect may be created in which the first view L1 is switched to the first page P1.

FIG. 13B illustrate a case where a multi touch, for example, a 3-touch gesture input is used. Referring to (a) of FIG. 13B, as a gesture of multi-touching and then dragging the first view L1 of the home screen in a bottom direction is input, only the first page P1 of the application execution space may be displayed as illustrated in (b) and (c) of FIG. 13B. The same performance as that in (a) of FIG. 13A is executed in (b) and (c) of FIG. 13B, thereby creating the animation effect. In response to a gesture of multi-touching and then dragging the first page P1 of the application execution space in a top direction is input, the first view L1 of the home screen may be displayed as illustrated in (d) and (e) FIG. 13B.

Further, switching from the launcher screen 310 of the home execution space 300 to the page of the application execution space 200 may be made according to a page selection on a minimap.

Figure 14B:
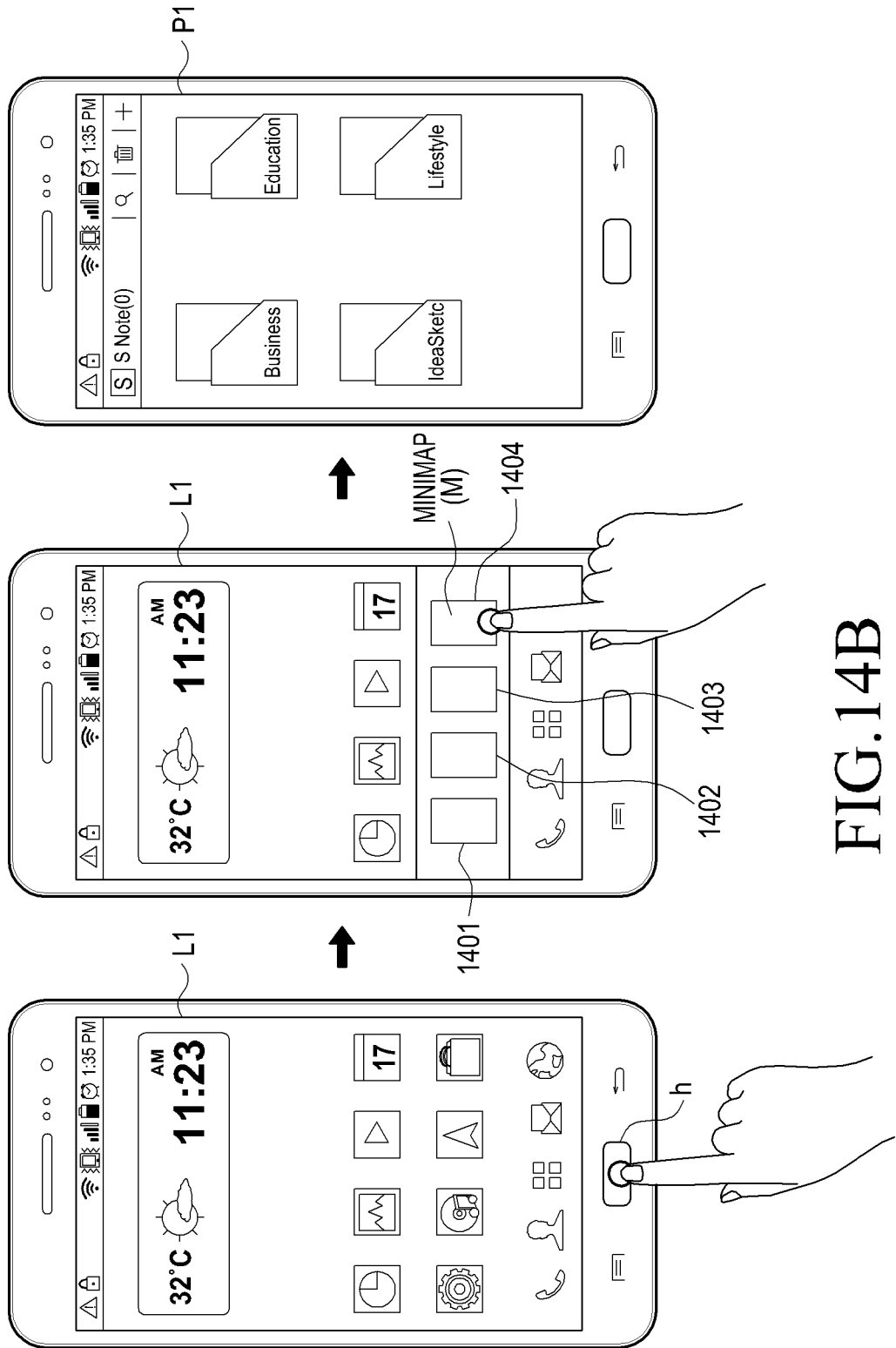

FIGS. 14A and 14B illustrate cases where a display change event is generated according to a page selection on a minimap according to an embodiment of the present disclosure.

Referring to FIG. 14A, when a background area of the first view L1 is pressed by the user for a predetermined time or longer (i.e., a long press is input) while the first view L1 of the launcher L of the home execution space 300 is displayed on the touch screen 190, a minimap M for currently executed applications may be displayed on the first view L1 of the launcher L. For example, thumbnails 1401 to 1404 indicating pages corresponding to the currently executed applications, respectively may be displayed on the minimap M. The user may select the thumbnail 1404 which the user desires to switch from the thumbnails 1401 to 1404 displayed on the minimap M. When the thumbnail 1404 is selected by the user, the display device 100 switches the first view L1 displayed on the touch screen 190 to the first page P1 of the application execution space 200 corresponding to the selected thumbnail and displays the switched first page P1.

Referring to FIG. 14B, when a predetermined button such as a home button h is pressed by the user while the first view L1 of the launcher L of the home execution space 300 is displayed on the touch screen 190, a minimap M for currently executed applications may be displayed on the first view L1 of the launcher L. The user may select the thumbnail 1404 which the user desires to switch from the thumbnails 1401 to 1404 displayed on the minimap M. When the thumbnail 1404 is selected by the user, the display device 100 switches the first view L1 displayed on the touch screen 190 to the first page P1 of the application execution space 200 corresponding to the selected thumbnail and displays the switched first page P1.

FIG. 15 illustrates an execution of a minimap by a user's gesture according to an embodiment of the present disclosure.

Referring to FIG. 15, the controller 110 may distinguishably define a home screen space 1402 and an application execution space 1401. A launcher screen 1420 of at least one executable application may be displayed on the home screen space 1402. A minimap 1410 for currently executed applications may be displayed on a lower end of the launcher screen 1420. For example, the display device controls to display a thumbnail of a currently executed first application 1411, a thumbnail of a second application 1412, and a thumbnail of a third application 1413 on the minimap 1410 of the home screen space 1402. Meanwhile, it may be identified even in the application execution space 1401 that the first application 1411, the second application 1412, and the third application 1413 are being executed. Further, it may be identified in the minimap defined in the application execution space that the first, second, and third applications are executed.

The user 10 desires to additionally execute a fourth application 1421, and accordingly, inputs a drag gesture from an icon of the fourth application 1421 to the minimap 1410. In order to execute the fourth application 1421 between the second application 1412 and the third application 1413, the user 10 may input a drag gesture 1422 such that the icon of the fourth application 1421 overlaps the thumbnail of the third application 1413.

The controller (not shown) may execute the fourth application 1421 in the same application execution space or an adjacent application execution space of the third application 1413 based on an execution input of the fourth application 1421. The controller (not shown) controls to display a window executing the fourth application 1421 based on a set mode.

For example, when the set mode is the freestyle mode, the controller (not shown) controls to display a window 1442 executing the fourth application 1421 to overlap a window 1441 executing the third application 1413. In this case, the controller (not shown) controls to display the window 1442 executing the fourth application 1421 in the same application workspace 1440 as that of the window 1441 executing the third application 1413.

When the set mode is the split mode, the controller 110 controls to display a window 1452 executing the fourth application 1421 and a window 1451 executing the third application 1413 in the split mode. In this case, the controller (not shown) controls to display the window 1452 executing the fourth application 1421 in the same application workspace 1450 as that of the window 1451 executing the third application 1413.

When the set mode is a full screen mode, the controller 110 controls to display a window 1461 executing the fourth application 1421 close to a window 1462 executing the third application 1413. In this case, the controller 110 controls to display the window 1461 executing the fourth application 1421 and the window 1462 executing the third application 1413 in different application workspaces.

As described above, the controller (not shown) may control to generate and display windows executing applications in various ways according to the set mode.

FIGS. 16A to 16C illustrate a concept describing a method of displaying switching between views in a home execution space according to an embodiment of the present disclosure.

Referring to FIGS. 16A to 16C, the display device 100 executes the launcher L having the first to third view L1, L2, and L3 by using the home execution space 300. As a view switching event by the user is generated while the second view L2 of the launcher L of the home execution space 300 is displayed on the touch screen 190 as illustrated in FIG. 16B, the display device 100 may switch the second view L2 to the first view L1 and display the switched first view L1 on the touch screen 190 according to an input of, for example, an edge flick or a drag flick as illustrated in FIG. 16A. As the user inputs an edge flick or a drag flick while the second view L2 is displayed on the touch screen 190 as illustrated in FIG. 16B, the display device 100 may switch the second view L2 to the third view L3 and display the switched third view L3 on the touch screen as illustrated in FIG. 16C. The edge flick refers to a flick action generated in an edge of the view. For example, the flick action may be a flick action at a boundary between the second view L2 and the first view L1 or a flick action at a boundary between the second view L2 and the third view L3. The drag flick refers to a flick action after a drag. For example, the drag flick may be a flick action after a drag in a direction from the second view L2 to the first view L1 or a flick action after a drag in a direction from the second view L2 to the third view L3.

FIGS. 17A to 17C illustrate a method of displaying switching between pages in an application execution space according to an embodiment of the present disclosure.

Referring to FIGS. 17A to 17C, the display device 100 executes first to fourth applications A1, A2, A3, and A4 by using the application execution space 200. The first application A1 is executed in a first page P1, the second and third applications A2 and A3 are executed in a second page P2, and the fourth application A4 is executed in a third page P3.

When the second page P2 of the application execution space 200 is displayed on the touch screen 190 and then a user gesture input or a page switching event using a minimap or a recently executed application list is generated as illustrated in FIG. 17B, the display device 100 switches the second page P2 to the first page P1 and displays the switched first page P1 as illustrated in FIG. 17A or switches the second page P2 to the third page P3 and displays the switched third page P3 as illustrated in FIG. 17C.

First, a case where a user gesture input is used for switching between pages in the application execution space 200 according to an embodiment of the present disclosure will be described.

Figure 18B:
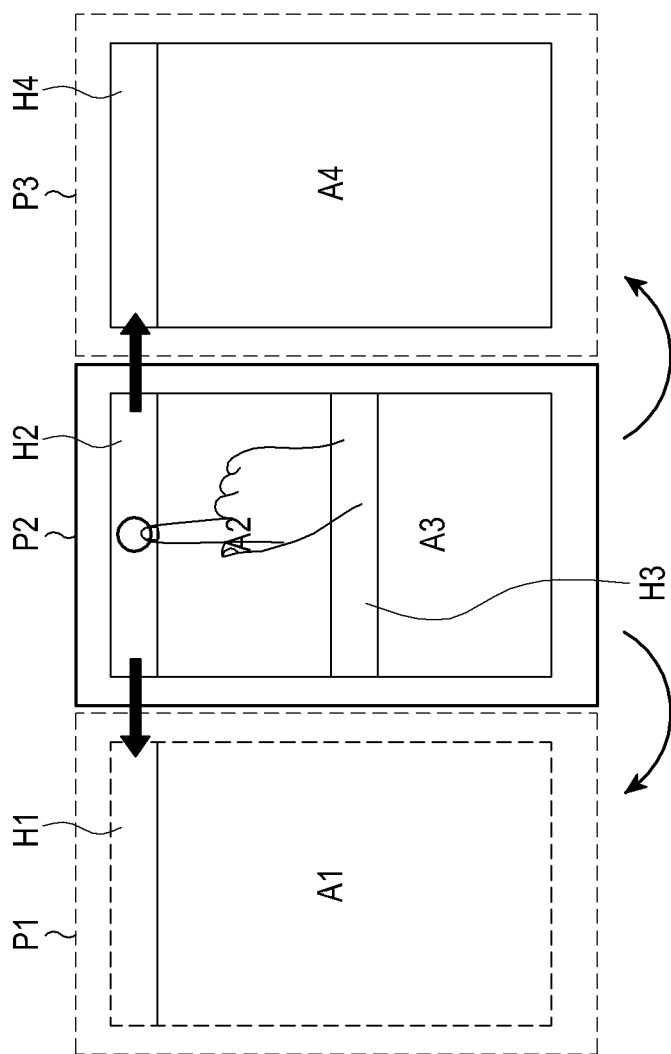
Figure 18C:
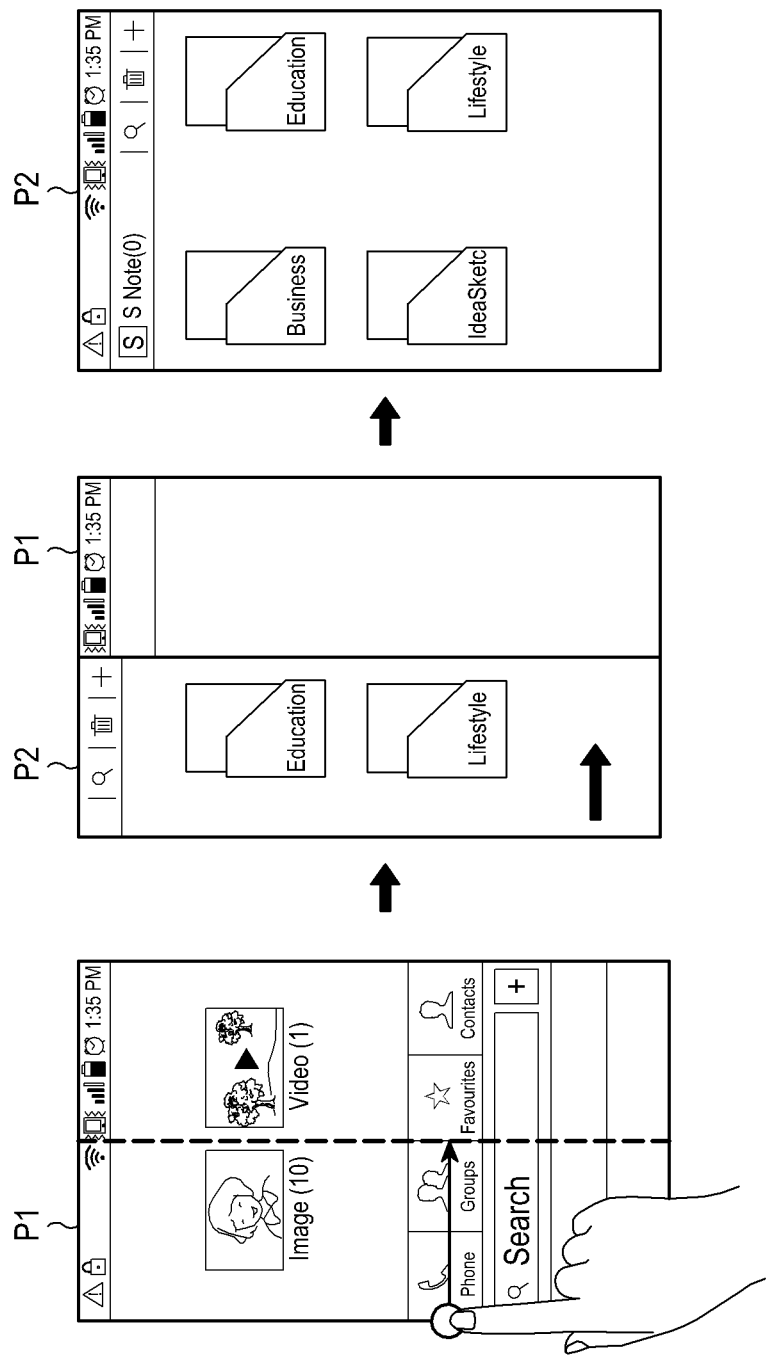

FIGS. 18A to 18C illustrate switching between pages in an application execution space according to a user gesture input according to an embodiment of the present disclosure.

Referring to FIG. 18A, a page is switched and then displayed in the application execution space 200 according to a flick input of the user. The flick refers to an action of very rapidly dragging by using a user's finger or a touch tool. The drag and the flick may be distinguished based on whether a movement speed of the finger or touch tool is faster than or equal to a threshold speed. As the user inputs an edge flick or a drag flick while the first page P1 is displayed on the touch screen 190, the display device 100 may switch the first page P1 to the second page P2 and display the switched second page P2. As the user inputs an edge flick or a drag flick while the third page P3 is displayed on the touch screen 190, the display device 100 may switch the third page P3 to the second page P2 and display the switched second page P2. The edge flick refers to a flick action generated at an edge of the page. For example, the edge flick may be a flick action at a boundary between the first page P1 and the second page P2 or a flick action at a boundary between the second page P2 and the third page P3. The drag flick refers to a flick action after a drag. For example, the drag flick may be a flick action after a drag in a direction from the first page P1 to the second page P2 or a flick action after a drag in a direction from the third page P3 to the second page P2.

Referring to FIG. 18B, a page may be switched and displayed in the application execution space 200 according to an input of a header flick by the user. The header flick refers to an action of very rapidly dragging a header part of the application execution window by using a user's finger or a touch tool. As the user inputs a header flick for a header part H2 of the execution window of the second application A2 included in the second page P2 in a direction of the first page P1 while the second page P2 is displayed on the touch screen 190, the display device 100 may switch the second page P2 to the first page P1 and display the switched first page P1. Further, as the user inputs a header flick for the header part H3 of the execution window of the second application A2 included in the second page P2 in a direction of the third page P3, the display device 100 may switch the second page P2 to the third page P3 and display the switched third page P3.

Referring to FIG. 18C, when the first page P1 is switched to the second page P2 and the switched second page P2 is displayed according to a flick input and a header flick input while the first page P1 is displayed, the flick input and the header flick input may execute a flick action for the half screen or more of the first page P1. When the flick input and the header flick is input for the half screen or more of the first page P1, the display device 100 switches the first page P1 to the second page P2 and displays the switched second page P2.

Figure 19:
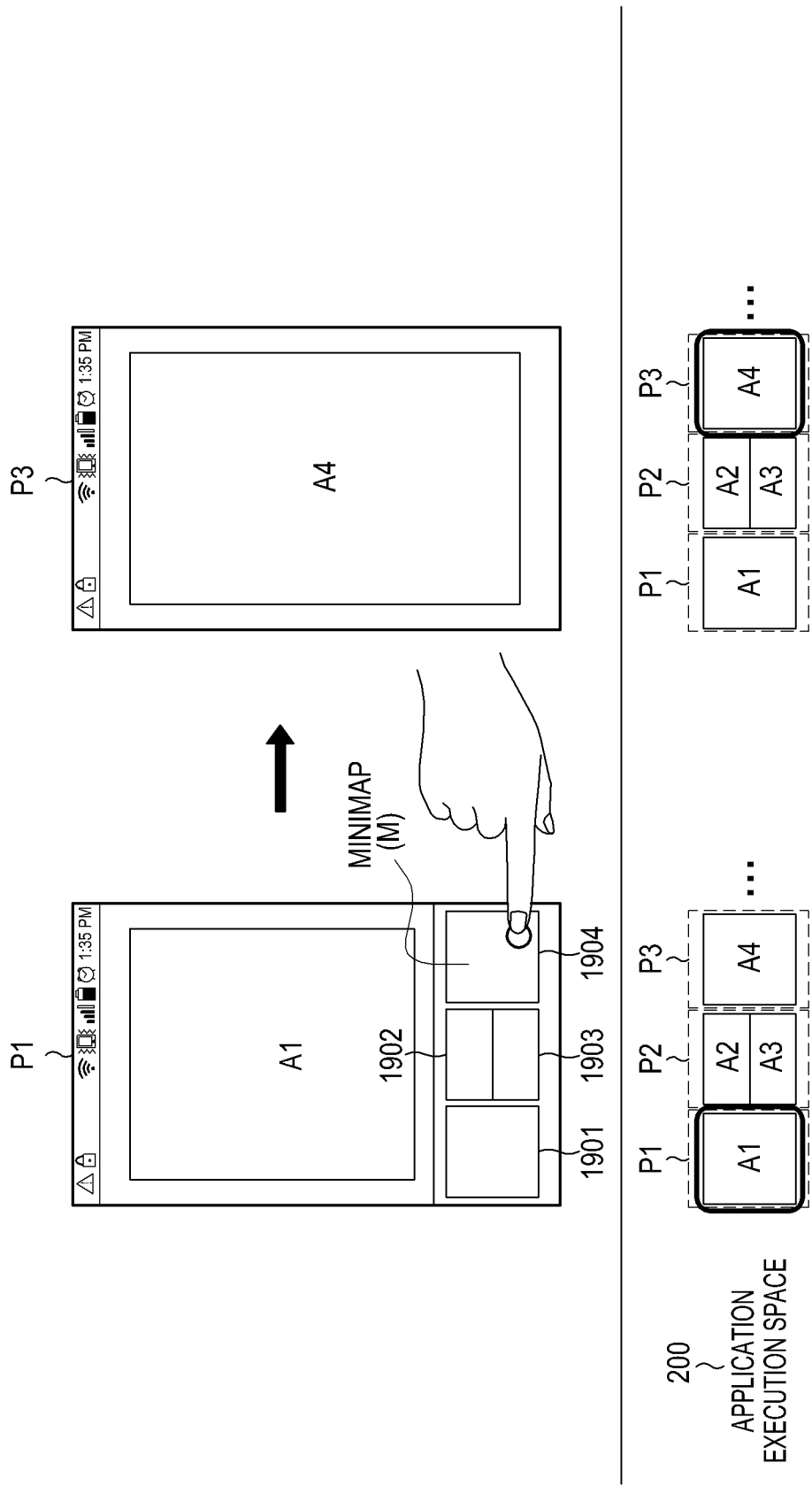
FIG. 19 illustrates switching between pages in an application execution space using a minimap according to an embodiment of the present disclosure.

FIG. 19 illustrates switching between pages in an application execution space by using a minimap according to an embodiment of the present disclosure.

Referring to FIG. 19, while the first page P1 of the application execution space 200 is displayed on the touch screen 190, a minimap M for currently executed applications may be displayed on a lower end of the first page P1. For example, thumbnails 1901 to 1904 indicating applications executed in the pages P1, P2, and P3 corresponding to the currently executed applications, respectively, may be displayed on the minimap M. The user may select the thumbnail 1904 which the user desires to switch from the thumbnails 1401 to 1404 displayed on the minimap M. When the thumbnail 1404 is selected by the user, the display device 100 switches the first page P1 displayed on the touch screen 190 to the third page P3 of the application execution space 200 corresponding to the selected thumbnail and displays the switched third page P3. A recently executed application list may be used for switching between the pages in the application execution space 200.

Figure 20:
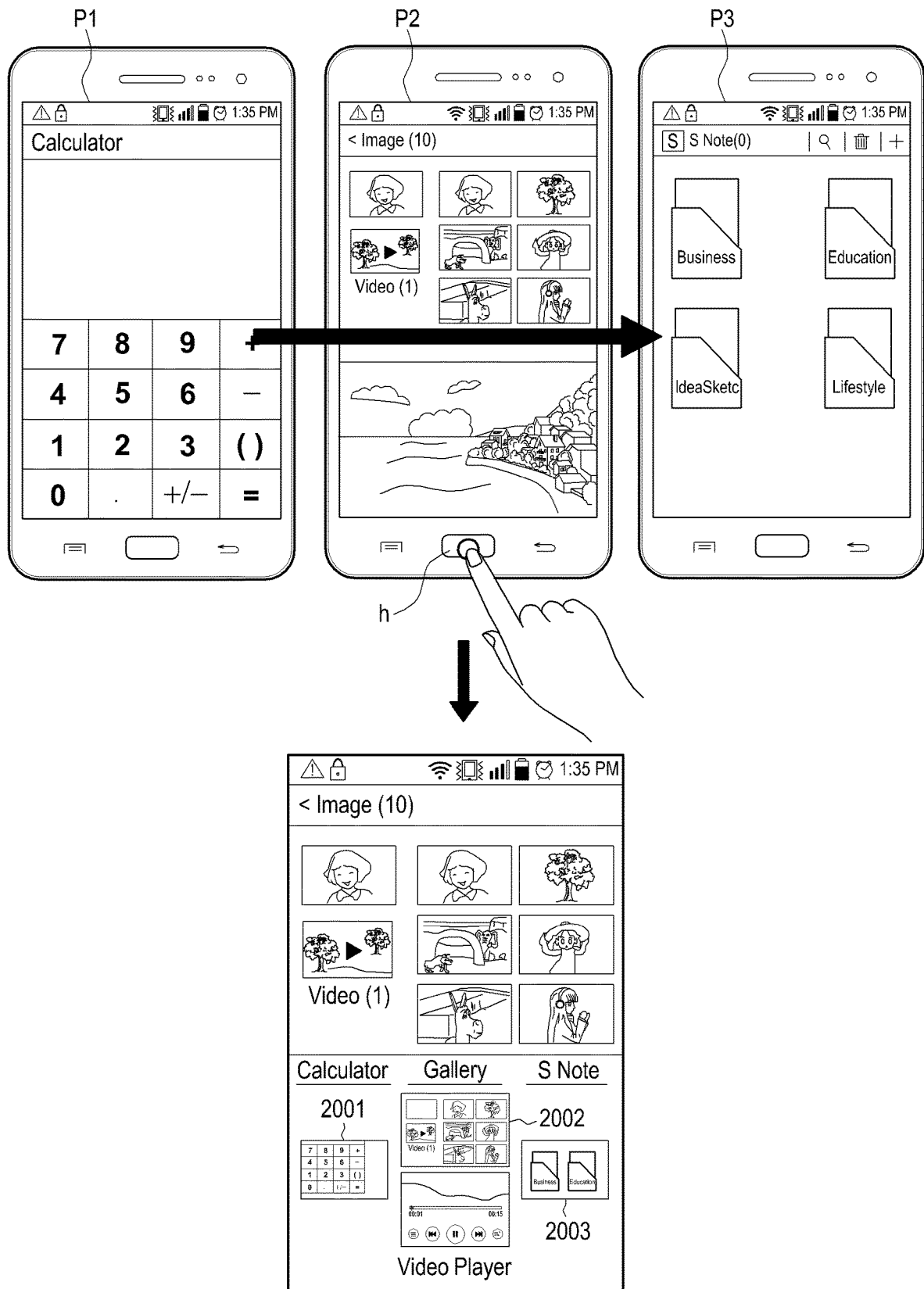
FIG. 20 illustrates switching between pages in an application execution space using a recently executed application list according to an embodiment of the present disclosure.

FIG. 20 illustrates switching between pages in an application execution space by using the recently executed application list according to an embodiment of the present disclosure.

Referring to FIG. 20, applications executed in the application execution space may be added to the recently executed application list in a page order. For example, when the user long presses a home button h while viewing the second page P2 of the application execution space 200, the recently executed application list (Recent App) may be displayed.

The recently executed application list (Recent App) may include thumbnails 2001, 2002, and 2003 of the currently executed applications included in each page. The user may select a thumbnail which the user desires to switch from the recently executed application list (Recent App) through a touch input to select a page. When the page is selected from the recently executed application list (Recent App), the display device 100 switches the second page P2 to the selected page and displays the selected page.

According to an embodiment of the present disclosure, each of a plurality of applications executed in the application execution space 200 may complete an application operation thereof or may end according to a user's request.

When one of the plurality of applications in the application execution space 200 ends, an execution space where the ended application had been executed is maintained, and only an application execution window corresponding to the ended application is deleted.

Figure 21A:
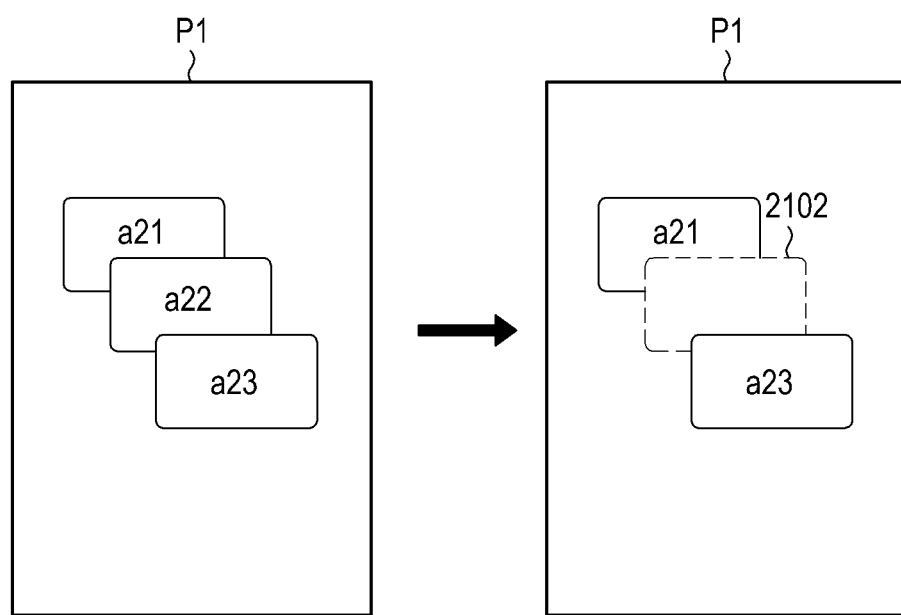
FIGS. 21A and 21B illustrate a procedures of processing an application execution window when an application ends according to an embodiment of the present disclosure.
Figure 21B:
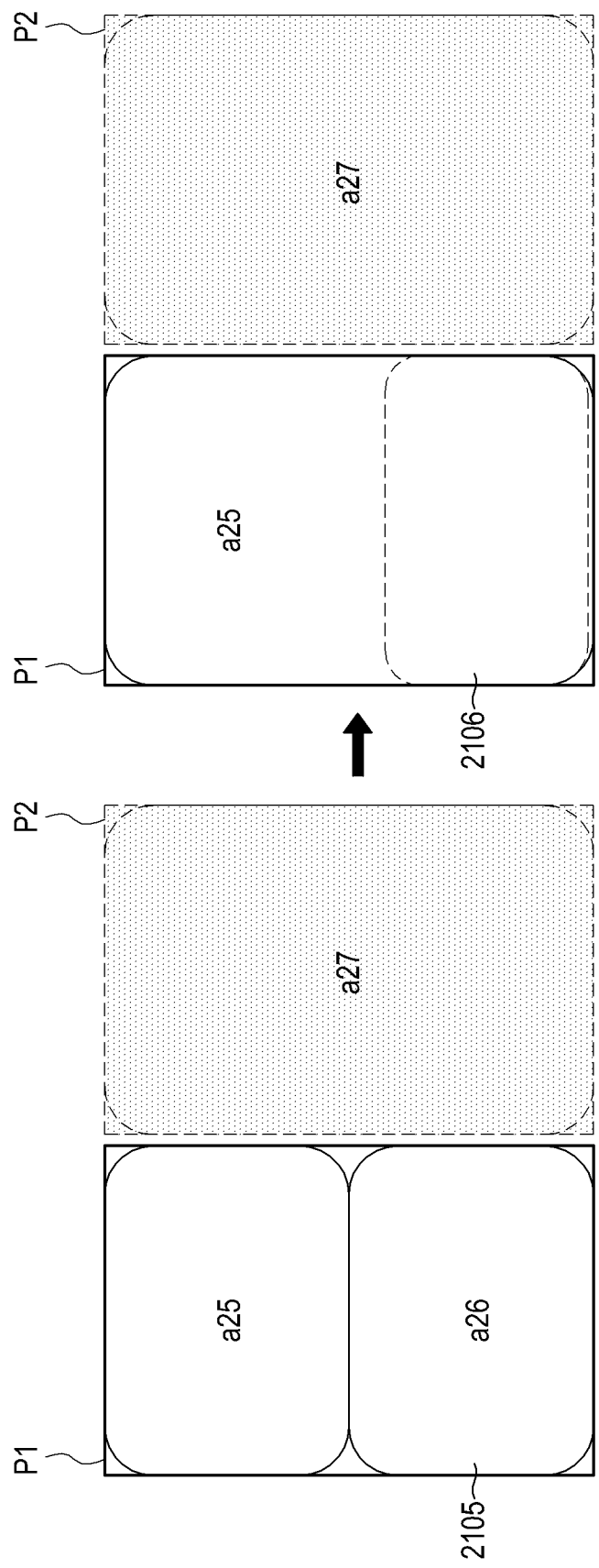

FIGS. 21A and 21B illustrate a procedure of processing an application execution window when an application ends according to an embodiment of the present disclosure.

FIG. 21A illustrates a case where one of a plurality of applications ends in the freestyle mode. For example, when one application a22 of a plurality of applications a21, a22, and a23 executed in the first page P1 ends in the freestyle mode, only an application execution window 2101 corresponding to the ended application is deleted and an execution space 2102 where the ended application had been executed is maintained.

FIG. 21B illustrates a case where one of a plurality of applications ends in the split mode. For example, when one application a26 of a plurality of applications a25, a26, and a27 executed in the first page P1 ends in the split mode, only an application execution window 2105 corresponding to the closed application is deleted and an execution space 2106 where the closed application had been executed is replaced with a window where the application a25 is being executed. For example, when one of two windows displayed in the split mode ends, the display device 100 may display the other window which has not ended in a full screen mode. However, the above description is only an example, and it may be understood by those skilled in the art that a configuration of maintaining a size of the other window which has not ended is also applicable.

Figure 22A:
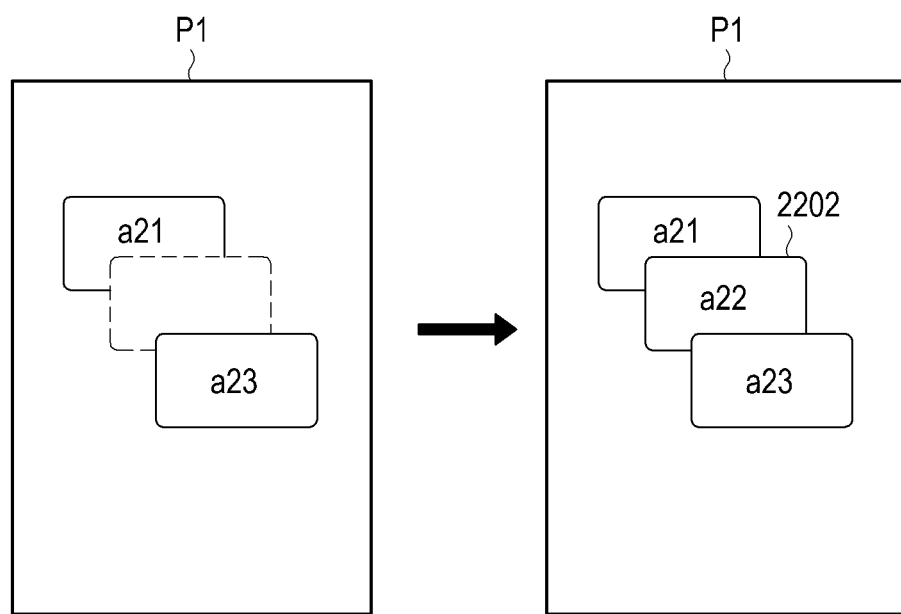
FIGS. 22A and 22B illustrate a procedure of processing an application execution window when an ended application is re-executed according to an embodiment of the present disclosure.
Figure 22B:
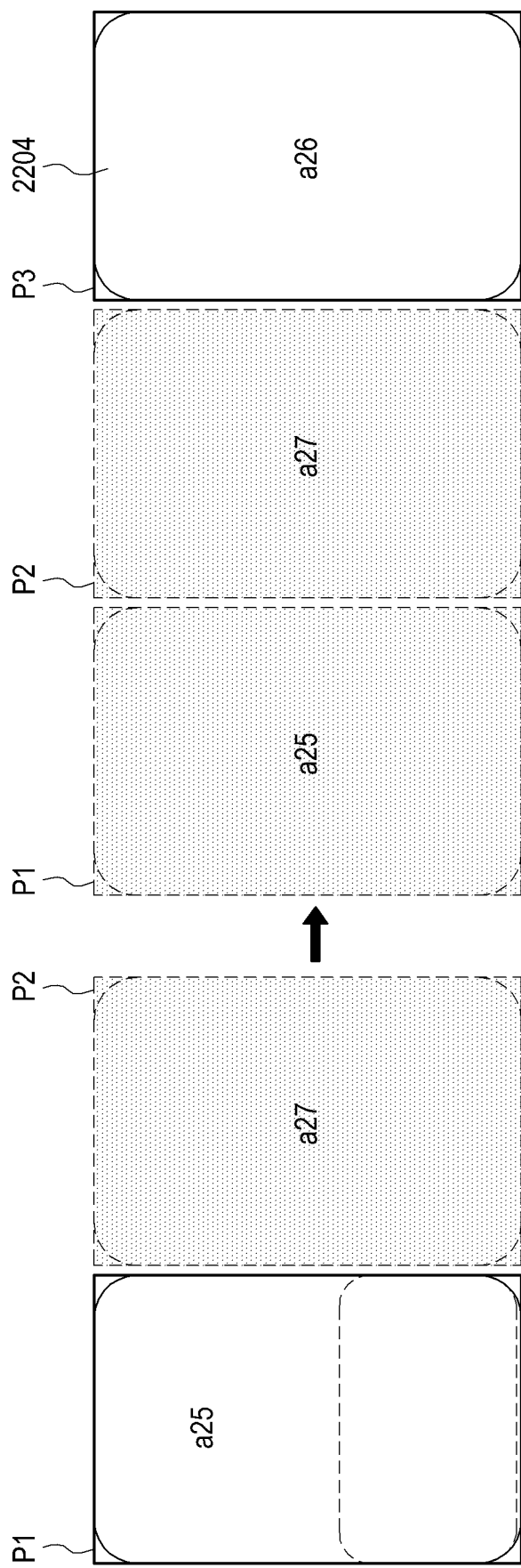

FIGS. 22A and 22B illustrate a procedure of processing the application execution window when the ended application restarts according to an embodiment of the present disclosure.

Referring to FIG. 22A, one of a plurality of applications ends and then restarts in a freestyle mode. For example, one application a22 of a plurality of applications a21, a22, and a23 executed in the first page P1 ends and then restarts in the freestyle mode. When the application a22 ends and then restarts, an application execution window 2202 corresponding to the restarted application a22 is executed on the first page P1 currently displayed on the touch screen 190.

Referring to FIG. 22B, one of a plurality of applications ends and then restarts in the split mode. For example, one application a26 of a plurality of applications a25 and a26 executed in the first page P1 ends and then restarts in the split mode. When the application a26 ends and then restarts, an application execution window 2204 corresponding to the restarted application a26 is executed on the third page P3 currently displayed on the touch screen 190.

According to an embodiment of the present disclosure, in a state where an application operation of each of the plurality of applications executed in the application execution space 200 is completed or does not end by a user's request, the user may make a request to restart each of the applications.

According to an embodiment of the present disclosure, when a request for restarting one of a plurality of applications executed in the application execution space 200 is made, the display device 100 displays a page on the screen including the application of which the restart has been requested.

Figure 23A:
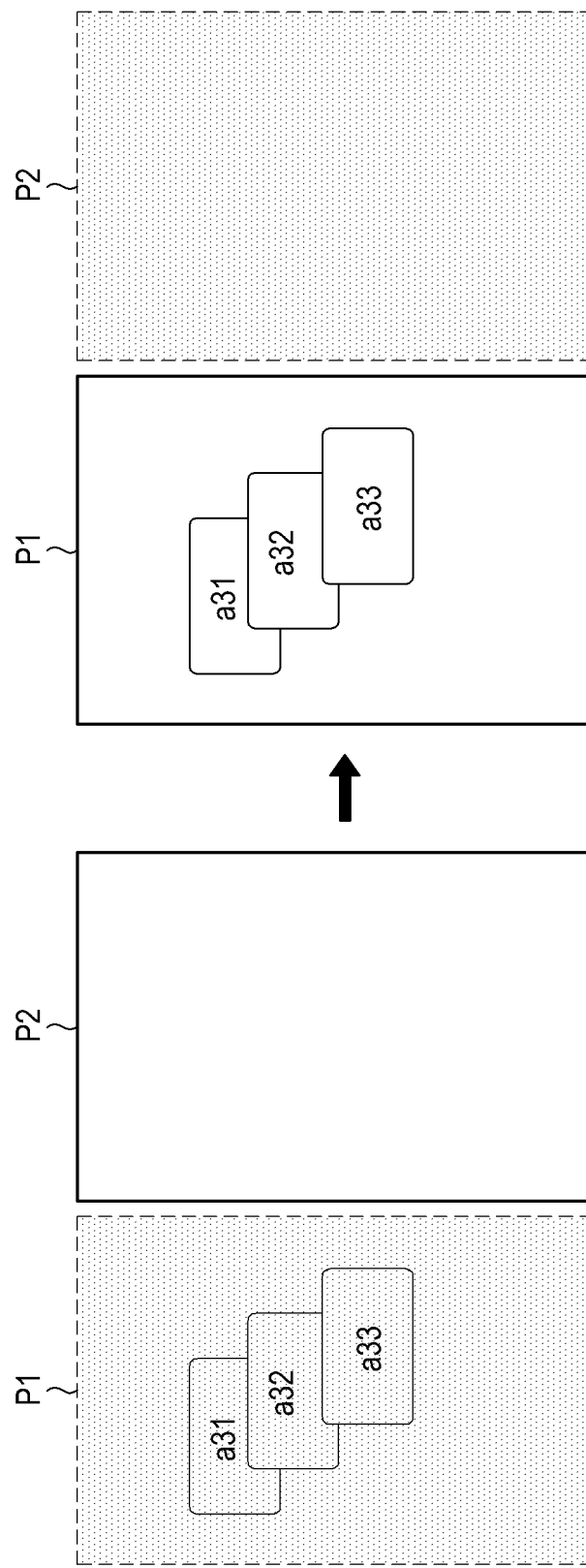
FIGS. 23A and 23B illustrate a procedure of processing an application execution window when a re-execution of an application which is being executed is requested according to an embodiment of the present disclosure.
Figure 23B:
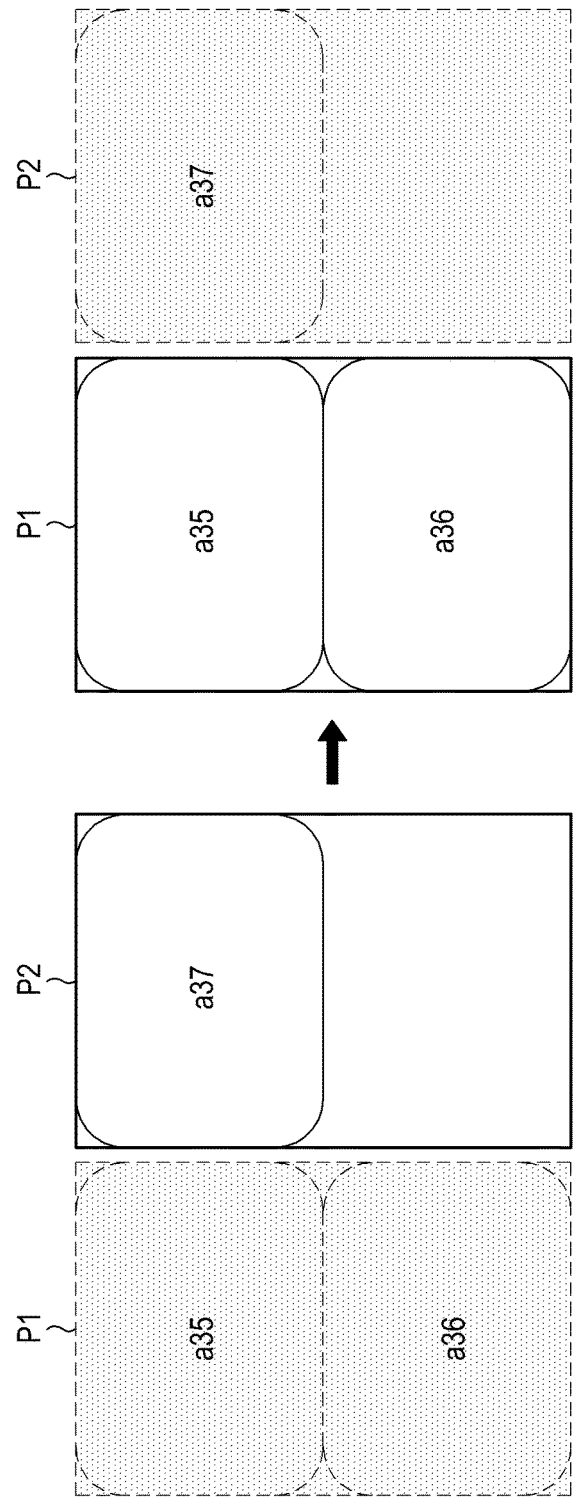

FIGS. 23A and 23B illustrate a procedure of processing an application execution window when a request for restarting an executed application is made according to an embodiment of the present disclosure.

Referring to FIG. 23A, when a request for restarting, in the second page P2, one application a32 of applications a31, a32, and a33 executed in the first page P1 in the freestyle mode is made, a focus is moved to the first page P1 including the execution window of the application a32 of which the restart has been requested and the first page P1 is displayed on the touch screen 190.

Referring to FIG. 23B, when a request for restarting an application a36 executed in the first page P1 is made while the second page P2 is focused and thus displayed on the touch screen 190 in the split mode, the focus is moved to the first page P1 including the execution window of the application a36 of which the restart has been requested and the first page P1 is displayed on the touch screen 190.

According to an embodiment of the present disclosure, an arrangement of each of a plurality of applications executed in the application execution space 200 may be requested by the user.

Figure 24A:
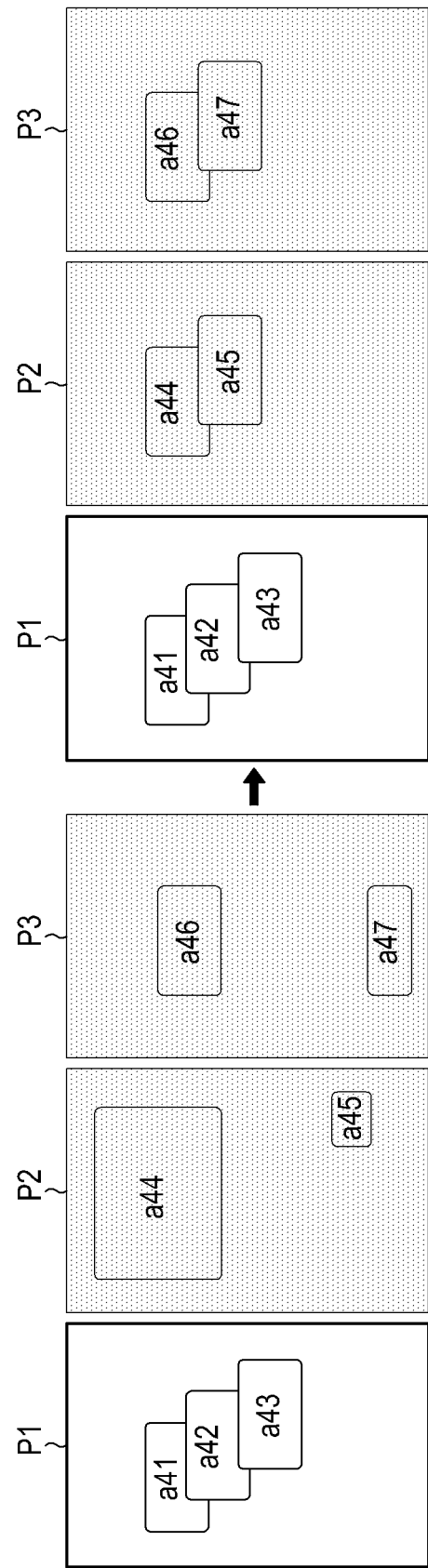
FIGS. 24A and 24B illustrate an application execution window arranging process when an arrangement of applications which are being executed is requested according to an embodiment of the present disclosure.
Figure 24B:
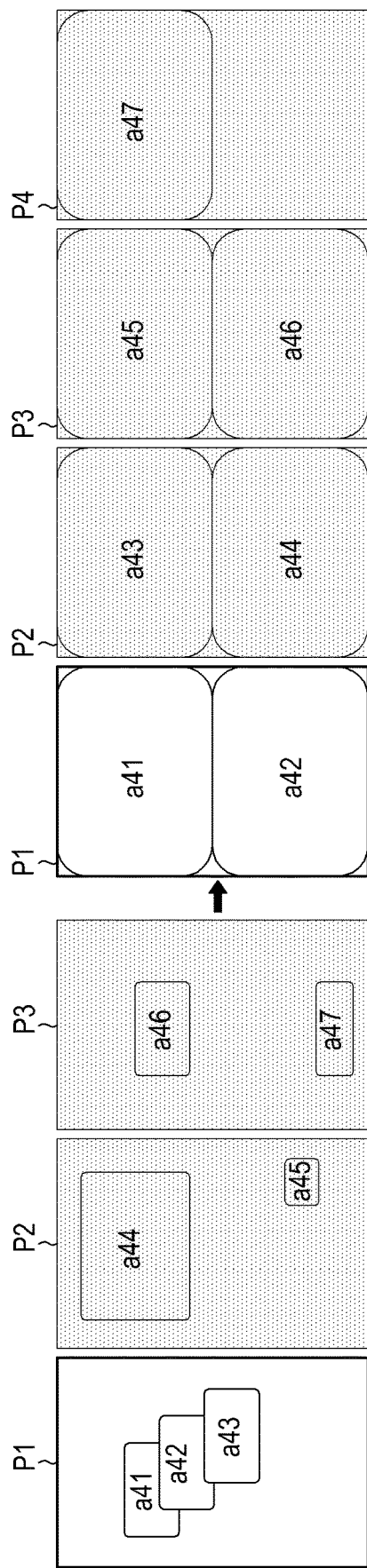

FIGS. 24A and 24B illustrate a process of arranging application execution windows when a request for arranging executed applications is made according to an embodiment of the present disclosure.

Referring to FIG. 24A, a cascade arrangement mode is illustrated. The cascade arrangement mode refers to a mode in which applications executed in each page are arranged. For example, where the user requests the cascade arrangement, the display device 100 arranges applications a41 to a47 executed in the first to third pages P1 to P3 within corresponding pages.

Referring to FIG. 24B, a dual arrangement mode is illustrated. The dual arrangement mode refers to a mode in which applications executed in the pages are arranged two by two per page. For example, when the user requests the dual arrangement, the display device 100 arranges the applications a41 to a47 executed in the first to third pages P1 to P3 within corresponding pages such that two applications are arranged per page.

Figure 25A:
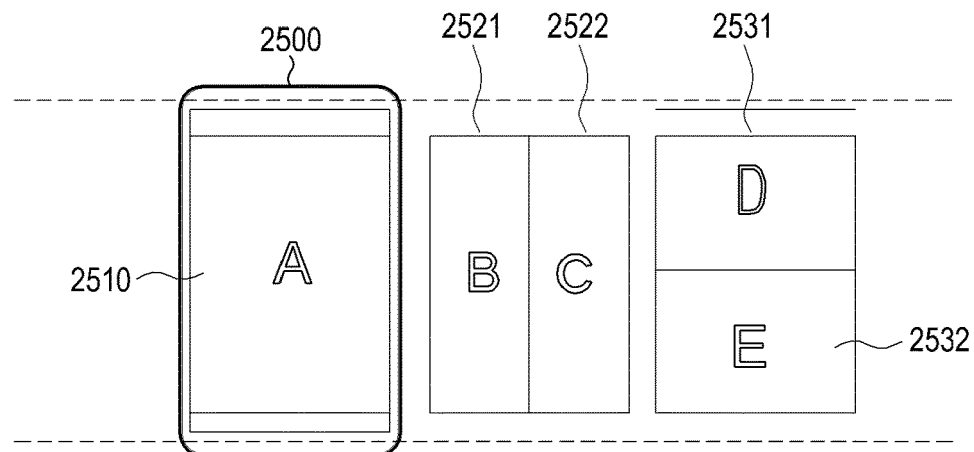
FIGS. 25A, 25B, and 25C illustrate a configuration of moving an application execution space in the unit of pixels, not in the unit of pages.
Figure 25B:
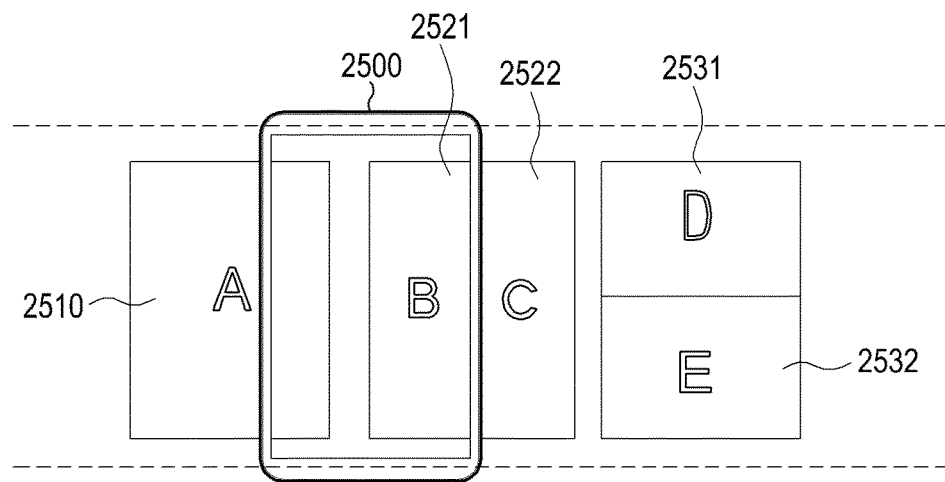
Figure 25C:
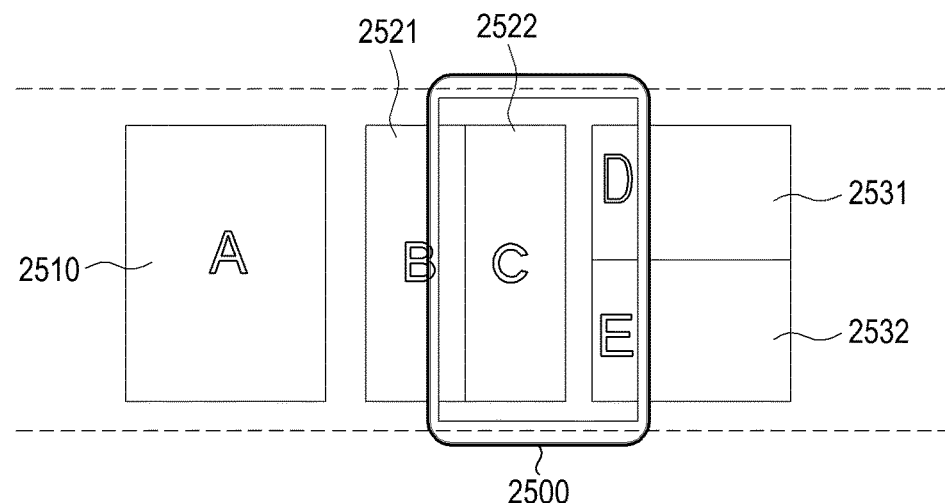

FIGS. 25A to 25C illustrate concepts describing a configuration of moving the application execution space in the unit of pixels, not the unit of pages.

Referring to FIG. 25A, a display device 2500 arranges a first window 2510 executing a first application A, a second window 2521 executing a second application B, a third window 2522 executing a third application C, a fourth window 2531 executing a fourth application D, and a fifth window 2532 executing a fifth application E on the application execution space. The display device 2500 arranges the second window 2521 and the third window 2522, which are located at left and right parts in the split mode, on the application execution space. The display device 2500 arranges the fourth window 2531 and the fifth window 2532, which are divided into top and bottom parts in the split mode, on the application execution space. The display device 2500 physically displays the first window 2510 executing the first application A.

The display device 2500 may receive a gesture of moving the application execution space in a right direction. In response to the gesture, the display device 2500 may move the application execution space in the right direction and physically display the moved application execution space. Accordingly, the display device 2500 may display a mixed image of a part of a right side of the first window 2510 and the second window 2521 as illustrated in FIG. 25B.

The display device 2500 may additionally receive the gesture of moving the application execution space in the right direction. The user may scroll the application execution space by continuously inputting a drag gesture until a window executing a desired application appears. In response to the drag gesture, the display device 2500 may additionally move the application execution space in the right direction and physically display the moved application execution space. Accordingly, the display device 2500 may display a mixed image of a part of a right side of the second window 2521, the third window 2522, a part of a left side of the fourth window 2531, and a part of a left side of the fifth window 2532 as illustrated in FIG. 25C. As described above, the display device 2500 may continuously move the application execution space without moving the application execution space in the unit of pages.

FIGS. 26A to 26E illustrate a cloud system according to an embodiment of the present disclosure.

Figure 26A:
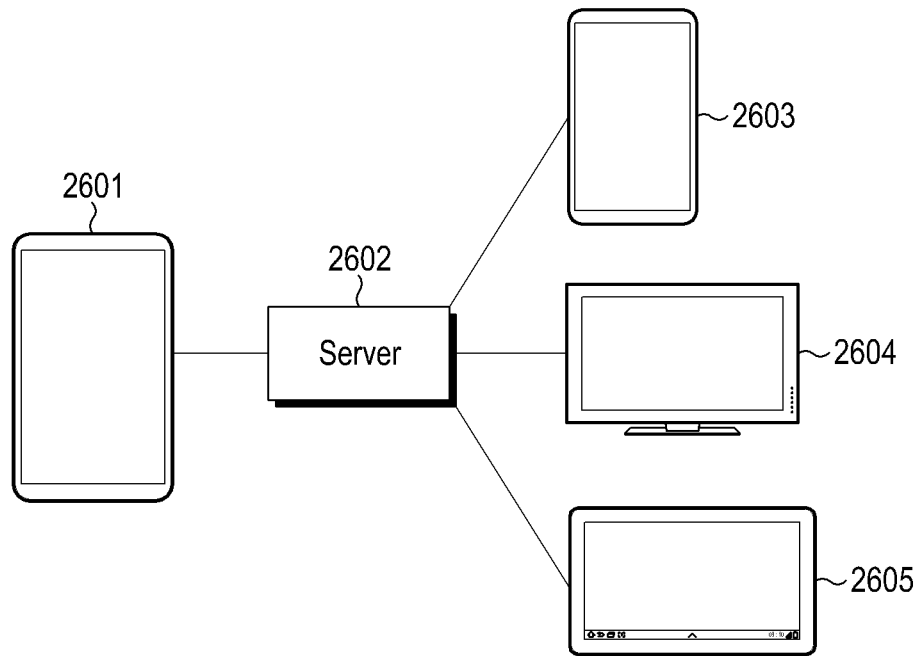
FIGS. 26A, 26B, 26C, 26D, and 26E illustrate a cloud system according to an embodiment of the present disclosure.

Referring to FIG. 26A, a cloud system may include a master display device 2601, a server 2602, a display device 2603, an Internet TV 2604, and a tablet Personal Computer (PC) 2605. The master display device 2601 may be connected to the server 2602, and the server 2602 may be connected with the display device 2603, the Internet TV 2604, and the tablet PC 2605. The master display device 2601 may communicate with the server 2602 in a preset scheme. Further, the display device 2603, the Internet TV 2604, and the tablet PC 2605 may communicate with the server 2602 in a preset scheme. Accordingly, the master display device 2601 can communicate with the display device 2603, the Internet TV 2604, and the tablet PC 2605.

Figure 26B:
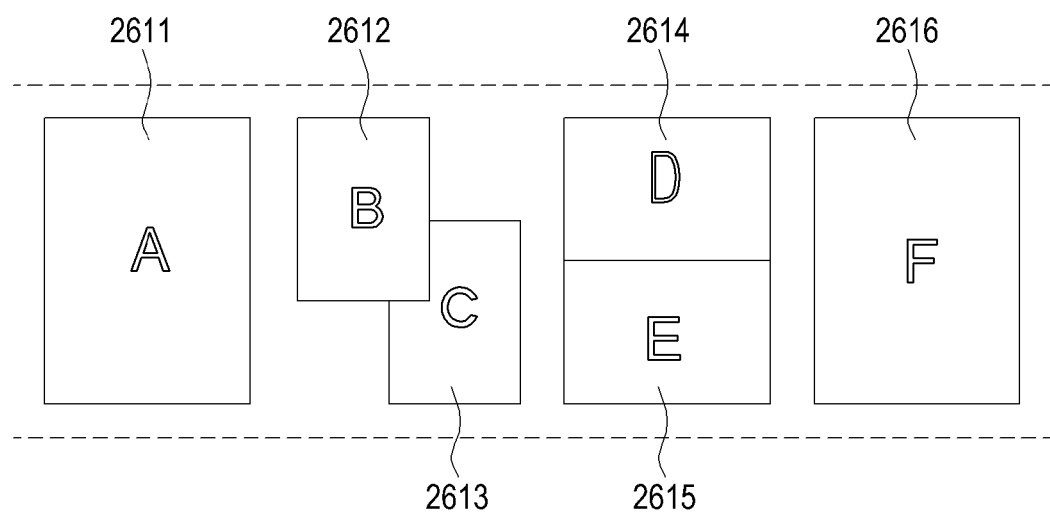

FIG. 26B illustrates an application execution space set by the master display device 2601. The master display device 2601 sets a first window 2611 executing a first application A, a second window 2612 executing a second application B, a third window 2613 executing a third application C, a fourth window 2614 executing a fourth application D, a fifth window 2615 executing a fifth application E, and a sixth window 2616 executing a sixth application F on the application execution space. It is assumed that the master display device 2601 manages the application execution space for each page. The master display device 2601 arranges the first window 2611 in a first page of the application execution space, the second window 2612 and the third window 2613 in a second page of the application execution space, the fourth window 2614 and the fifth window 2615 in a third page of the application execution space, and the sixth window 2616 in a fourth page of the application execution space.

Figure 26C:
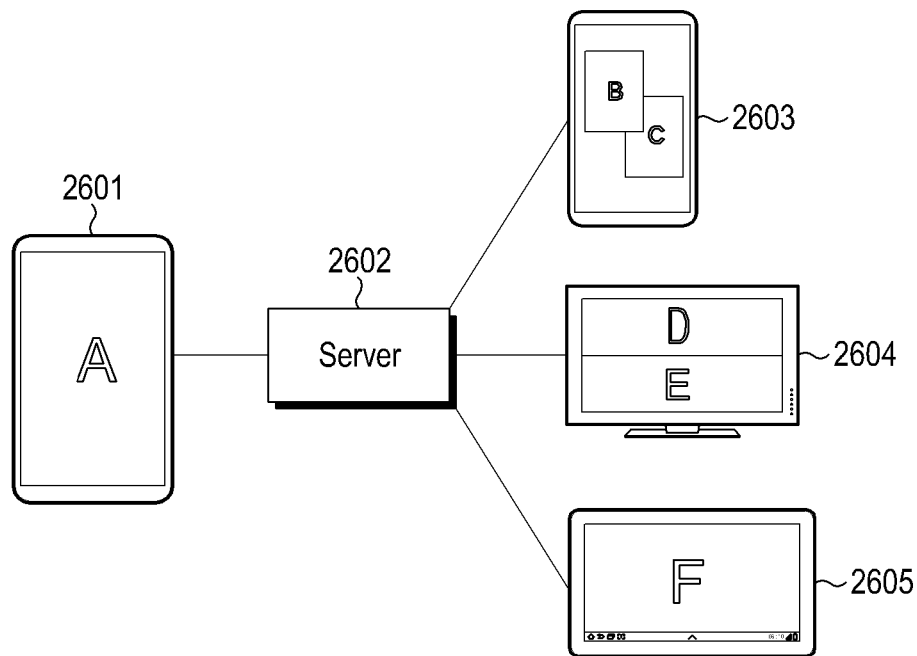

Referring to FIG. 26C, the master display device 2601 displays the second page of the application execution space on the display device 2603 through the server 2602. The master display device 2601 displays the third page of the application execution space on the Internet TV 2604 through the server 2602. The master display device 2601 displays the fourth page of the application execution space on the tablet PC 2605 through the server 2602. In contrast to the related art in which the master display device 2601 and the Internet TV 2604 are mirrored, according to the present disclosure, the master display device 2601 and other connected devices 2603, 2604, and 2605 display different screens.

Figure 26D:
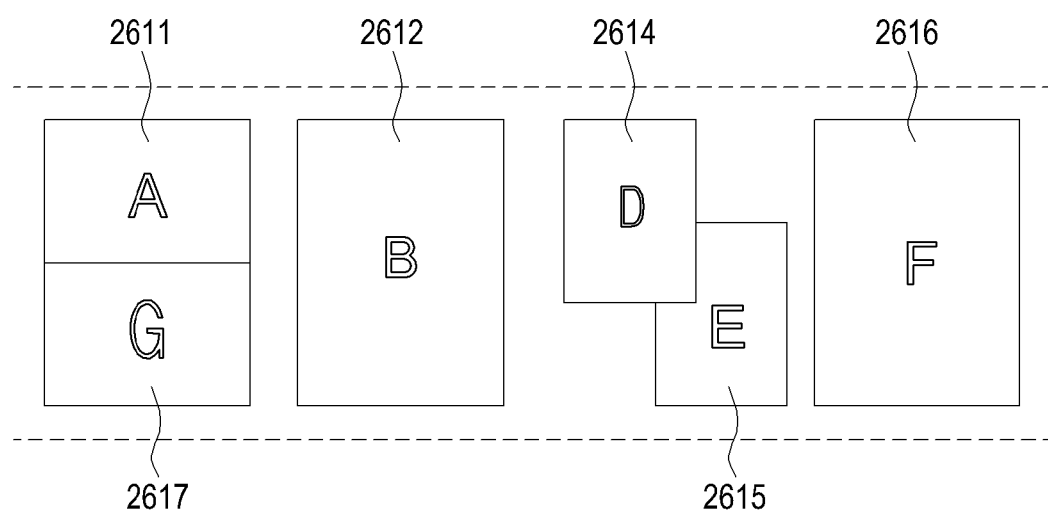

FIG. 26D illustrates an application execution space changed from the application execution space of FIG. 26B. For example, the user may newly execute a seventh window 2617 executing a seventh application G and the first window 2511 in the split mode in the first page of the application execution space. Further, the user ends the third window 2613 executing the third application C in the second page of the application execution space. In addition, the user may change a display mode of the third page from the split mode to the freestyle mode. FIG. 26D illustrates the application execution space to which the above described application execution is reflected.

Figure 26E:
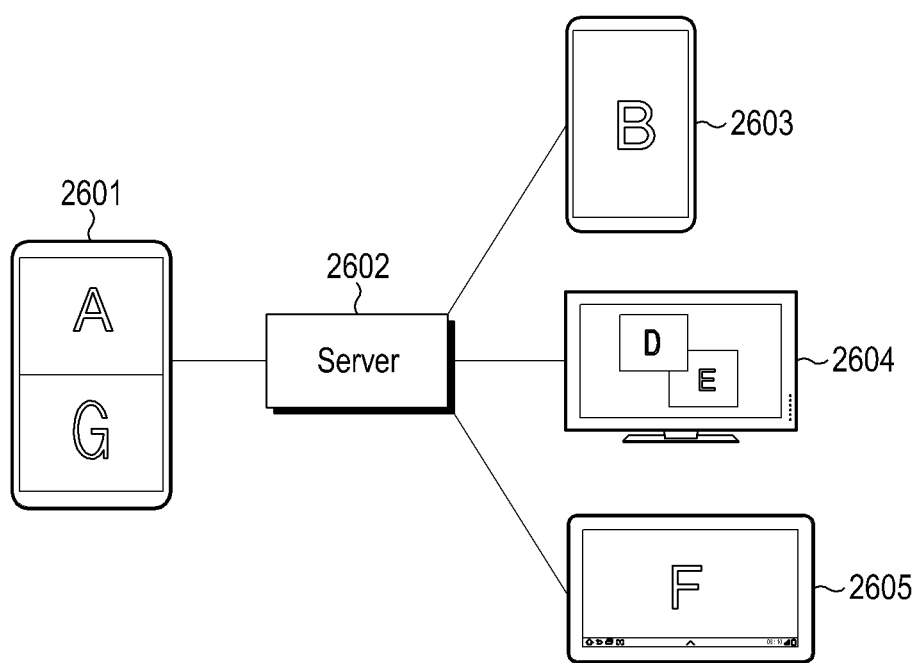

Referring to FIG. 26E, the master display device 2601 controls to display the fourth page of the application execution space on the tablet PC 2605. Further, the master display device 2601 displays the first page of the application execution space. The display device 2603 displays the second window through a full screen. The Internet TV 2604 displays the fourth window and the fifth window in the freestyle mode.

According to the above description, the display device may make a control such that windows set to different pages of the application execution space are displayed on different devices.

FIGS. 27A to 27D illustrate concepts describing a method of executing applications according to an embodiment of the present disclosure. Particularly, various embodiments of FIGS. 27A to 27D illustrate concepts describing a method of executing applications in a vertical split mode.

Figure 27A:
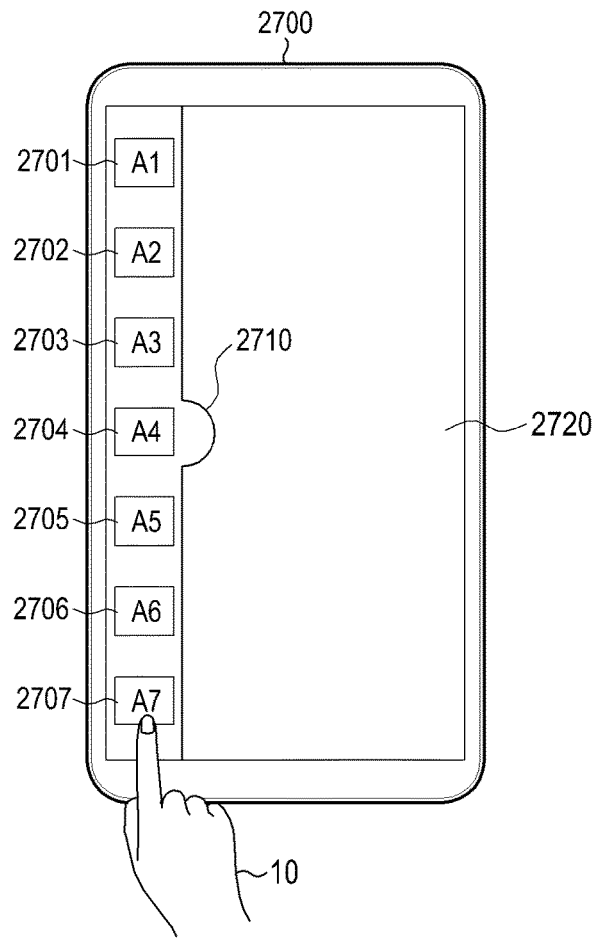
FIGS. 27A, 27B, 27C, and 27D illustrate a method of executing applications according to an embodiment of the present disclosure.
Figure 27B:
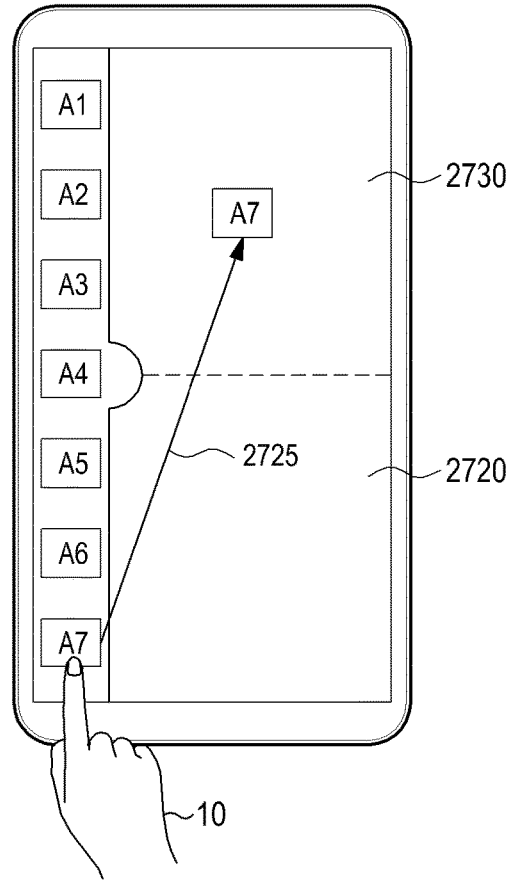

Referring to FIG. 27A, a display device 2700 displays an application execution space 2720. The display device 2700 displays a tray 2710 including icons 2701 to 2707 of executable applications on a left side of the application execution space 2720. The user 10 may control the display device 2700 to execute a seventh application A7. For example, the user 10 may touch the icon 2707 of the seventh application A7 and input a drag gesture 2725 to an upper area of the application execution space 2720 as illustrated in FIG. 27B. When the user 10 inputs the drag gesture 2725 to an area in which the user desires to execute the application, a controller (not shown) changes a color or brightness of an area 2730 in which the application can be executed in accordance with the drag gesture 2725 into a color or brightness different from that of the application execution space 2720. When the input of the drag gesture 2725 ends, the controller 110 controls to display the seventh window 2730 on an upper part of the application execution space 2720.

Figures 27C, 27D:
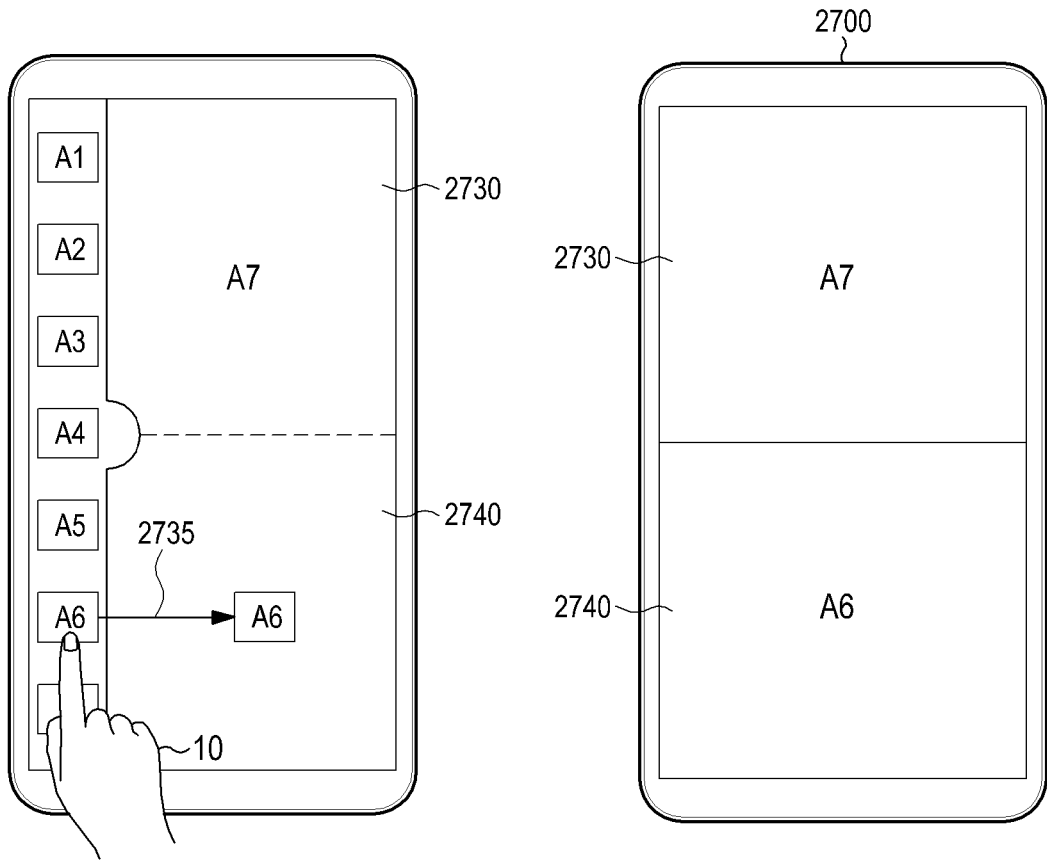

Referring to FIG. 27C, the user 10 may control the display device 2700 to additionally execute a sixth application A6. The user 10 may input a drag gesture 2735 from the icon 2716 of the sixth application A6 to the remaining lower area of the application execution space 2720. When the user 10 inputs the drag gesture 2735 to an area in which the user desires to execute the application, the controller (not shown) changes a color or brightness of an area 2740 in which the application can be executed in accordance with the drag gesture 2735 into a color or brightness different from that of the application execution space 2720. When the input of the drag gesture 2735 ends, the controller (not shown) controls to display the sixth window 2740 on a lower part of the application execution space 2720. Accordingly, as illustrated in FIG. 27D, the display device 2700 displays the split mode in which the seventh window 2730 is displayed in the upper part and the sixth window 2740 is displayed in the lower part.

FIGS. 28A to 28D illustrate concepts describing a method of executing applications according to another embodiment of the present disclosure. Particularly, various embodiments of FIGS. 28A to 28D illustrate concepts describing a method of executing applications in a vertical split mode.

Figure 28A:
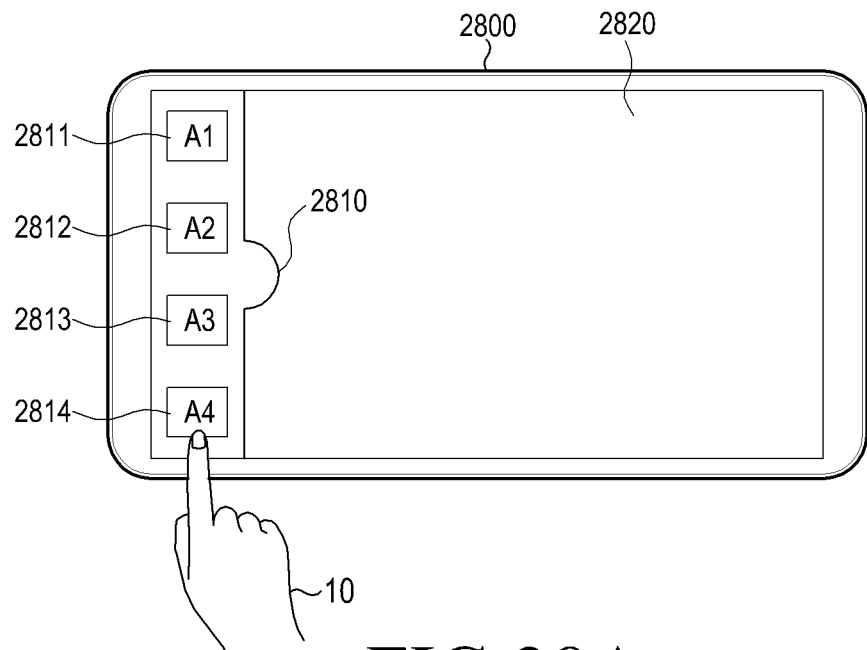
FIGS. 28A, 28B, 28C, and 28D illustrate a method of executing applications according to another embodiment of the present disclosure.
Figure 28B:
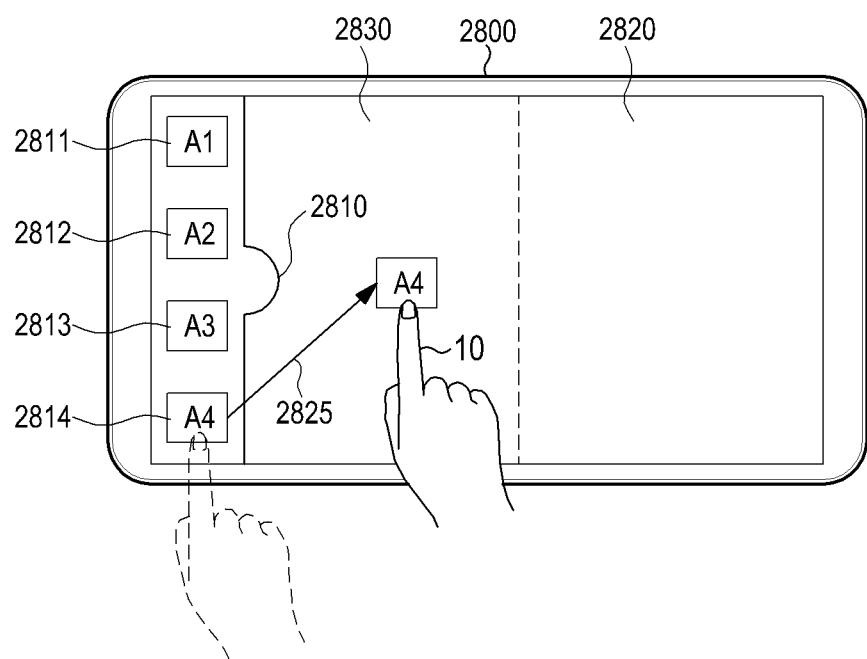

Referring to FIG. 28A, a display device 2800 displays an application execution space 2820. The display device 2800 displays a tray 2810 including icons 2811 to 2814 of executable applications on a left side of the application execution space 2820. The user 10 may control the display device 2800 to execute a fourth application A4. For example, the user 10 may touch the icon 2814 of the fourth application A4 and input a drag gesture 2825 to a left area of the application execution space 2820 as illustrated in FIG. 28B. When the user 10 inputs the drag gesture 2825 to an area in which the user desires to execute the application, a controller (not shown) changes a color or brightness of an area 2830 in which the application can be executed in accordance with the drag gesture 2825 into a color or brightness different from that of the application execution space 2820. When the input of the drag gesture 2825 ends, the controller (not shown) controls to display the fourth window 2830 on the left area of the application execution space 2820.

Figure 28C:
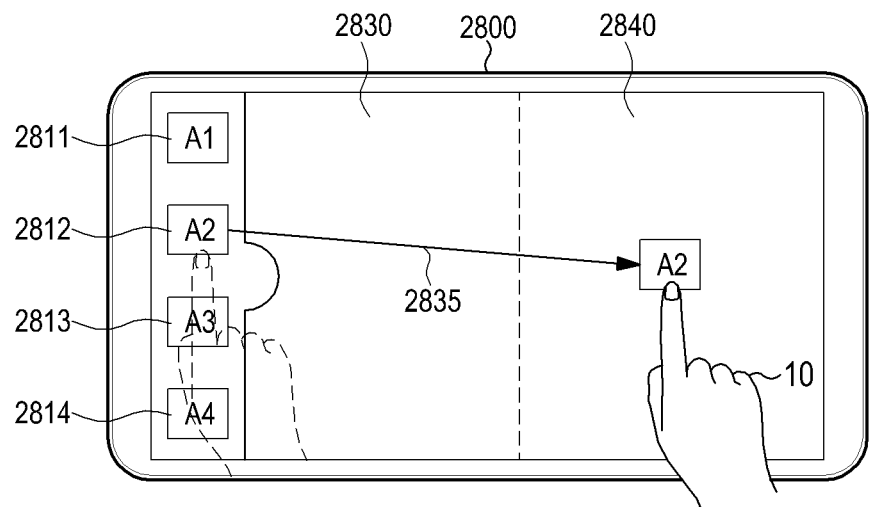
Figure 28D:
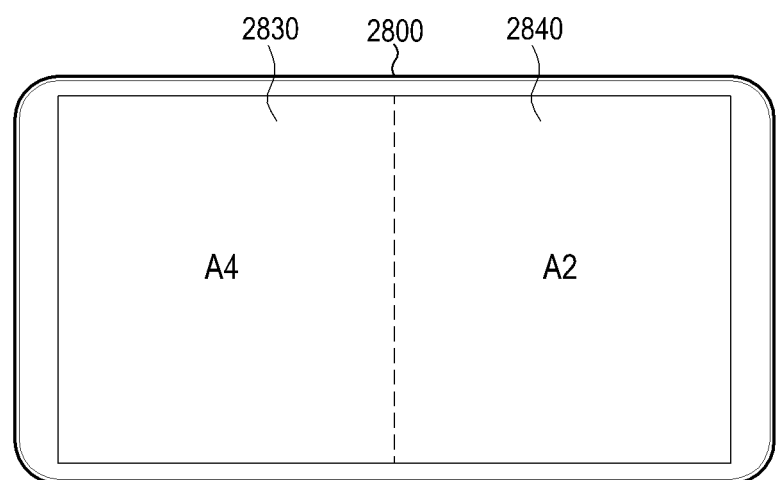

Referring to FIG. 28C, the user 10 may control the display device 2800 to additionally execute a second application A2. The user 10 may input a drag gesture 2835 from the icon 2812 of the second application A2 to the remaining right area of the application execution space 2820. When the user 10 inputs the drag gesture 2835 to an area in which the user desires to execute the application, the controller (not shown) changes a color or brightness of an area 2840 in which the application can be executed in accordance with the drag gesture 2835 into a color or brightness different from that of the application execution space 2820. When the input of the drag gesture 2835 ends, the controller 110 controls to display the second window 2840 on the right area of the application execution space 2820. Accordingly, as illustrated in FIG. 28D, the display device 2700 displays the split mode in which the fourth window 2830 is displayed in the left area and the second window 2840 is displayed in the right area. The vertical split screen illustrated in FIGS. 27A to 27D may be automatically switched to the horizontal split screen illustrated in FIGS. 28A to 28D as the display device rotates.

FIGS. 29A to 29F illustrate a method of executing applications according to another embodiment of the present disclosure. Particularly, various embodiments of FIGS. 29A to 29F illustrate concepts describing a method of executing applications in a quarter split mode.

Figure 29A:
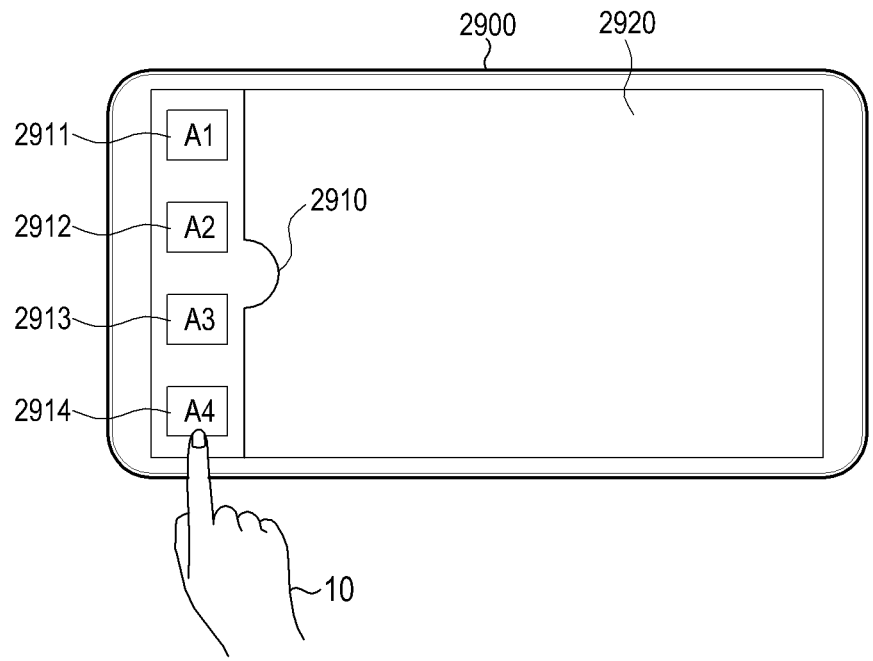
FIGS. 29A, 29B, 29C, 29D, 29E, and 29F illustrate a method of executing applications according to another embodiment of the present disclosure.
Figure 29B:
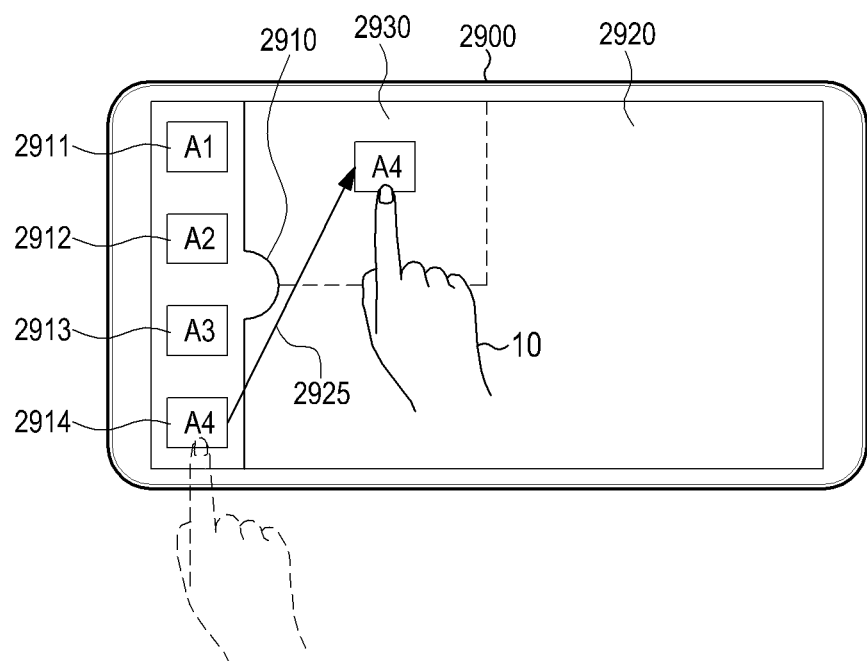

Referring to FIG. 29A, a display device 2900 displays an application execution space 2920. The display device 2900 displays a tray 2910 including icons 2911 to 2914 of executable applications on a left side of the application execution space 2920. The user 10 may control the display device 2900 to execute a fourth application A4. For example, the user 10 may touch the icon 2914 of the fourth application A4 and input a drag gesture 2925 to an upper left area of the application execution space 2920 as illustrated in FIG. 29B. When the user 10 inputs the drag gesture 2925 to an area in which the user desires to execute the application, a controller (not shown) changes a color or brightness of an area 2930 in which the application can be executed in accordance with the drag gesture 2925 into a color or brightness different from that of the application execution space 2920. When the input of the drag gesture 2925 ends, the controller 110 controls to display the fourth window 2930 on the upper left area of the application execution space 2920.

Figure 29C:
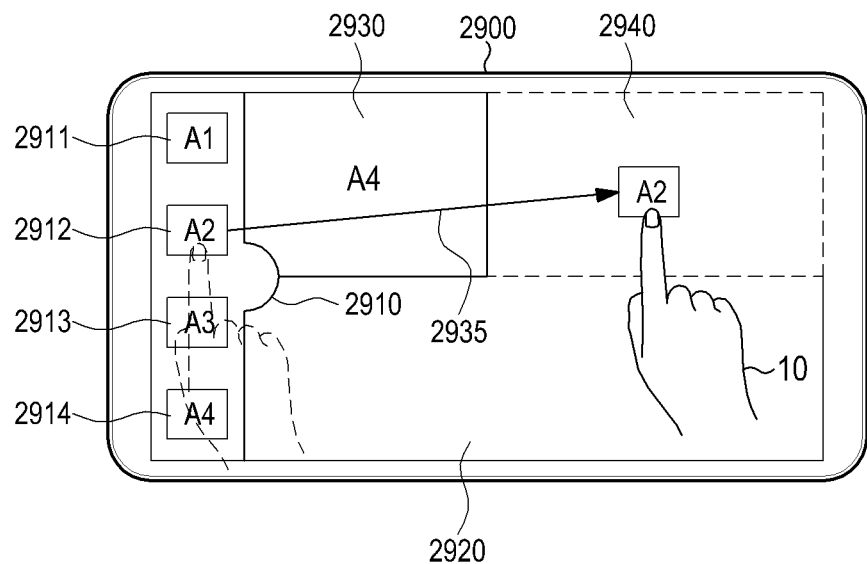

Referring to FIG. 29C, the user 10 may control the display device 2900 to additionally execute a second application A2. The user 10 may input a drag gesture 2935 from the icon 2912 of the second application A2 to an upper right area of the application execution space 2920. When the user 10 inputs the drag gesture 2935 to an area in which the user desires to execute the application, the controller 110 changes a color or brightness of an area 2940 in which the application can be executed in accordance with the drag gesture 2935 into a color or brightness different from that of the application execution space 2920. When the input of the drag gesture 2935 ends, the controller (not shown) controls to display the second window 2940 on the upper right area of the application execution space 2920. Accordingly, as illustrated in FIG. 29C, the display device 2900 displays the split mode in which the fourth window 2930 is displayed in the upper left area and the second window 2940 is displayed in the upper right area.

Figure 29D:
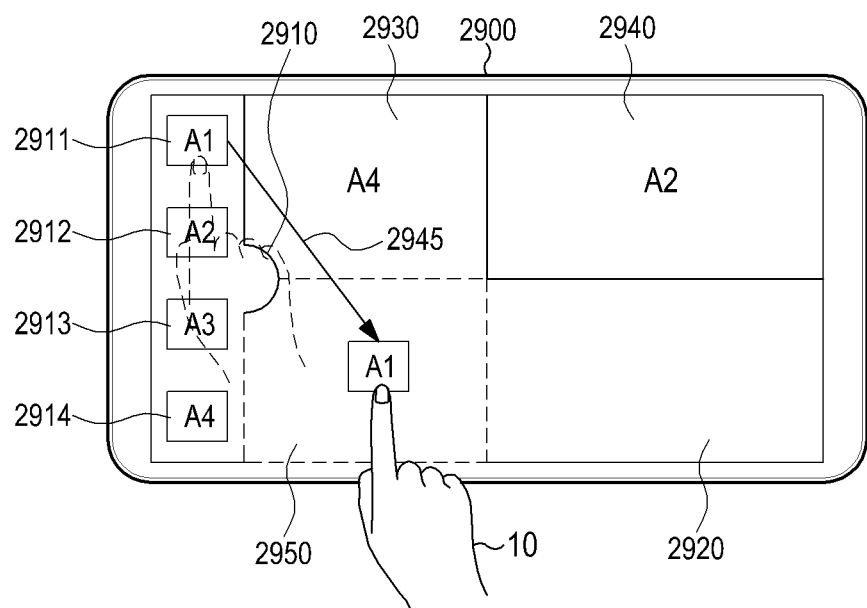

Referring to FIG. 29D, the user 10 may control the display device 2900 to additionally execute a first application A1. The user 10 may input a drag gesture 2945 from the icon 2911 of the first application A1 to a lower left area of the application execution space 2920. When the user 10 inputs the drag gesture 2945 to an area in which the user desires to execute the application, the controller (not shown) changes a color or brightness of an area 2950 in which the application can be executed in accordance with the drag gesture 2945 into a color or brightness different from that of the application execution space 2920. When the input of the drag gesture 2945 ends, the controller (not shown) controls to display the first window 2950 on the lower left area of the application execution space 2920. Accordingly, as illustrated in FIG. 29D, the display device 2900 displays the split mode in which the fourth window 2930 is displayed in the upper left area, the second window 2940 is displayed in the upper right area, and the first window 2950 is displayed on the lower left area.

Figure 29E:
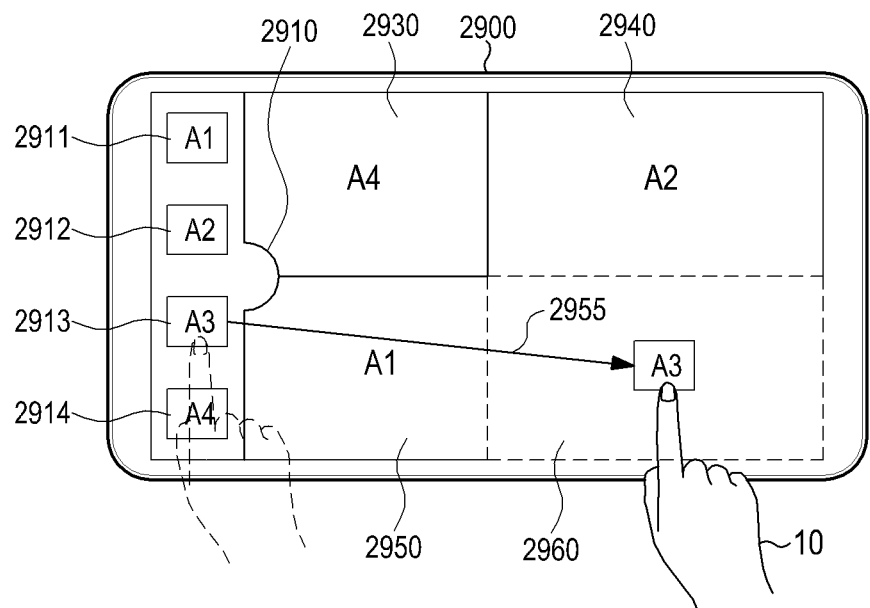
Figure 29F:
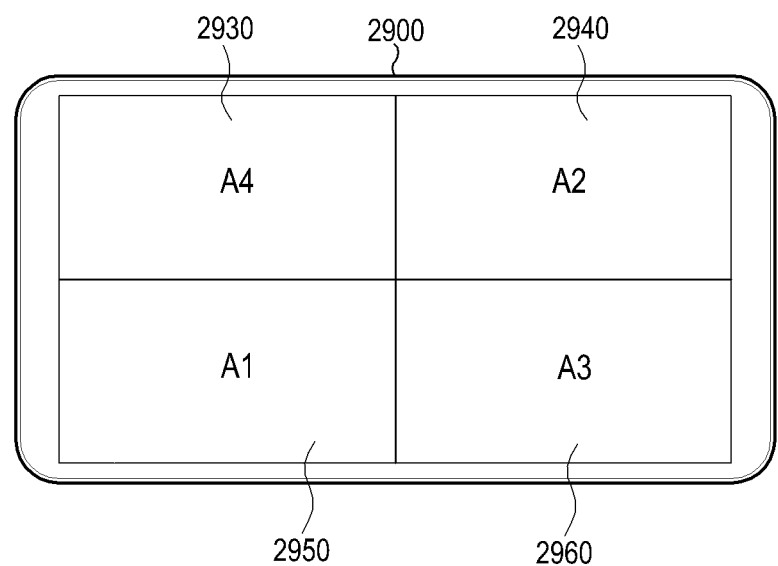

Referring to FIG. 29E, the user 10 may control the display device 2900 to additionally execute a third application A3. The user 10 may input a drag gesture 2955 from the icon 2913 of the third application A3 to a lower right area of the application execution space 2920. When the user 10 inputs the drag gesture 2955 to an area in which the user desires to execute the application, the controller 110 changes a color or brightness of an area 2960 in which the application can be executed in accordance with the drag gesture 2955 into a color or brightness different from that of the application execution space 2920. When the input of the drag gesture 2955 ends, the controller (not shown) controls to display the second window 2960 on the lower right area of the application execution space 2920. Accordingly, as illustrated in FIG. 29D, the display device 2900 displays the split mode in which the fourth window 2930 is displayed in the upper left area, the second window 2940 is displayed in the upper right area, the first window 2950 is displayed on the lower left area, and the third window 2920 is displayed on the lower right area.

FIGS. 30A to 30D illustrate a method of executing applications according to yet another embodiment of the present disclosure. Particularly, various embodiments of FIGS. 30A to 30D illustrate a method of executing applications in the freestyle mode.

Figure 30A:
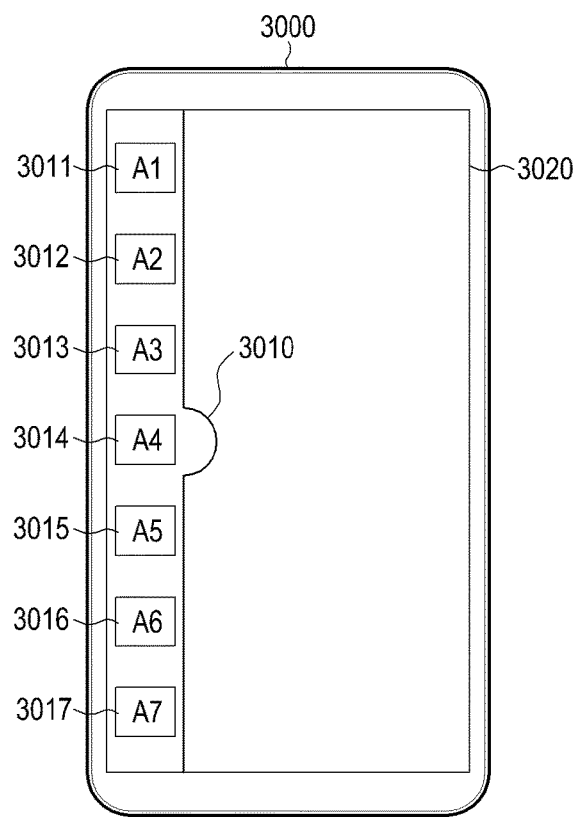
FIGS. 30A, 30B, 30C, and 30D illustrate a method of executing applications according to another embodiment of the present disclosure.
Figure 30B:
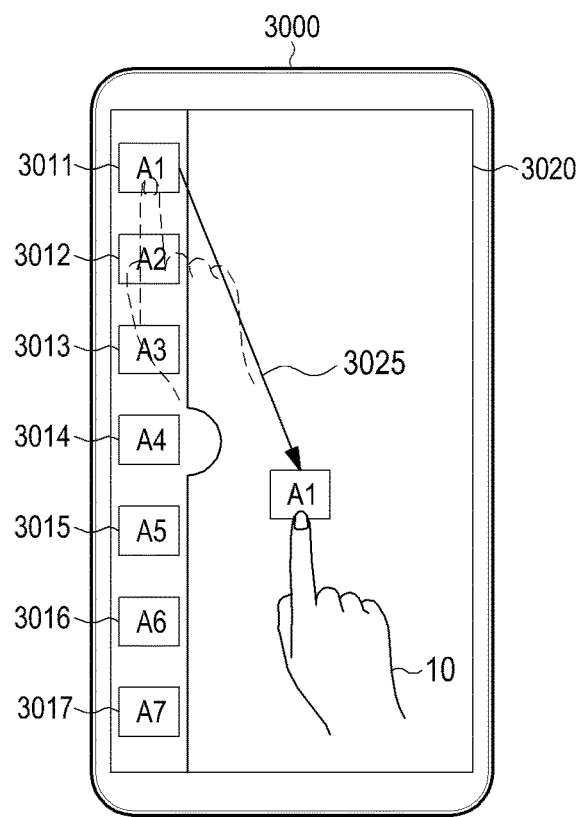

Referring to FIG. 30A, a display device 3000 displays an application execution space 3020. The display device 3000 displays a tray 3010 including icons 3011 to 3017 of executable applications on a left side of the application execution space 3020. The user 10 may control the display device 3000 to execute a first application A1. For example, the user 10 may touch the icon 3011 of the first application A1 and input a drag gesture 3025 to a first point of the application execution space 3020 as illustrated in FIG. 30B. The display device 3000 may display a first window 3030 executing the first application A1 on the first point of the application execution space 3020 based on the input execution command, that is, the drag gesture 3025. A size and a shape of the first window 3030 may have default value or a value set by the user before ending.

Figure 30C:
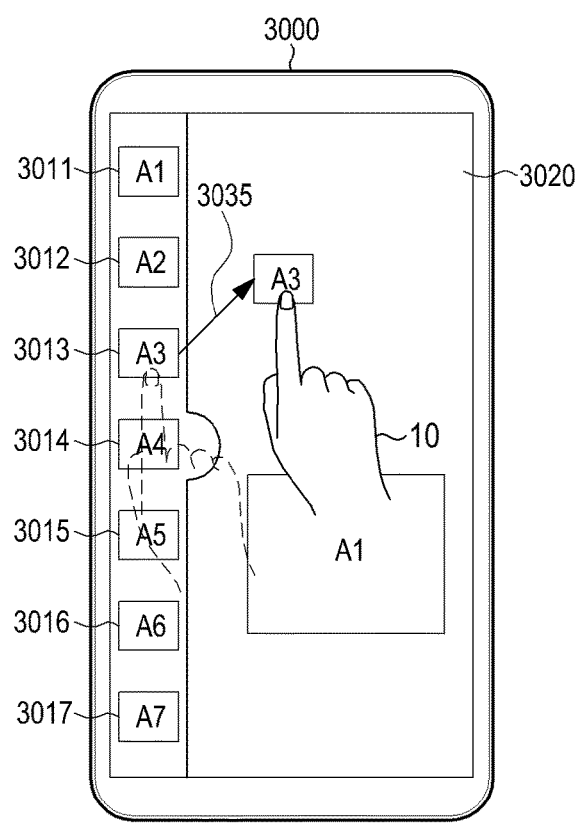
Figure 30D:
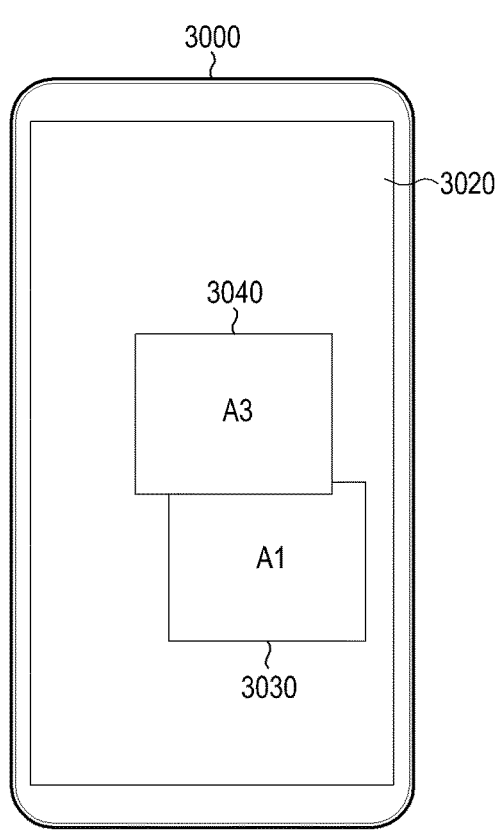

The user 10 may control the display device 3000 to additionally execute a third application A3. For example, as illustrated in FIG. 30C, the user 10 may input a drag gesture 3035 from the icon 3013 of the third application A3 to a second point of the application execution space 3020. The display device 3000 may display a third window 3040 executing the third application A3 on the second point of the application execution space 3020 based on the input execution command, (i.e., the drag gesture 3035). A size and a shape of the third window 3040 may have default value or a value set by the user before ending. Since the window into which the user 10 more recently inputs the gesture is the third window 3040, the controller (not shown) may assign a higher task order to the third application A3 rather than the first application A1. Accordingly, the controller 110 may control such that the third application A3 is displayed to cover the first application A1, as illustrated in FIG. 30D.

FIGS. 31A to 31H illustrate a method of executing applications according to another embodiment of the present disclosure. Particularly, various embodiments of FIGS. 31A to 31H illustrate a method of executing applications in another application execution space page set in the split mode.

Figure 31A:
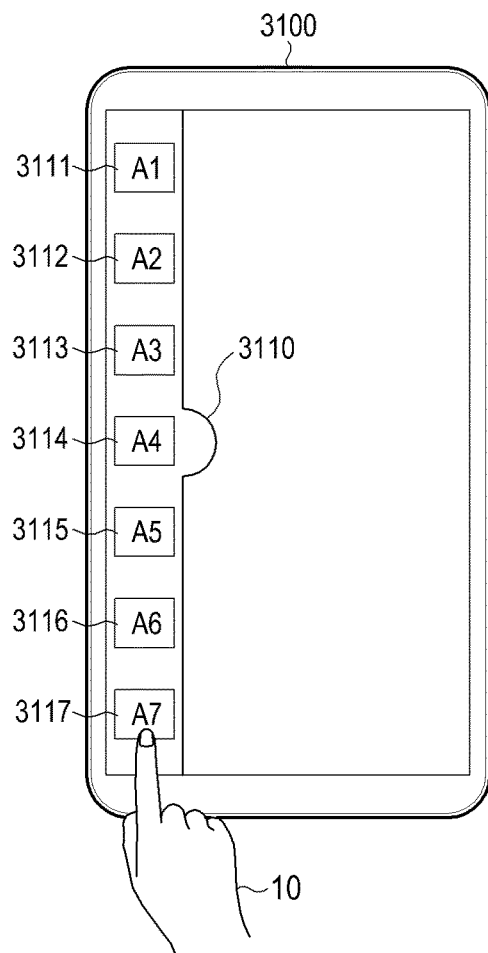
FIGS. 31A, 31B, 31C, 31D, 31E, 31F, 31G, and 31H illustrate a method of executing applications according to another embodiment of the present disclosure.
Figure 31B:
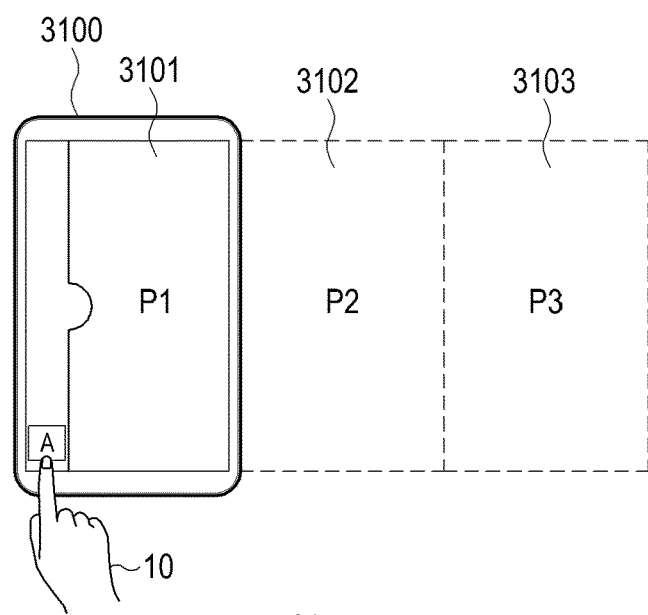

Referring to FIG. 31A, a display device 3100 displays an application execution space. The display device 3100 displays a tray 3110 including icons 3111 to 3117 of executable applications on a left side of the application execution space. FIG. 31B illustrates the application execution space corresponding to FIG. 31A. The application execution space includes a first page 3101, a second page 3102, and a third page 3103. In this case, the display device 3100 displays the first page 3101.

Figure 31C:
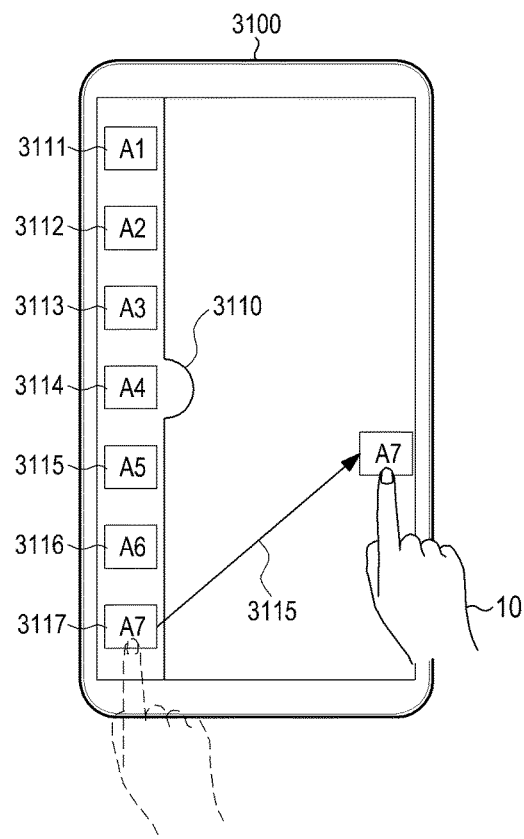
Figure 31D:
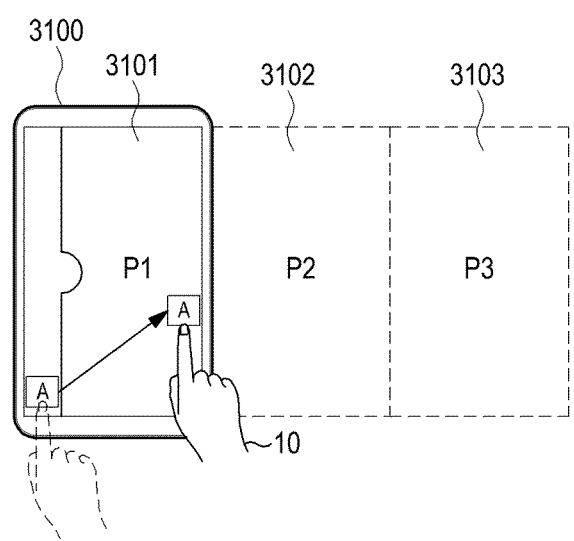

The user 10 may control the display device 3100 to execute a seventh application A7. The user 10 may control to execute the seventh application A7 in the second page 310 of the application execution space, as illustrated in FIG. 31C. Accordingly, the user 10 may input an application execution space switching gesture. The user 10 may touch an icon 3117 of the seventh application A7 and input the drag gesture 3115 to a right boundary of the application execution space, that is, the touch screen. The controller 110 recognizes the drag gesture 3025 to the right boundary as the application execution space switching gesture, a page switching gesture, or a sub space switching gesture. Accordingly, the controller 110 switches the physically displayed application execution space from the first page 3101 to the second page 3102. Also in the application execution space of FIG. 31D, the drag gesture to the boundary between the first page 3101 and the second page 3102 may be recognized as the application execution space switching gesture from the first page 3101 to the second page 3102.

Figure 31E:
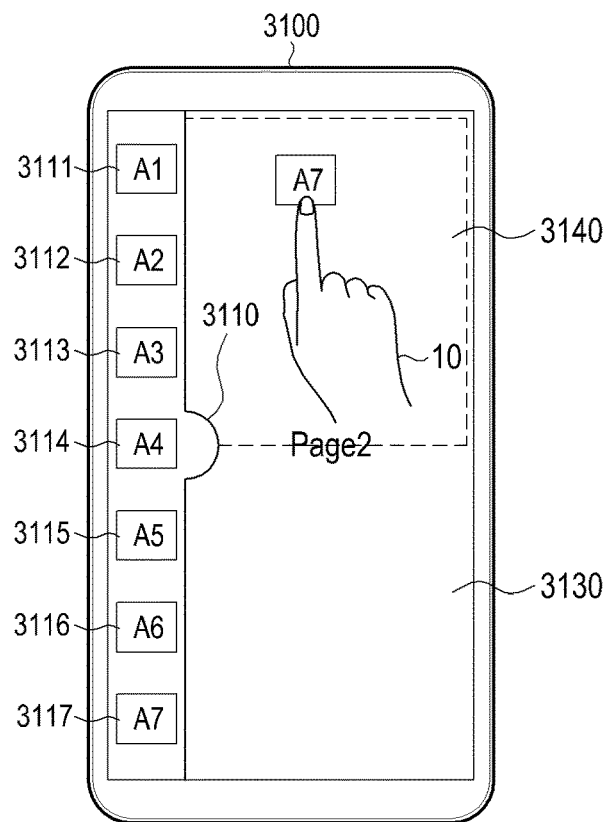
Figure 31F:
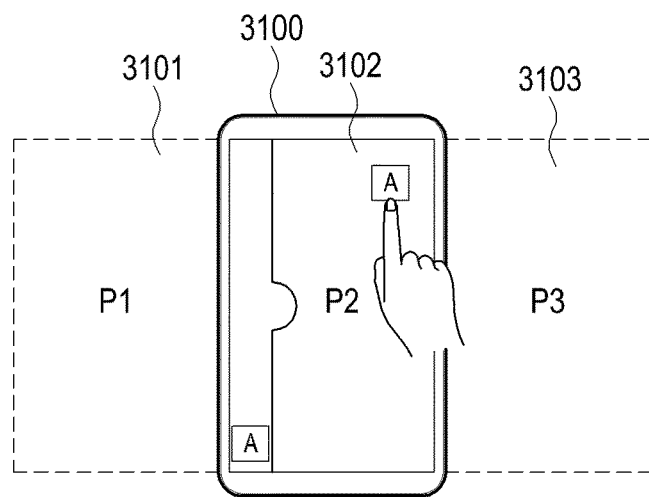
Figure 31G:
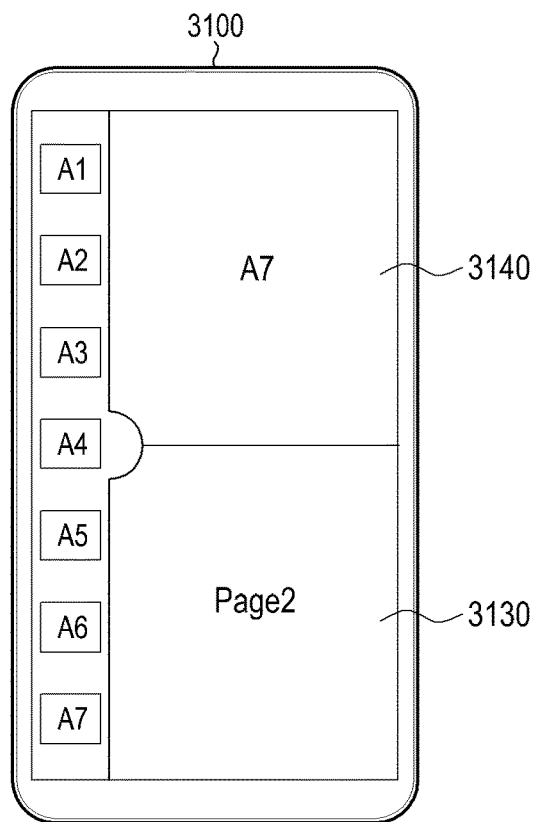
Figure 31H:
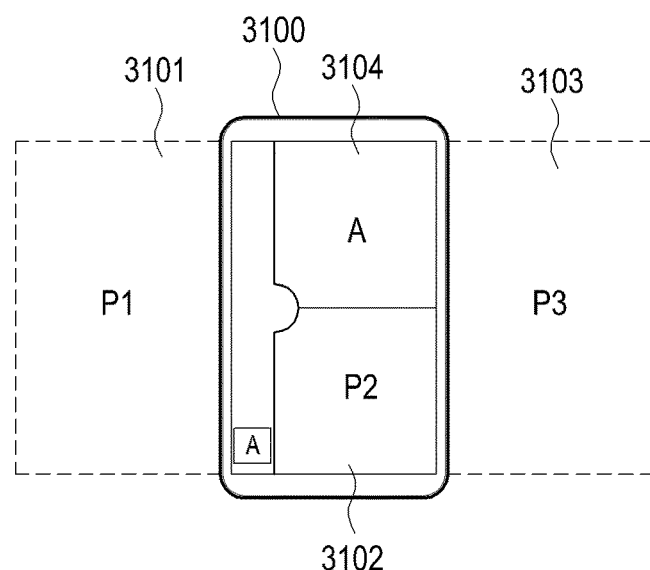

Referring to FIG. 31E, the user may drag the icon of the seventh application A7 to an upper part 3140 of the second page 3102 and then drop the icon of the seventh application A7 as illustrated in FIG. 31G. When the user 10 inputs a drag and drop gesture to an area in which the user desires to execute the application, the controller 110 changes a color or brightness of the area 3140 where the application can be executed in accordance with the drag and drop gesture 3125 into a color or brightness different from an application execution space 3130 of the second page. When the input of the drag and drop gesture ends, the controller 110 controls to display the seventh window 3140 on an upper part of the application execution space 3130 of the second page. Meanwhile, in the application execution space of FIG. 31F, the application execution space physically displayed by the display device 3100 may change from the first page 3101 to the second page 3102. Further, in the application execution space of FIG. 31H, it may be identified that the seventh window 3104 is arranged in an upper part of the second page 3102.

As described above, it is possible to create an effect in which the user can easily execute the application in a desired part of another page which is not the displayed application execution space page.

FIGS. 32A to 32D illustrate a method of executing applications according to an embodiment of the present disclosure. Particularly, various embodiments of FIGS. 32A to 32D illustrate concepts describing a configuration of executing applications in a desired position by using a minimap.

Figure 32A:
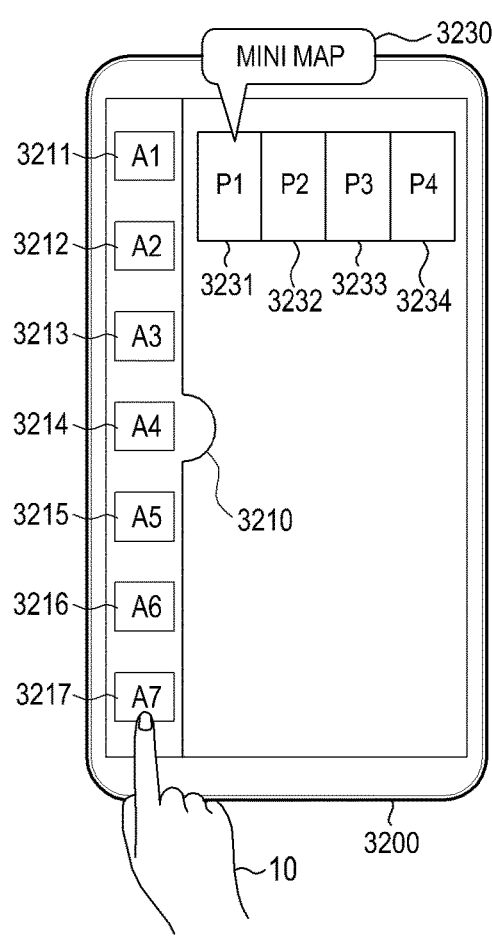
FIGS. 32A, 32B, 32C, and 32D illustrate a method of executing applications according to an embodiment of the present disclosure.

Referring to FIG. 32A, a display device 3200 displays an application execution space 3220. The display device 3200 displays a tray 3210 including icons 3211 to 3217 of executable applications on a left side of the application execution space 3220. The display device 3200 also displays a minimap 3230 of the application execution space on an upper part of the application execution space 3220. A first page 3231, a second page 3232, a third page 3233, and a fourth page 3234 may be displayed on the minimap 3230.

Figure 32B:
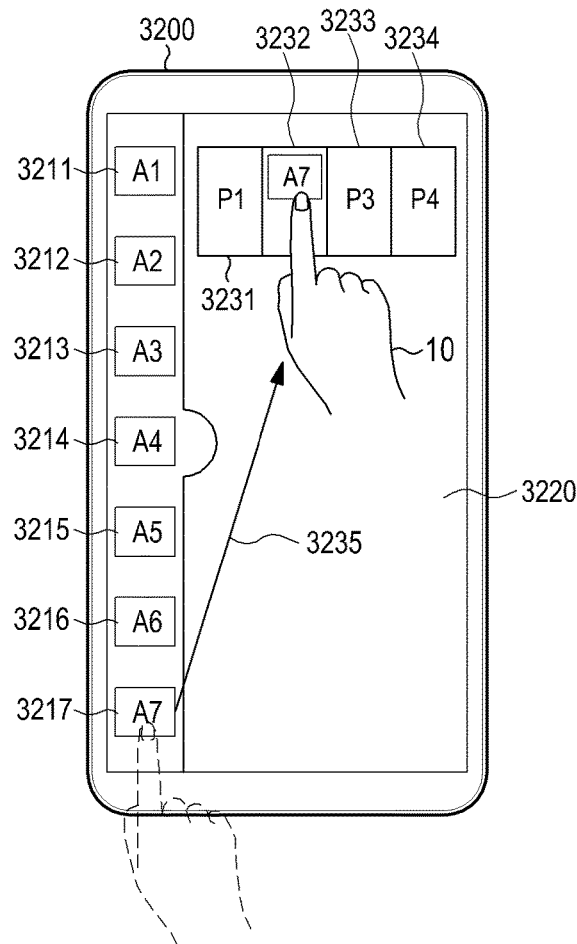

Referring to FIG. 32B, the user 10 may input a drag gesture 3235 from the icon 3217 of the seventh application A7 to an upper part of the second page 3232 in the minimap 3230. The user 10 may drag the application icon to a desired page of the application execution space in which the user desires to execute the application or a desired part of the desired page. The controller 110 may recognize the drag gesture 3235 of the application icon to the minimap as an application execution command. When the application execution command is input, the controller 110 detects an execution page and an execution position in the application execution space. The controller 110 detects an execution page and an execution position of the application execution space based on a set display mode. For example, in FIG. 32B, the display mode may be set as the vertical split mode. Accordingly, when the user 10 drags the icon of the seventh application A7 to the second page 3232 of the minimap 3230 as indicated by the reference numeral 3235, the controller 110 may control to display a ghost-view in the upper part of the second page 3232.

Figure 32C:
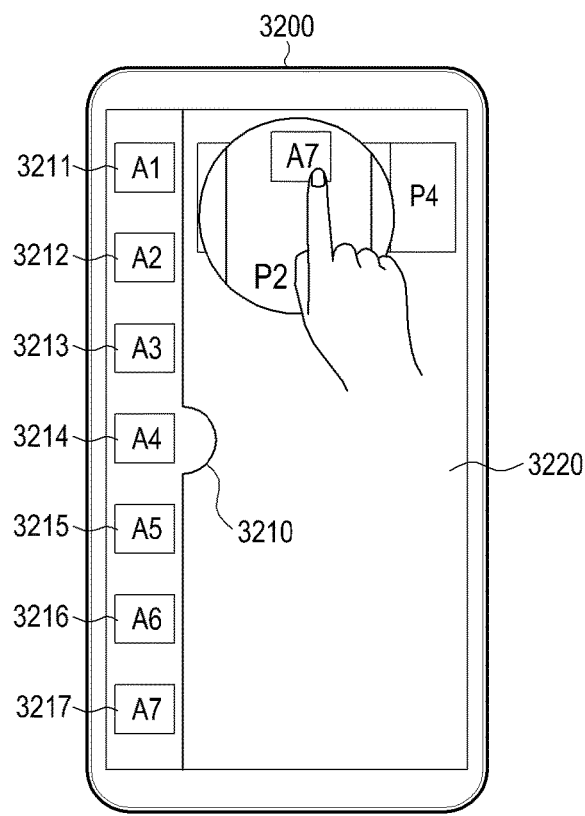
Figure 32D:
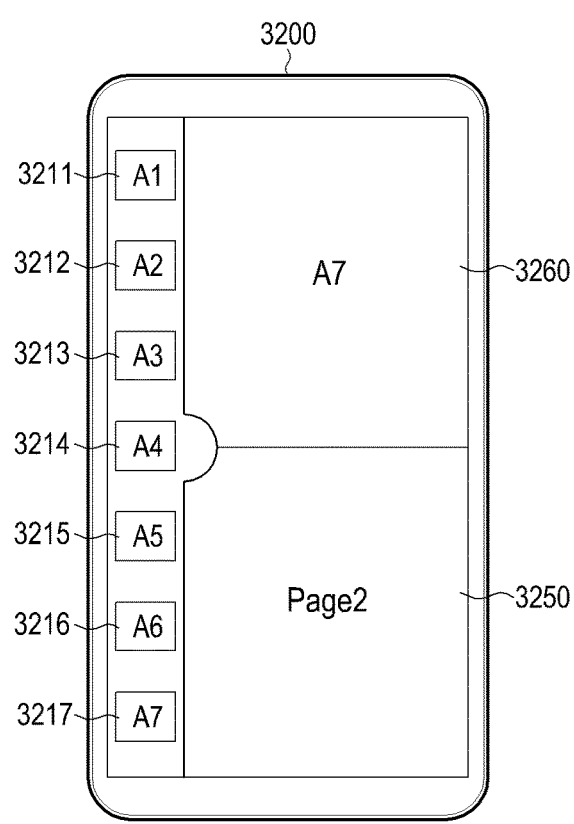

Alternatively, the controller (not shown) may enlarge the second page 3232 of the minimap 3230 into which the drag gesture 3235 has been input and display the enlarged second page 3232 as illustrated in FIG. 32C. Accordingly, the user 10 may determine whether the drag gesture 3235 which the user has input is accurately input. When the input of the drag gesture 3235 ends, the controller (not shown) displays a second page 3250 of the application execution space and displays a seventh window 3260 executing the seventh application A7 on an upper part of the second page 3250 as illustrated in FIG. 32D. As described above, the display mode set as the vertical split mode is merely an example, and it may be easily understood by those skilled in the art that the display device 3200 according to the present disclosure can execute the applications by using the minimap in various modes such as the horizontal split mode, the quarter split mode, the freestyle mode, the full screen mode and the like.

As described above, the user 10 may easily determine the execution page and the execution position in the application execution space by using the minimap 3230.

FIGS. 33A to 33H illustrate concepts describing a method of executing applications according to an embodiment of the present disclosure.

Figure 33A:
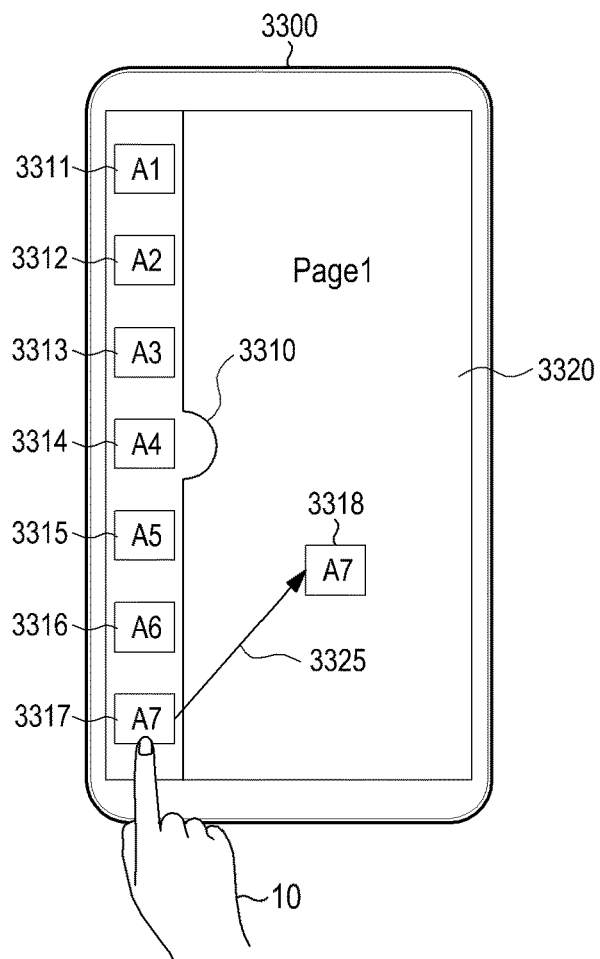
FIGS. 33A, 33B, 33C, 33D, 33E, 33F, 33G, and 33H illustrate a method of executing applications according to an embodiment of the present disclosure.

Referring to FIG. 33A, a display device 3300 displays an application execution space 3320. The display device 3300 displays a tray 3310 including icons 3311 to 3317 of executable applications on a left side of the application execution space 3320. The user 10 may control the display device 3300 to execute a seventh application A7. For example, the user 10 may touch the icon 3317 of the seventh application A7 and input a drag gesture 3325 to the application execution space 3320.

Figure 33B:
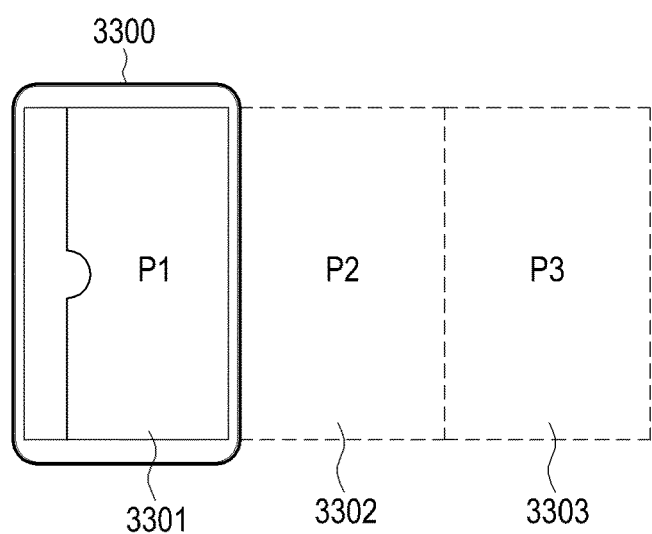

FIG. 33B illustrates a concept of the application execution space, which includes a first page 3301, a second page 3302, and a third page 3303. The page physically displayed by the display device 3300 is the first page 3301. Meanwhile, in FIG. 33A, the user 10 may not end a drag and drop gesture by maintaining a touch for the icon 3317 of the seventh application A7. Accordingly, the controller (not shown) may determine that the application execution command does not end.

Figure 33C:
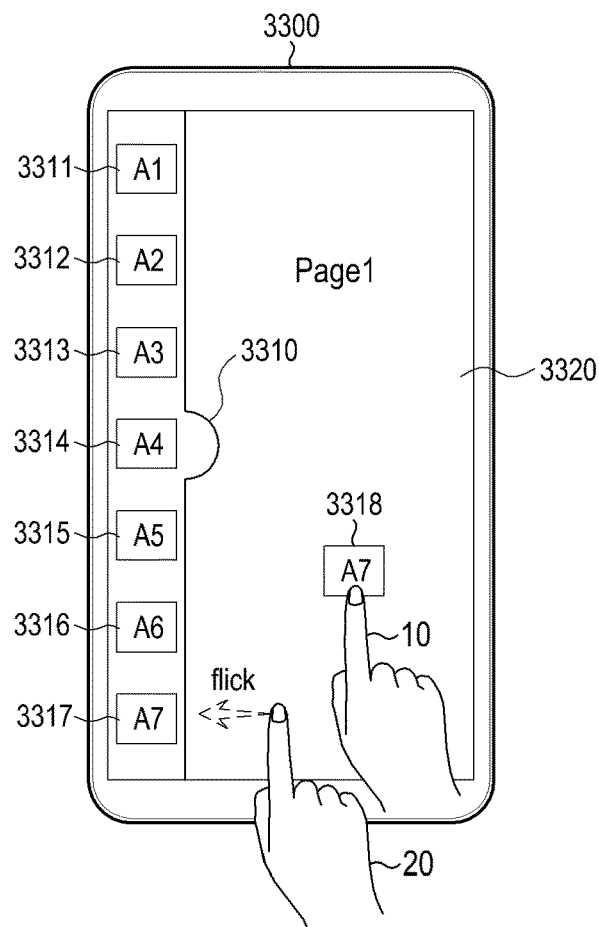
Figure 33D:
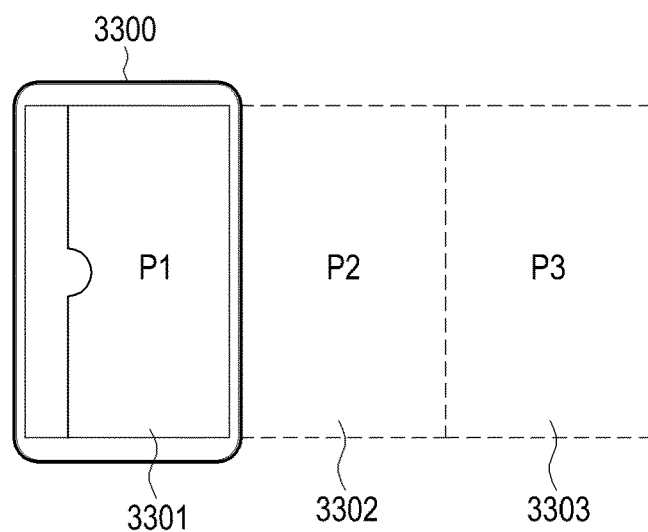

The user 10 may input a flick gesture 20 for the first page 3320 of the application execution space in a left direction while maintaining the touch for the icon 3317 of the seventh application A7. For example, as illustrated in FIG. 33C, the user 10 may maintain the touch for the icon 3318 of the seventh application A7 by using one hand and input the flick gesture 20 by using the other hand. As illustrated in FIG. 33D, the display device 3300 may display a first page 3301 until the time when the flick gesture 20 is input. The controller 110 may recognize a flick gesture in a predetermined direction as a page switching gesture while mainlining the touch for the icon as described above.

Figure 33E:
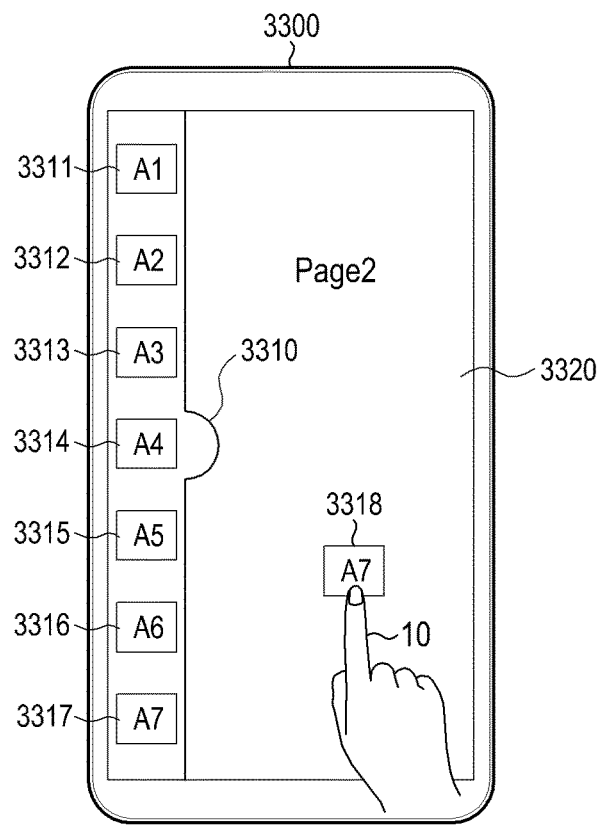
Figure 33F:
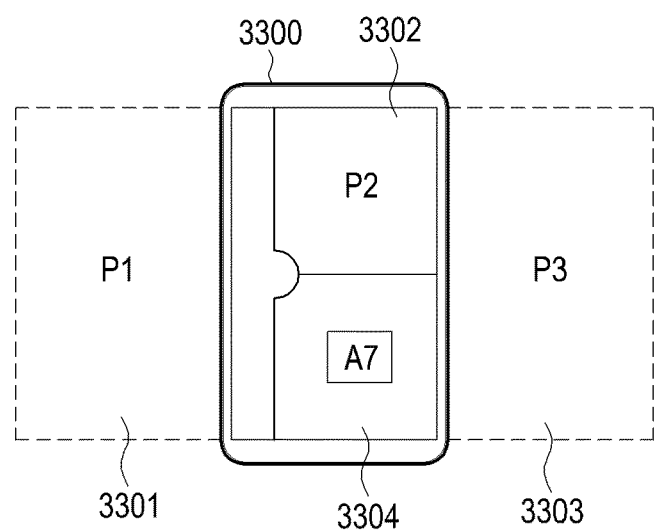

Referring to FIGS. 33E and 33F, the controller 110 switches the page of the physically displayed application execution space from a first page 3320 to a second page 3340. The display mode may be set as the vertical split mode in FIG. 33E, and accordingly, the controller 110 recognizes that the icon 3318 of the seventh application A7 exists in a lower part 3304 of the second page of the application execution space as illustrated in FIG. 33F.

Figure 33G:
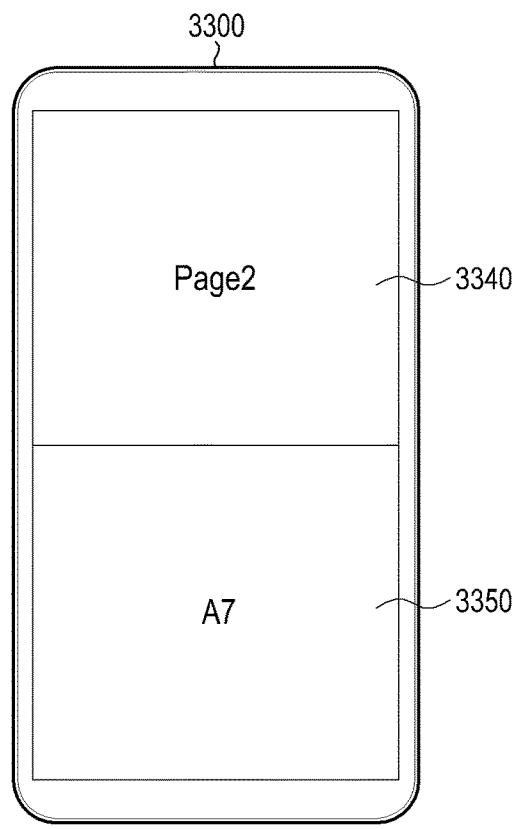
Figure 33H:
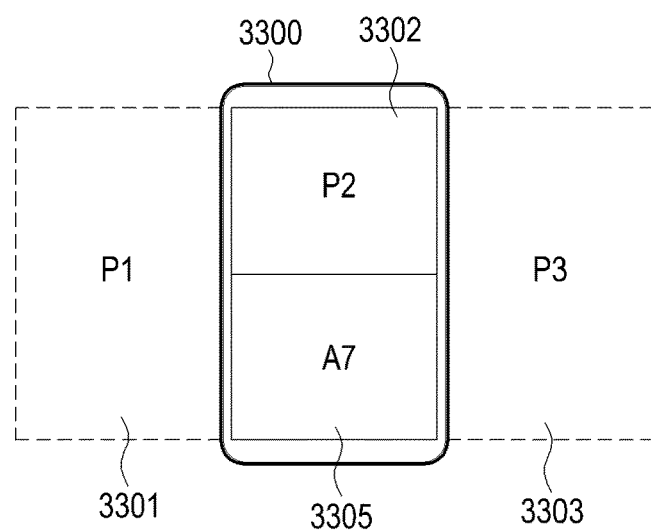

Referring to FIG. 33G, the user may drop the icon 3318 of the seventh application A7, and the controller 110 recognizes that the application execution command is input. The controller 110 controls to display the seventh window 3350 executing the seventh application A7 on the second page 3340 of the application execution space based on the input application execution command. FIG. 33H illustrates the application execution space in which a seventh window 3305 is arranged in a lower part of the second page 3302.

As described above, the user may maintain a touch for an icon of a particular application by using one hand and input a flick gesture in a predetermined direction by using the other hand. Accordingly, the display device may maintain the touched application icon and switch the page of the application execution space. The user may easily control the display device such that the page is moved to a desired page, and easily execute an application in a desired position, thereby maximizing the user's convenience.

Figure 34A:
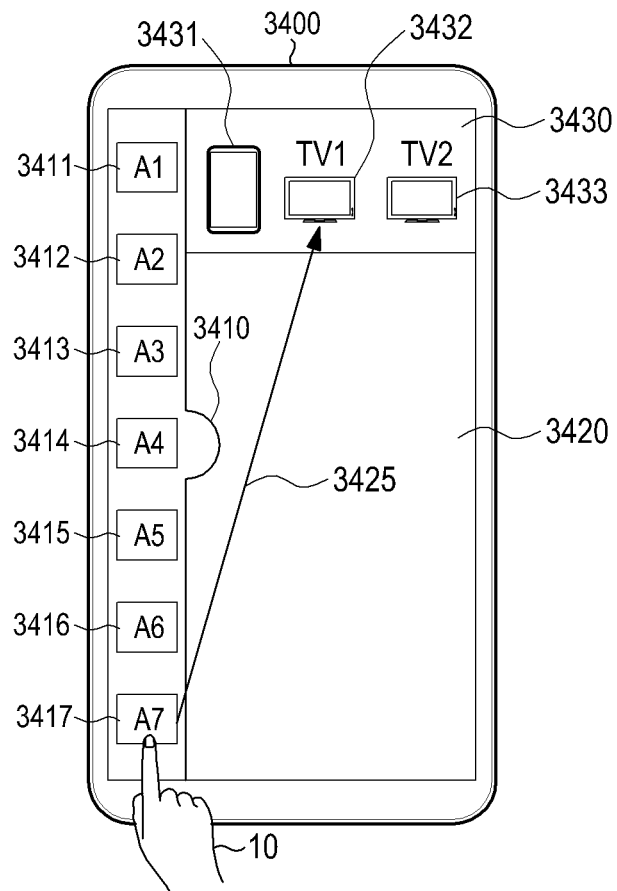
FIGS. 34A, 34B, and 34C illustrate operations of a display device and a tablet PC in a cloud system according to an embodiment of the present disclosure.
Figure 34B:
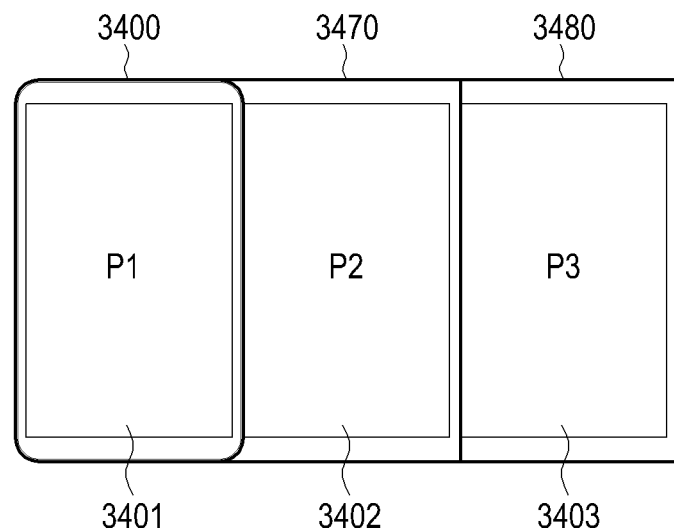
Figure 34C:
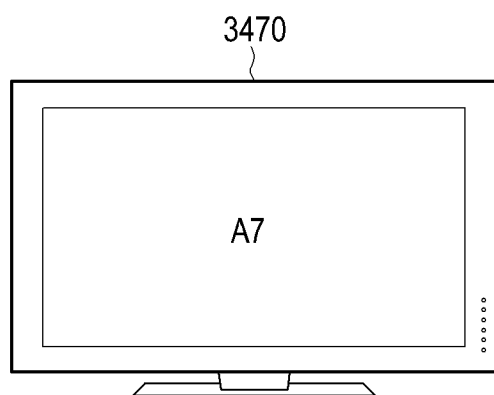

FIGS. 34A to 34C illustrate operations of a display device and an Internet TV in a cloud system according to an embodiment of the present disclosure.

FIGS. 34A to 34C illustrate concepts of a display device 3400 and an Internet TV 3470, respectively. The display device 3400 and the Internet TV 3470 are relayed by the server (not shown) and thus may be connected with each other as illustrated in FIG. 26A. Alternatively, the display device 3400 and the Internet TV 3470 may be connected through short distance communication such as Bluetooth®, Infrared Data Association (IrDA), ZigBee® and the like.

Referring to FIG. 34A, the display device 3400 displays an application execution space 3420. The display device 3400 displays a tray 3410 including icons 3411 to 3417 of executable applications on a left side of the application execution space 3420. The display device 3400 may further display a minimap 3430 displaying icons corresponding to at least one device connected to the display device 3400. For example, the minimap 3430 may include icons corresponding to a display device 3431, a first Internet TV 3432, and a second Internet TV 3433.

The user may control the display device 3400 to execute a seventh application A7. For example, the user 10 may touch the icon 3417 of the seventh application A7 and input a drag gesture 3425 to the first Internet TV 3432 as illustrated in FIG. 34A.

FIG. 34B illustrates the application execution space set by the display device 3400. The application execution space includes a first page 3401, a second page 3402, and a third page 3403. The first page 3401 may be physically displayed in the display device 3400, the second page 3402 may be physically displayed in the first Internet TV 3470, and the third page 3403 may be physically displayed in a device 3480. As illustrated in FIG. 34C, the first Internet TV 3470 may display the seventh application A7.

As described above, it is possible to create an effect of easily executing the application in another device connected to the display device based on the cloud system and the application execution space.

Figure 35:
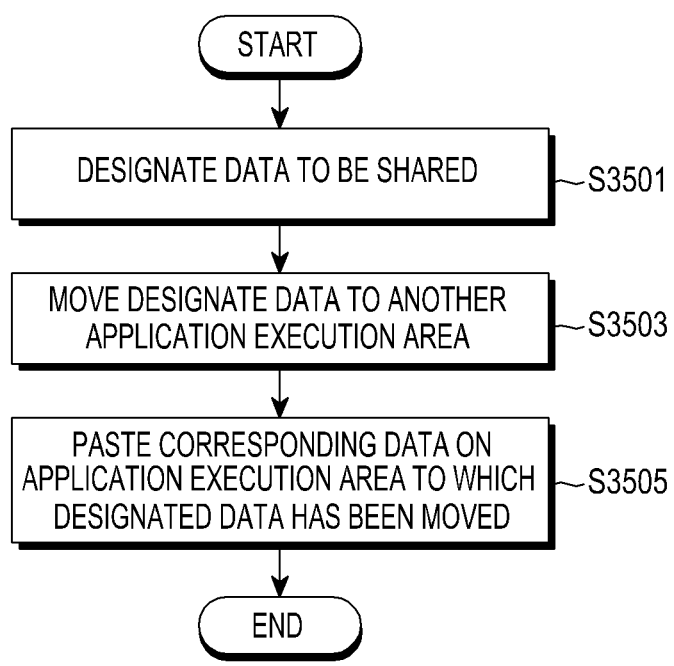
FIG. 35 is a flowchart illustrating a method of controlling a display device according to an embodiment of the present disclosure.

FIG. 35 is a flowchart describing a method of controlling a display device according to an embodiment of the present disclosure. FIGS. 36A to 36E illustrate a method of executing applications according to an embodiment of the present disclosure The control method of FIG. 35 will be described with reference to FIGS. 36A to 36E.

Figure 36A:
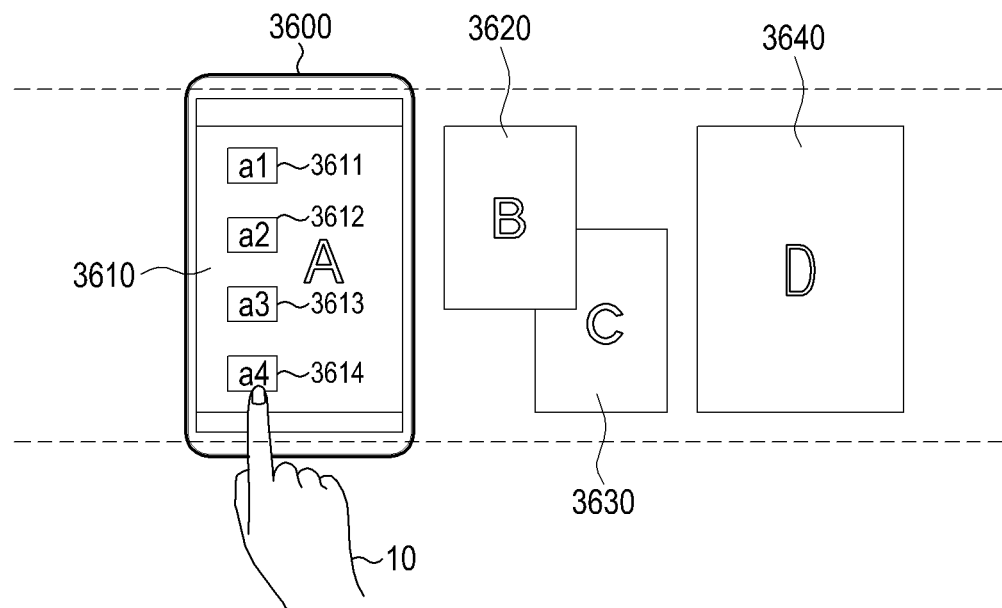
FIGS. 36A, 36B, 36C, 36D, and 36E illustrate a method of executing applications according to an embodiment of the present disclosure.

Referring to FIG. 35, the display device may receive designated data to be shared in operation S3501. FIG. 36A illustrates a concept of the application execution space set by a display device 3600.

In the application execution space, a first window 3610 executing a first application A may be set to a first page through a full screen, a second window 3620 executing a second application B and a third window 3630 executing a third application C may be set to a second page in a freestyle mode, and a fourth window 3640 executing a fourth application D may be set to a third page through a full screen. The display device 3600 may physically display the first window 3610. A first view 3611, a second view 3612, a third view 3613, and a fourth view 3614 displayed by an execution of the first application may be displayed on the first window 3610.

The user 10 may desire to share the fourth view 3614 with another application. Accordingly, the user 10 may designate data to be shared, for example, the fourth view 3614 as illustrated in FIG. 36A. The sharing may refer to copy and paste or cut and paste. Further, the data may be a character string, a Uniform Resource Locator (URL) address, a file path, multimedia data or the like. The multimedia data may be audio data, video data, image data or complex data.

Figure 36B:
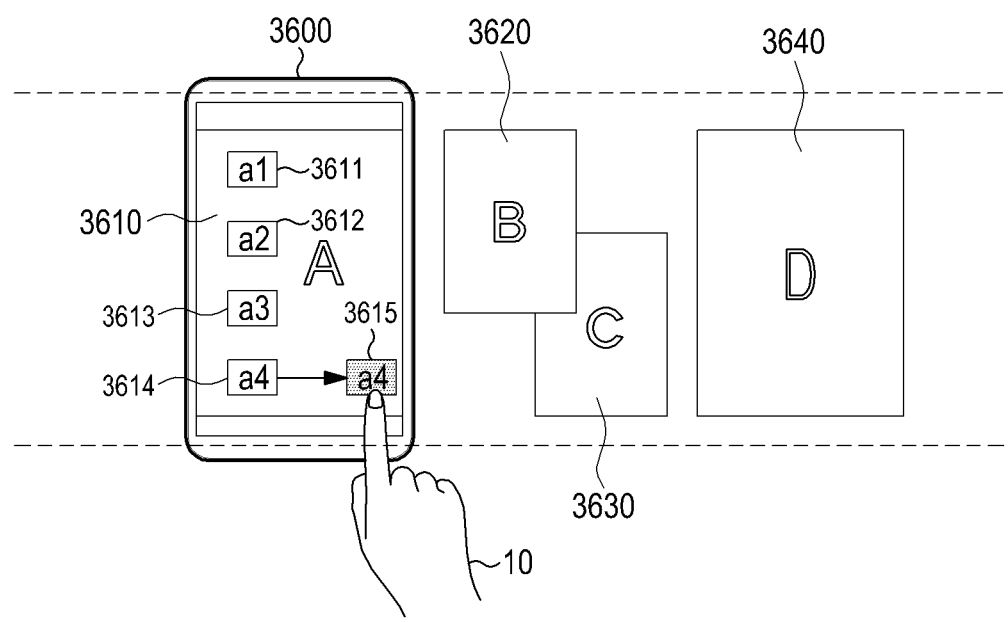

Referring to FIG. 36B, the user 10 may input a drag gesture from the designated view 3614. The controller 110 controls to visualize the designated data and display the visualized data 3615 at a touched point in accordance with the input drag gesture. Accordingly, the user 10 may detect the designated data and also determine whether the designated data is in a share command input state. Meanwhile, the controller (not shown) may store the designated data in a clipboard. The visualized data 3615 may be a thumbnail image of the view 3614.

The user 10 may share data by dragging and dropping the visualized data 3615 to another window. The visualized data 3615 may be a thumbnail image of the data. The display device 3600 may share the data by the window to which the visualized data 3615 has been dragged and dropped. The user 10 may drag the visualized data 3615 to a right boundary of the first page of the application execution space. The controller 110 recognizes the drag gesture to the right boundary as an application execution space switching gesture. Accordingly, the controller 110 switches the physically displayed application execution space from the first page to the second page.

Referring back to FIG. 35, the display device 3600 may receive a data sharing command of moving designated data to an execution area of another application in operation S3503.

Figure 36C:
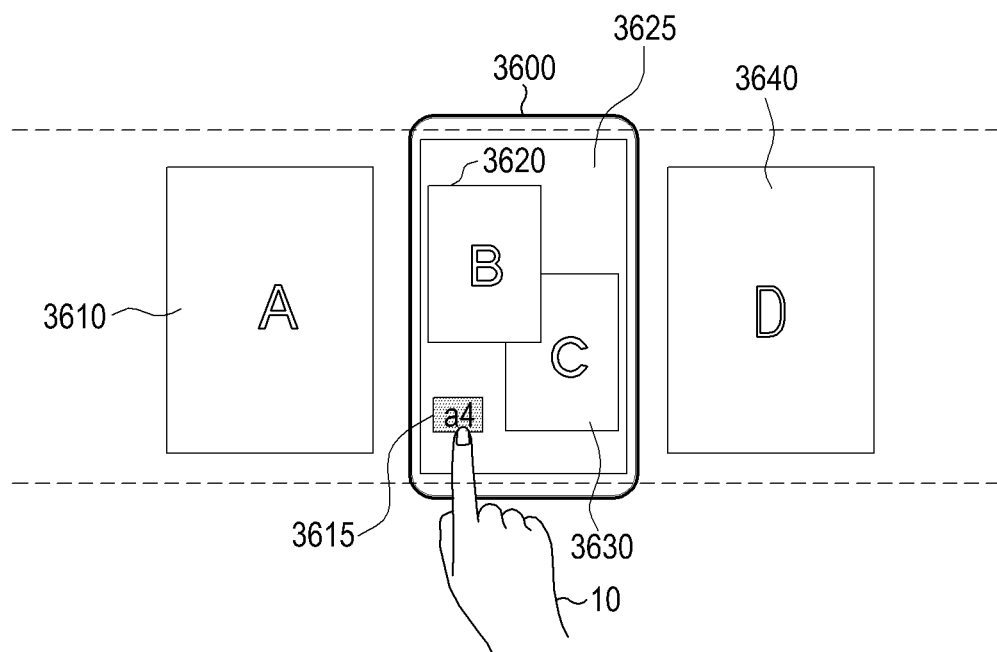
Figure 36D:
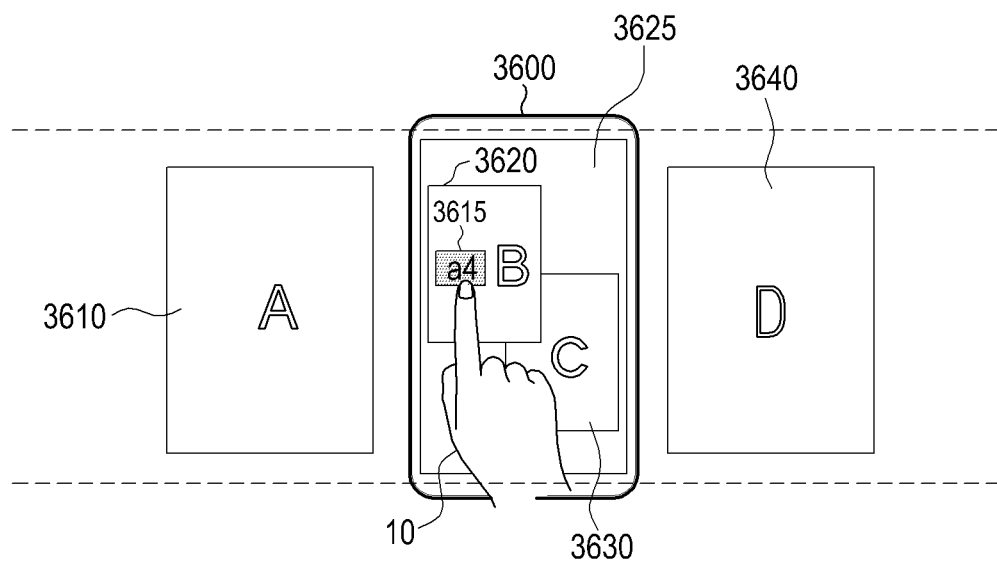

Referring to FIG. 36C, the display device 3600 displays the second page of the application execution space in which the second window 3620 and the third window 3630 are displayed in the freestyle mode. The user 10 drags the visualized data 3615 to the second window 3620 in FIG. 36D, and drops the visualized data 3615 to the second window 3620 in FIG. 36E.

Figure 36E:
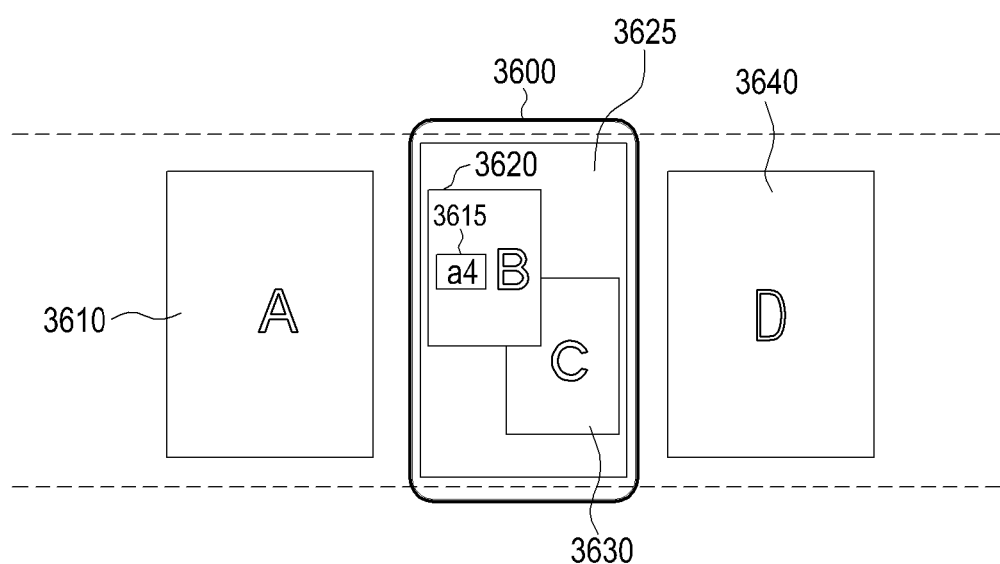

Referring back to FIG. 35, the display device 3600 may share corresponding data in the application execution space to which the designated data has been moved in operation S3505. As illustrated in FIG. 36E, the fourth view 3615 may be arranged on the second window 3620. The second application B executed on the second window 3620 may share and use the fourth view 3615. For example, when the second application B is a memo pad application and the fourth view 3615 is image data, the image may be copied to the memo pad.

As described above, the user 10 may share the data by dragging and dropping the data desired to be shared to the desired window. The data may be easily shared by switching and searching for the application execution space of the desired window.

Figure 37:
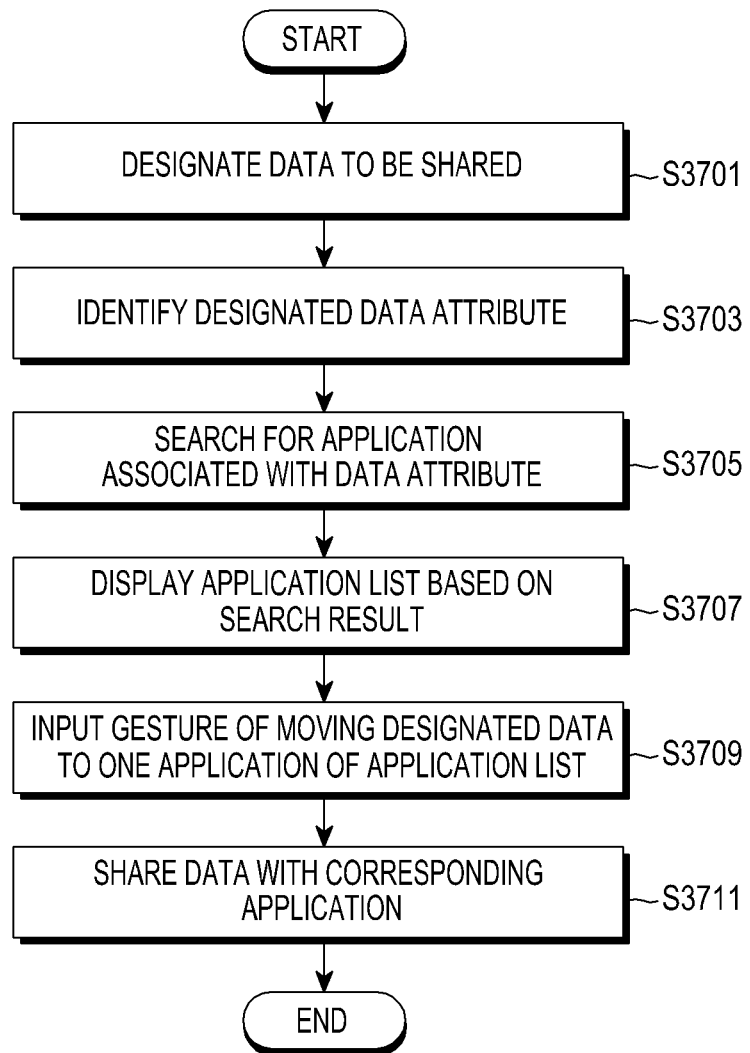
FIG. 37 is a flowchart illustrating a data sharing method according to another embodiment of the present disclosure.
Figure 38A:
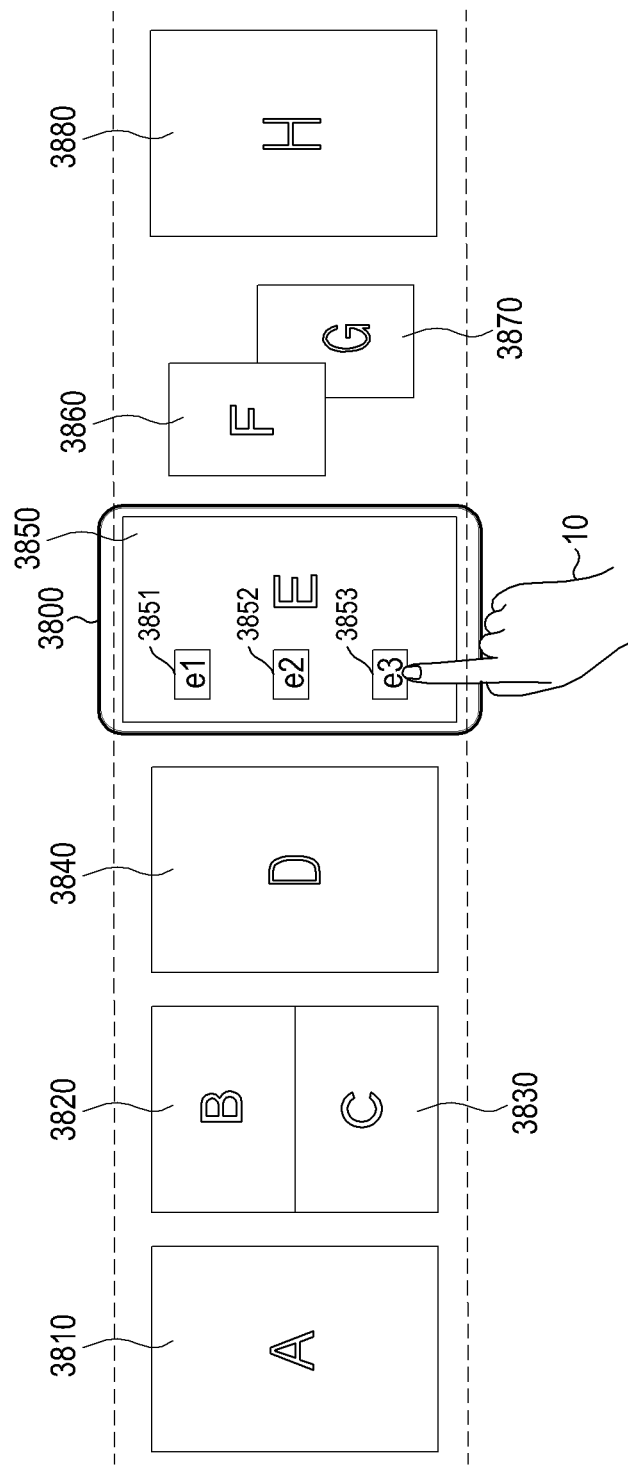
FIGS. 38A, 38B, and 38C illustrate a data sharing method according to an embodiment of the present disclosure.
Figure 38B:
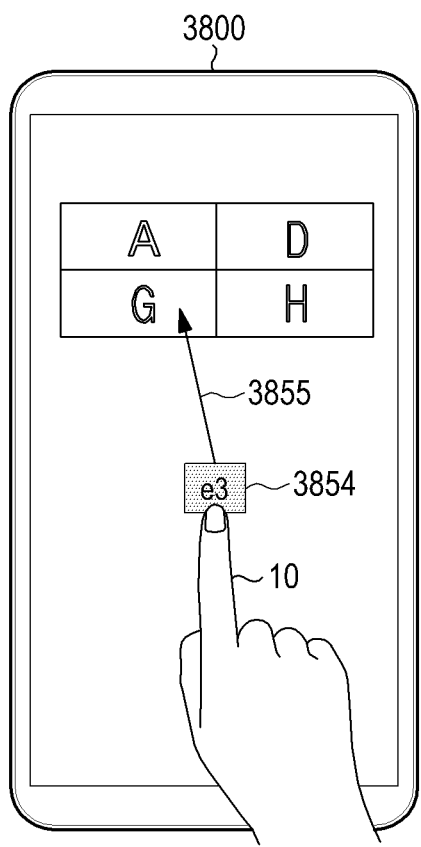
Figure 38C:
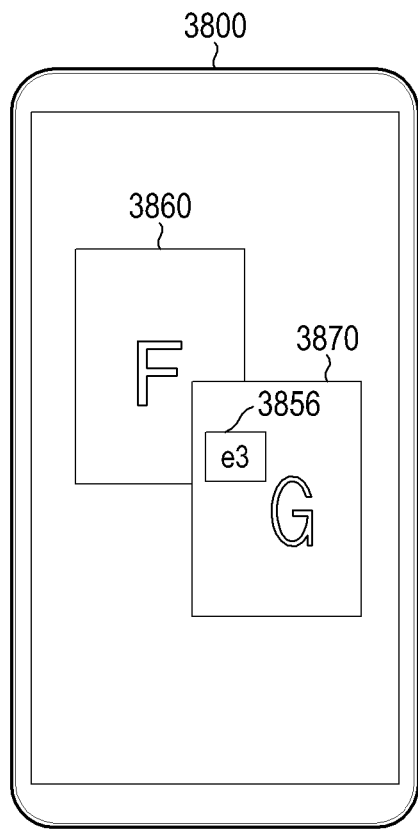

FIG. 37 is a flowchart describing a method of sharing data according to another embodiment of the present disclosure. FIGS. 38A to 38C illustrate a data sharing method according to an embodiment of the present disclosure. The data sharing method of FIG. 37 will be described with reference to FIGS. 38A to 38C.

Referring to FIG. 37, the display device may receive designated data to be shared in operation S3701. FIG. 38A illustrates the application execution space set by a display device 3800. In the application execution space, a first window 3810 executing a first application A may be set to a first page through a full screen, a second window 3820 executing a second application B and a third window 3830 executing a third application C may be set to a second page in a vertical split mode, a fourth window 3840 executing a fourth application D may be set to a third page through a full screen, a fifth window 3850 executing a fifth application E may be set to a fourth page through a full screen, a sixth window 3860 executing a sixth application F and a seventh window 3870 executing a seventh application G may be set to a fifth page in a freestyle mode, and an eighth window 3880 executing an eighth application H may be set to a sixth page through a full screen. The display device 3800 may physically display the fourth page, that is, the fifth window 3850. A first view 3851, a second view 3852, and a third view 3853 displayed by an execution of the fifth application may be displayed on the fifth window 3850. The user 10 may touch the third view 3853 to designate the third view 3853 as shared data.

Referring back to FIG. 37, the controller 110 may identify an attribute of the designated data in operation S3703. The controller 110 may analyze header information of the designated data and extract meta information specifying the data attribute. The meta information may be a mime type or a newly defined type.

The controller 110 may search for an application which can use the designated data based on the identified attribute in operation S3705. The controller 110 may search for an application which can use the extracted meta information among applications which are being executed. For example, the controller 110 may detect that the first application A, the fourth application D, the seventh application G, and the eighth application H can use the third view 3853.

The controller 110 may control to display an application list according to a result of the search in operation S3707. FIG. 38B illustrates the application list described in operation S3707. The controller 110 controls to display a list including the first application A, the fourth application D, the seventh application G, and the eighth application H according to the search result.

Referring back to FIG. 37, the display device 3800 may receive a gesture 3855 of moving the designated data to one of the applications included in the application list in operation S3709. For example, as illustrated in FIG. 38B, the user 10 may drag visualized data 3854 to the seventh application G of the application list.

The controller 110 may share the corresponding data with the selected application in operation S3711. Further, the controller (not shown) controls to physically display a window executing the selected application.

Referring to FIG. 38C, the controller 110 displays the fifth page of the application execution space in which the seventh window 3870 executing the seventh application G is arranged. Accordingly, the display device 3800 may display the sixth window 3860 and the seventh window 3870 in the freestyle mode. The third view 3856 may be displayed on the seventh window 3870. The controller 110 may assign a higher task order to the seventh application G into which a gesture is most recently input in comparison with the sixth application F. Accordingly, the controller 110 controls such that the seventh window 3870 is displayed while covering the sixth window 3860.

Figure 39:
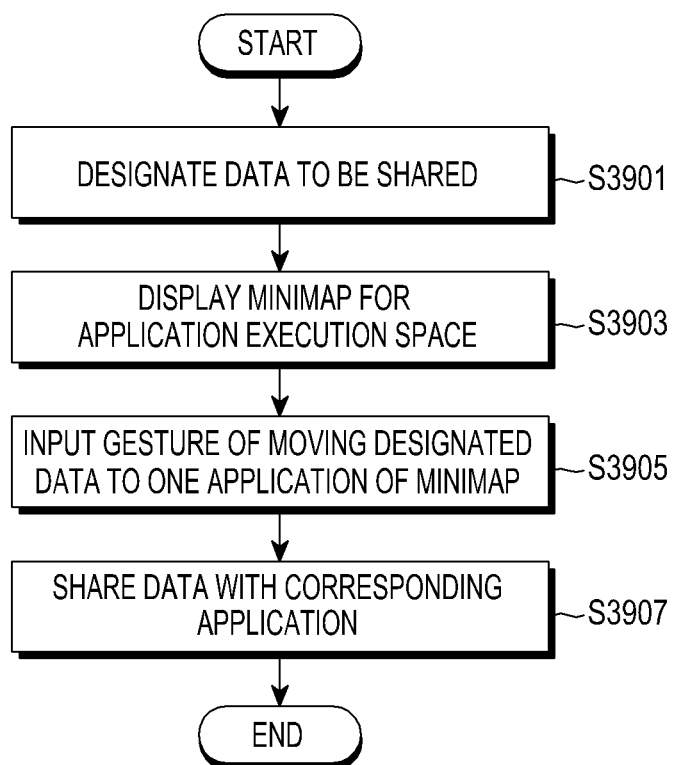
FIG. 39 illustrates a data sharing method according to another embodiment of the present disclosure.

FIG. 39 illustrates a method of sharing data according to another embodiment of the present disclosure. FIGS. 40A to 40D illustrate a data sharing method according to an embodiment of the present disclosure. The data sharing method of FIG. 39 will be described with reference to FIGS. 40A to 40D.

Figure 40A:
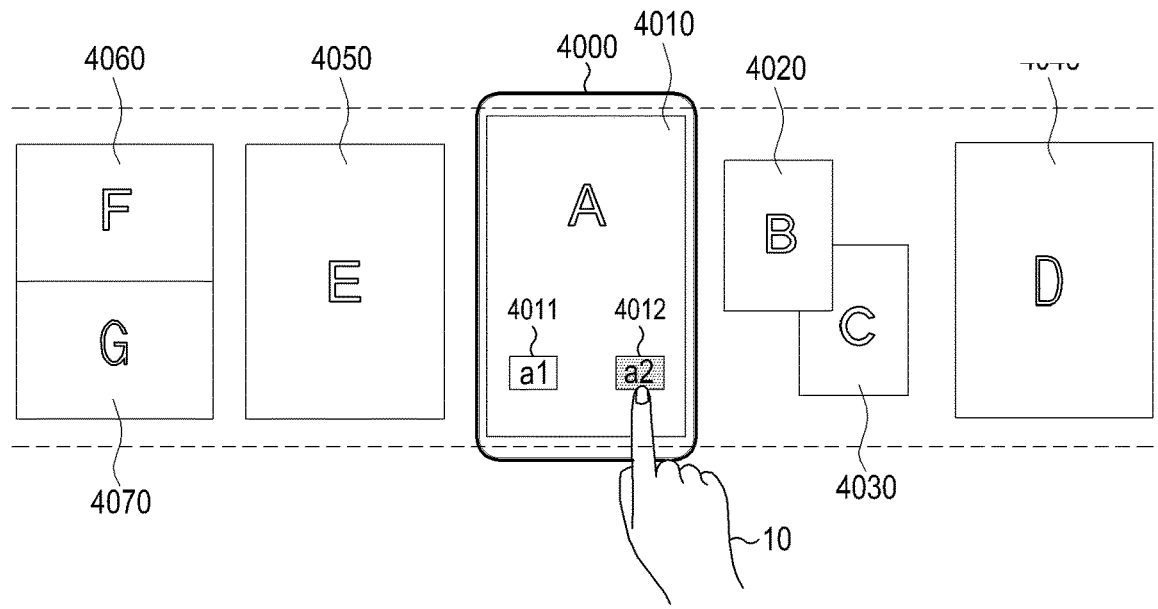

Referring to FIG. 39, the display device may receive designated data to be shared in operation S3901. FIG. 40A illustrates a concept of the application execution space set by a display device 4000. In the application execution space, a sixth window 4060 executing a sixth application F and a seventh window 4070 executing a seventh application G may be set to a first page in the vertical split mode, a fifth window 4050 executing a fifth application E may be set to a second page through a full screen, a first window 4010 executing a first application A may be set to a third page through a full screen, a second window 4020 executing a second application B and a third window 4030 executing a third application C may be set to a fourth page in the freestyle mode, and a fourth window 4040 executing a fourth application D may be set to a fifth page through a full screen. A first view 4011 and a second view 4012 may be displayed on the first window 4010.

The user 10 may touch the second view 4012 to designate the second view 4012 as data to be shared.

Figure 40B:
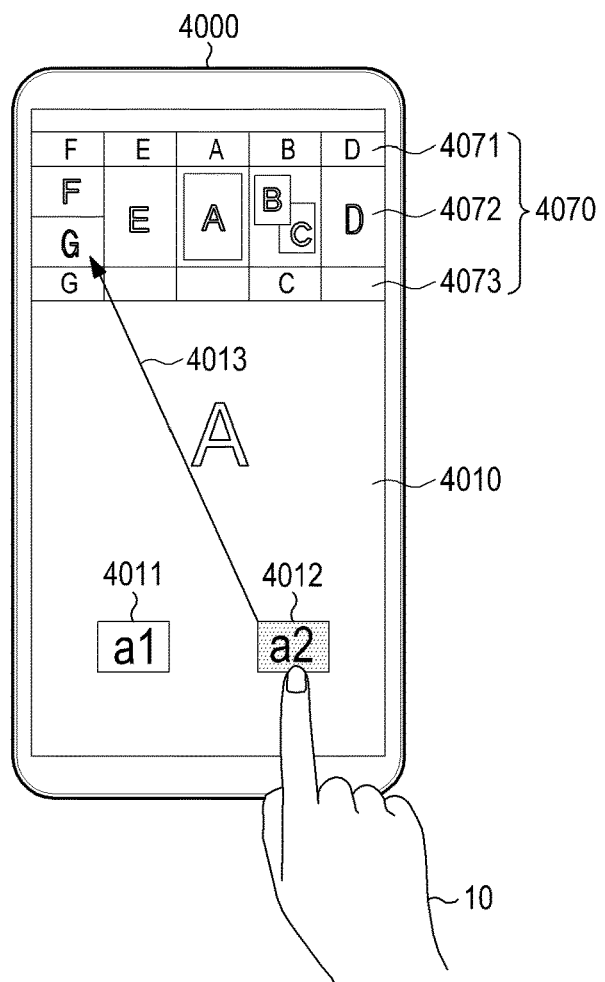

Referring back to FIG. 39, the display device may display a minimap for the application execution space in operation S3903. Referring to FIG. 40B, the controller (not shown) may control to display a minimap 4070 for the application execution space. An application execution space arrangement area 4072 and application identifier areas 4071 and 4073 may be displayed on the minimap 4070.

The display device 4000 may receive a gesture of moving the designated data to one application of the minimap in operation S3905. As illustrated in FIG. 40B, the user 10 may input a drag gesture 4013 from visualized data 4053 to the window corresponding to the seventh application G of the minimap 4073. When a drag gesture to one window of the minimap 4073 is input, the controller 110 controls to display an application execution space page including the corresponding window. For example, as illustrated in FIG. 40C, the controller 110 displays a first page of the application execution space in which the seventh window 4070 executing the seventh application G is arranged. Accordingly, the display device 4000 may display the sixth window 4060 and the seventh window 4070 in the vertical split mode. Visualized data 4012 may be displayed on the seventh window 4070.

The user 10 may drop the visualized data 4012 as illustrated in FIG. 40D, and accordingly, the controller 110 may share the data with the application executed in the window to which the designated data has been moved in operation S3907. As illustrated in FIG. 40D, the controller 110 controls to display the second view 4015 on the seventh window 4070.

Figure 41:
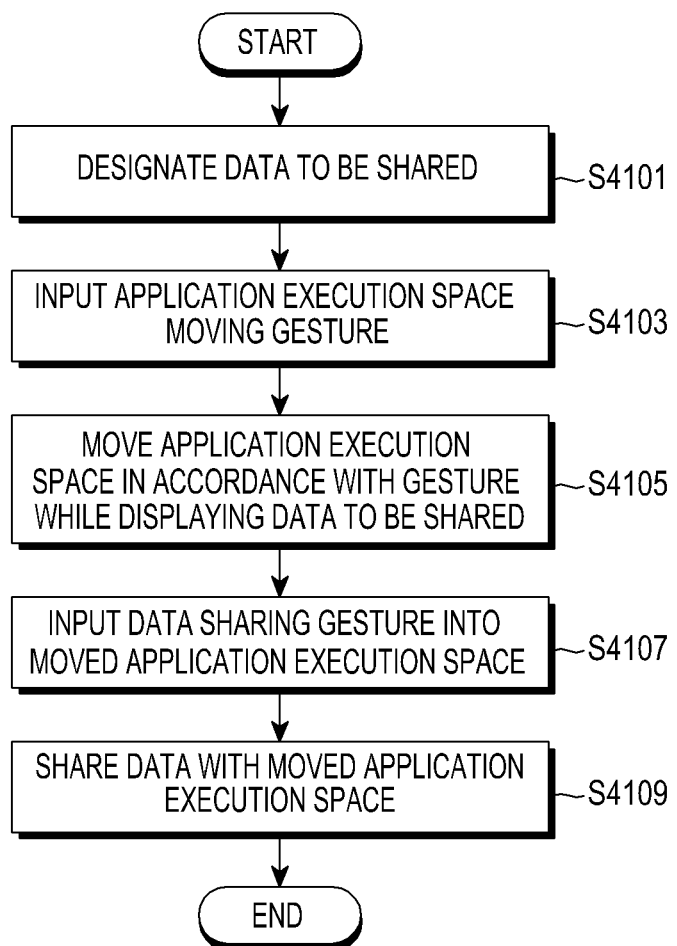
FIG. 41 is a flowchart illustrating a data sharing method according to another embodiment of the present disclosure.
Figure 42A:
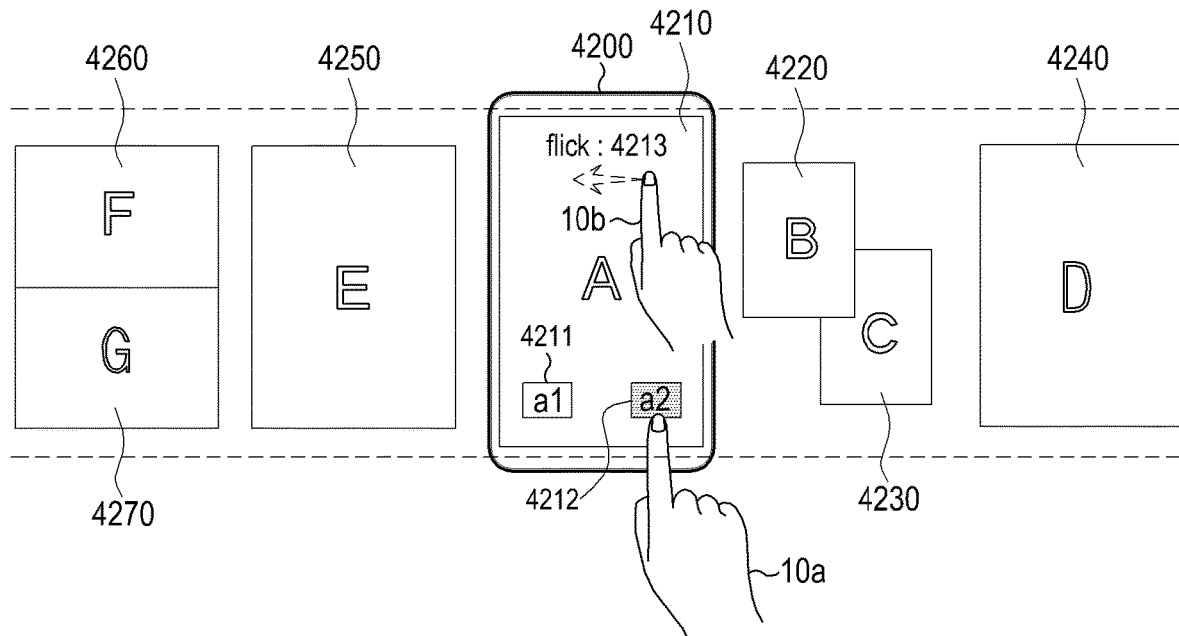
FIGS. 42A, 42B, and 42C illustrate a data sharing method according to an embodiment of the present disclosure.
Figure 42B:
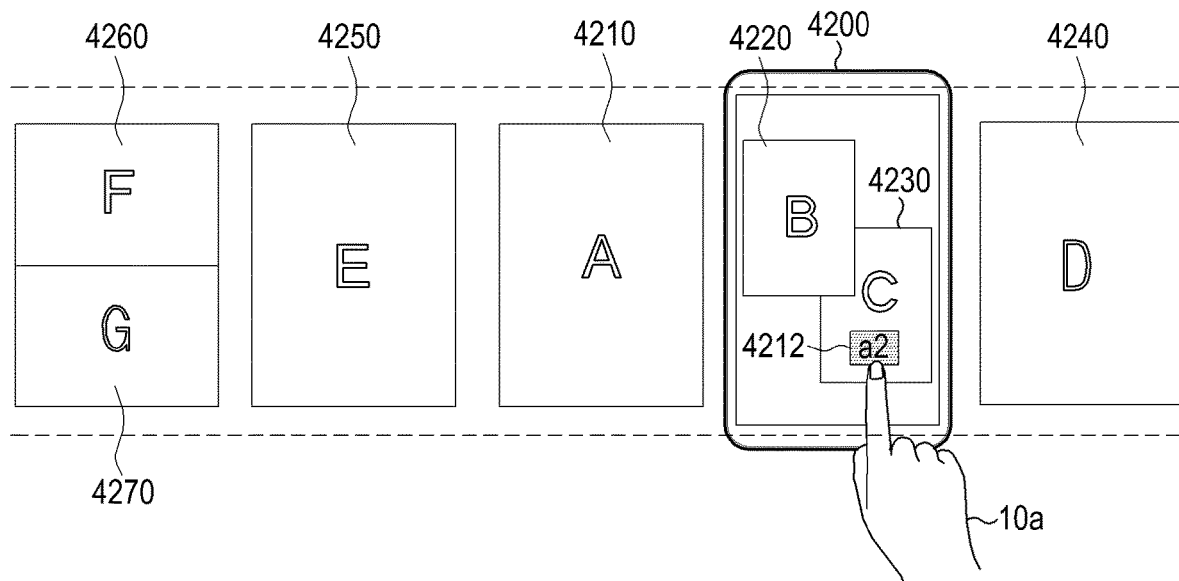
Figure 42C:
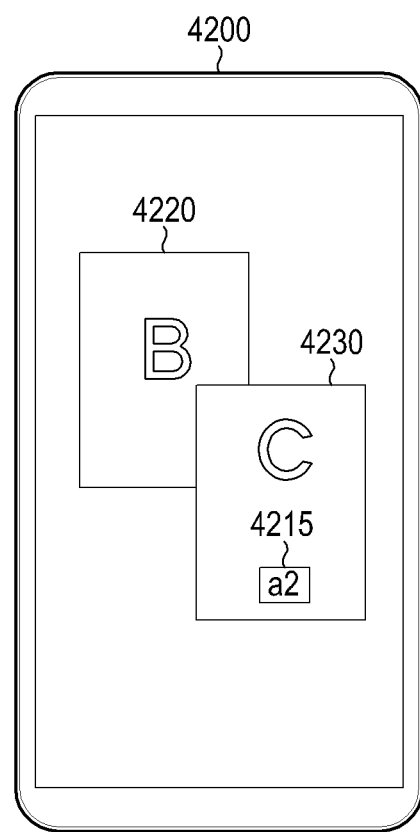

FIG. 41 is a flowchart describing a method of sharing data according to still another embodiment of the present disclosure. FIGS. 42A to 42C illustrate a data sharing method according to an embodiment of the present disclosure The data sharing method of FIG. 41 is described with reference to FIGS. 42A to 42C.

Referring to FIG. 41, the display device may receive designated data to be shared in operation S4101. FIG. 42A illustrates the application execution space set by a display device 4200. In the application execution space, a sixth window 4260 executing a sixth application F and a seventh window 4270 executing a seventh application G may be set to a first page in the vertical split mode, a fifth window 4250 executing a fifth application E may be set to a second page through a full screen, a first window 4210 executing a first application A may be set to a third page through a full screen, a second window 4220 executing a second application B and a third window 4230 executing a third application C may be set to a fourth page in the freestyle mode, and a fourth window 4240 executing a fourth application D may be set to a fifth page through a full screen. Meanwhile, a first view 4211 and a second view 4212 may be displayed on the first window 4210. The user 10 may touch the second view 4212 to designate the second view 4212 as data to be shared.

Referring back to FIG. 41, the display device 4200 may receive an application execution space moving gesture in operation S4013. The user 10 may input a flick gesture 4213 for the third page of the application execution space in a left direction while maintaining a touch for visualized data 4212. For example, the user 10 may maintain the touch for the visualized data 4212 by using one hand 10a and input a flick gesture 4213 by using the other hand 10b. As illustrated in FIG. 42A, the display device 4200 may display the first page 4210 until the time when the flick gesture 20 is input. The controller 110 may recognize a motion of inputting a flick gesture in a predetermined direction while maintaining a touch for an icon as a page switching gesture.

Referring back to FIG. 41, the display device 4200 may switch a page of the application execution space while displaying data to be shared in accordance with an input gesture in operation S4105. The user may input a data sharing gesture into the application data space in operation S4107.

As illustrated in FIG. 42B, the controller 110 switches a page of the physically displayed application execution space from the third page to the fourth page. Accordingly, the display device 4200 may display the second window 4220 and the third window 4230 arranged in the fourth page in the freestyle mode. The user 10 may move the visualized data 4212 to the third window 4230.

The display device may receive a data sharing gesture through the window of the application execution space to which the data has been moved. In FIG. 42B, the user 10 may drop the visualized data 4212 to the third window 4230. Accordingly, the controller 110 may share the data with the application executed in the window to which the designated data has been moved in operation S4109. As illustrated in FIG. 42C, the controller 110 controls to display a second view 4215 on the third window 4230. The controller 110 may control such that the third window is displayed while covering the second window 4220.

FIGS. 43A to 43E illustrate a cloud system according to an embodiment of the present disclosure.

Figure 43A:
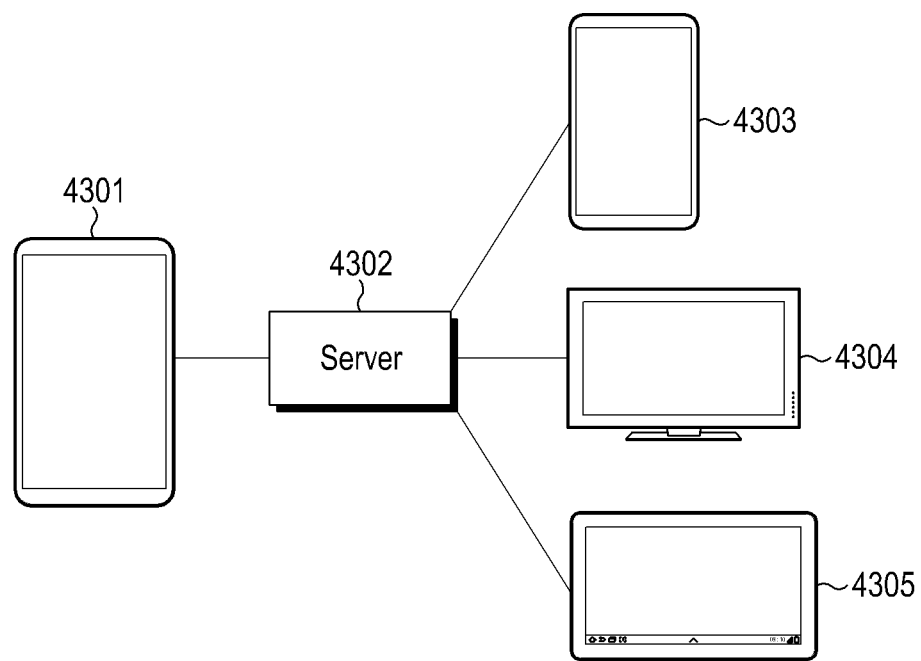
FIGS. 43A, 43B, 43C, 43D, and 43E illustrate a cloud system according to an embodiment of the present disclosure.

Referring to FIG. 43A, a cloud system may include a master display device 4301, a server 4302, a display device 4303, an Internet TV 4304, and a tablet PC 4305. The master display device 4301 may be connected to the server 4302, and the server 4302 may be connected with the display device 4303, the Internet TV 4304, and the tablet PC 4305. The master display device 4301 may communicate with the server 4302 in a preset scheme. The display device 4303, the Internet TV 4304, and the tablet PC 4305 may also communicate with the server 4302 in a preset scheme. Accordingly, the master display device 4301 can communicate with the display device 4303, the Internet TV 4304, and the tablet PC 4305.

Figure 43B:
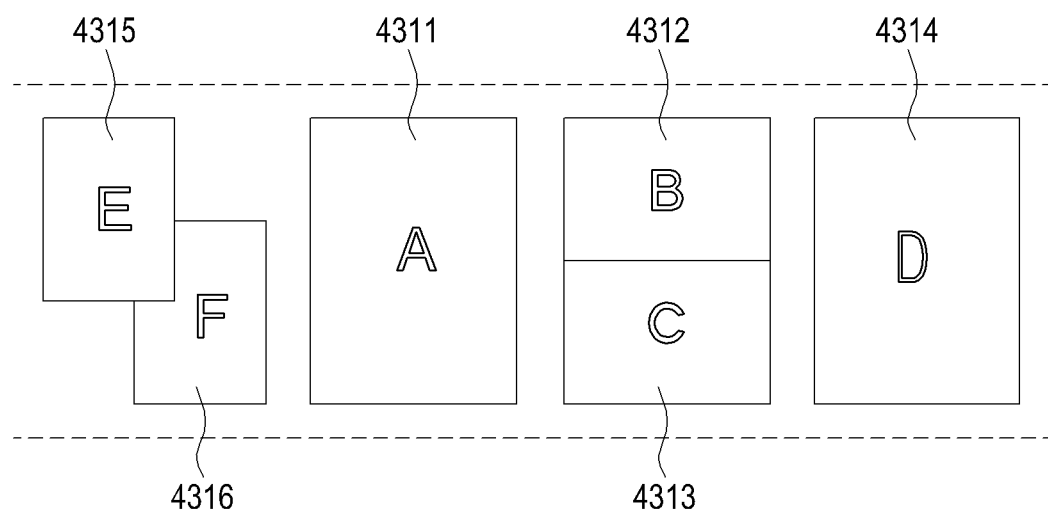

FIG. 43B illustrates the application execution space set by the master display device 4301. The master display device 4301 sets a first window 4311 executing a first application A, a second window 4312 executing a second application B, a third window 4313 executing a third application C, a fourth window 4314 executing a fourth application D, a fifth window 4315 executing a fifth application E, and a sixth window 4316 executing a sixth application F on the application execution space. The master display device 4301 manages the application execution space for each page. The master display device 4301 arranges the first window 4311 in a first page of the application execution space, the second window 4312 and the third window 4313 in a second page of the application execution space, the fourth window 4314 and the fifth window 4315 in a third page of the application execution space, and the sixth window 4316 in a fourth page of the application execution space.

Figure 43C:
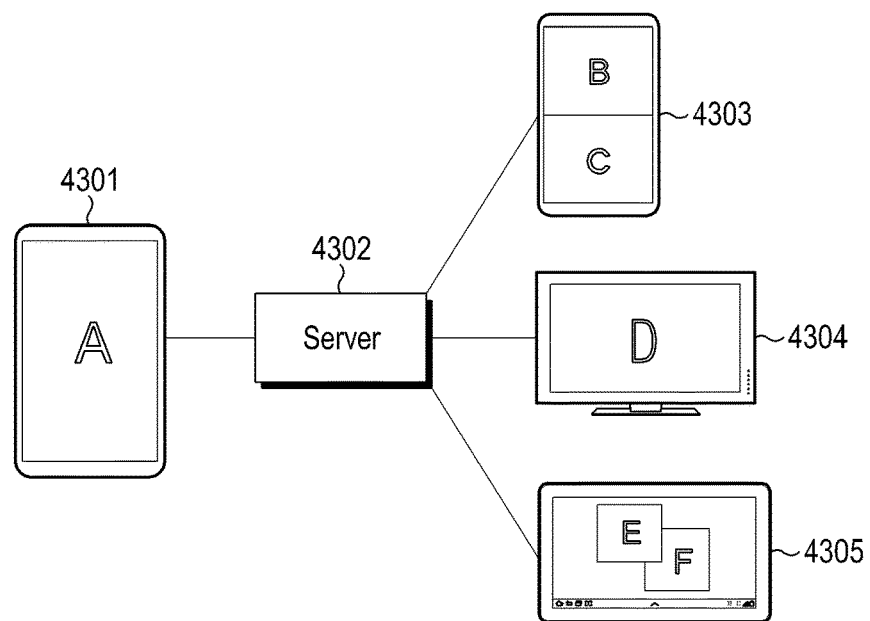

Referring to FIG. 43C, the master display device 4301 displays the second page of the application execution space on the display device 4303 through the server 4302. The master display device 4301 displays the third page of the application execution space on the Internet TV 4304 through the server 4302. The master display device 4301 displays the fourth page of the application execution space on the tablet PC 4305 through the server 4302. In contrast to the related art in which the master display device 4301 and the Internet TV 4304 are mirrored, the master display device 4301 and other connected devices 4303, 4304, and 4305 display different screens in the present disclosure.

Figure 43D:
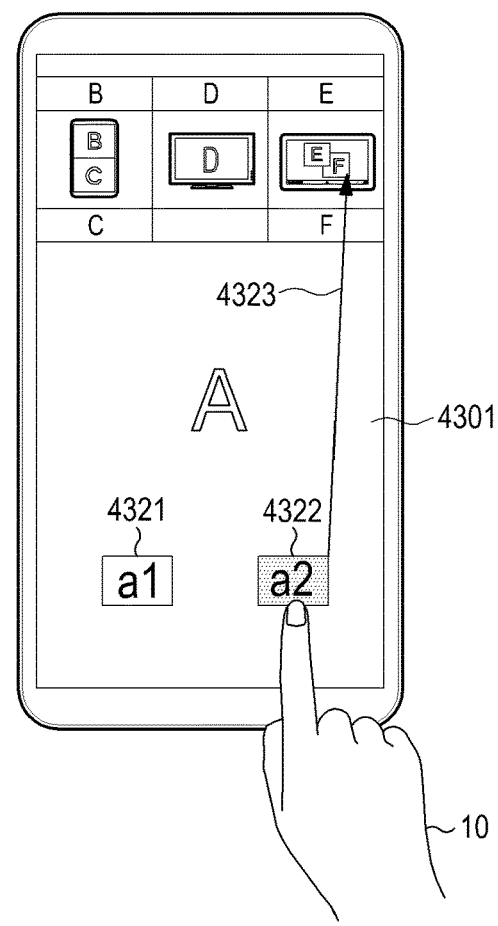

Referring to FIG. 43D, a first view 4321 and a second view 4322 may be displayed on the first window 4311 of the master display device 4301. The master display device 4301 may display a minimap for other connected devices. Thumbnails of the other devices may be displayed on the minimap. The user 10 may input a drag gesture 4323 from visualized data 4322 to one window of the minimap, for example, the window corresponding to the sixth application G.

Figure 43E:
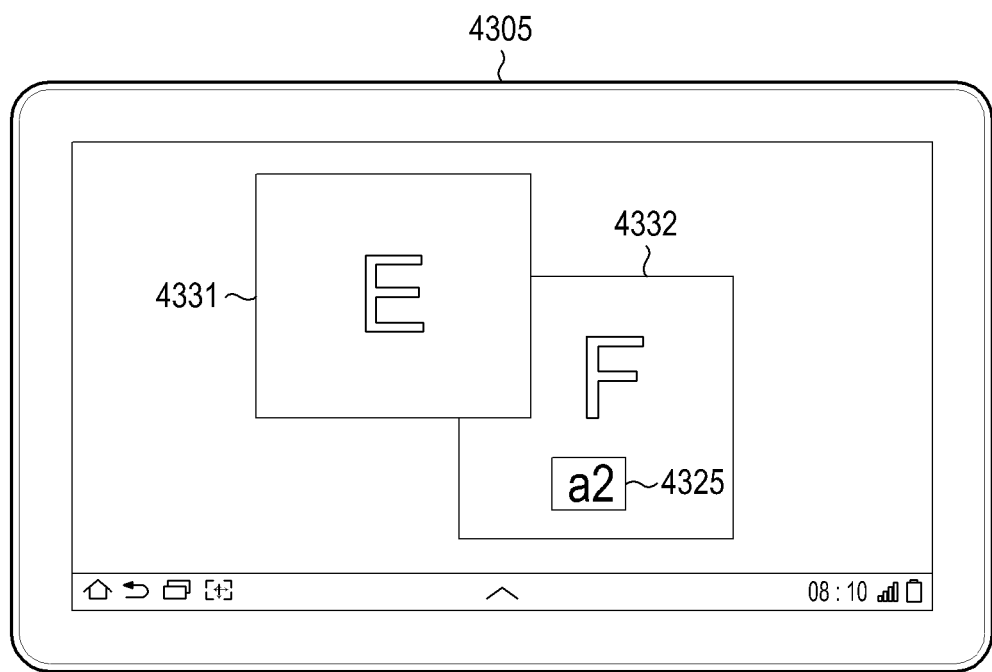

The controller 110 of the master display device 4301 may recognize the drag gesture 4323 as a data sharing command, and accordingly control to transmit data of the second view 4322 to the tablet PC 4305. The controller 110 controls to transmit an execution command of allowing the tablet PC 4305 to execute the second view 4332 by the sixth application F. The tablet PC 4305 receives the data, and displays the second view 4325 on the sixth window 4332 as illustrated in FIG. 43E. Further, the tablet PC 4305 displays the sixth window 4332 and the fifth window 4331 such that the sixth window 4332 covers the fifth window 4331.

As described above, based on the cloud system and the application execution space, the effect of easily making data transmission/reception between the display device and other devices connected with the display device can be created.

It may be appreciated that the various embodiments of the present disclosure can be implemented in software, hardware, or a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. Also, it will be appreciated that the various embodiments of the present disclosure may be implemented by a computer or a portable terminal which includes a control unit and a memory, in which the memory may be an example of a storage medium that is readable by a machine that is suitable for storing one or more programs that include instructions for implementing the various embodiments of the present disclosure. Accordingly, the present disclosure includes a program for a code implementing the apparatus and method described in the appended claims of the specification and a machine (a computer or the like)-readable storage medium for storing the program.

Further, the device can receive the program from a program providing apparatus connected to the device wirelessly or through a wire and store the received program. The program supply apparatus may include a program that includes instructions to execute the various embodiments of the present disclosure, a memory that stores information or the like required for the various embodiments of the present disclosure, a communication unit that conducts wired or wireless communication with the electronic apparatus, and a control unit that transmits a corresponding program to a transmission/reception apparatus in response to the request from the electronic apparatus or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A portable electronic device, comprising:
a touchscreen display including a display area, and
at least one processor configured to:
  display, on the touchscreen display, a first execution screen of a first application, wherein the first execution screen substantially occupies an entirety of the display area, and wherein the first execution screen includes a plurality of objects related to a plurality of uniform resource locator (URL) addresses respectively,
  identify, on the touchscreen display, a first touch input with respect to a first object among the plurality of objects, wherein the first touch input includes a moving input with respect to the first object,
  in response to the first touch input, display, on the touchscreen display, a second object corresponding to the first object on the first execution screen, wherein the second object is displayed at a position on the first execution screen corresponding to a position of the first touch input while the first touch input is maintained on the touchscreen display,
  while the first touch input is maintained on the touchscreen display, identify a second touch input on the touchscreen display,
  based on a movement of the second touch input, display a part of the first execution screen and a part of a second execution screen of a second application, wherein the part of the first execution screen and the part of the second execution screen substantially occupy the entirety of the display area,
  after displaying the part of the first execution screen and the part of the second execution screen in the display area, display the second execution screen on the touchscreen display, wherein the second execution screen substantially occupies the entirety of the display area, and wherein the second object is displayed at a position on the second execution screen corresponding to the position of the first touch input while the first touch input is maintained on the touchscreen display, and
  when the first touch input is released while the second execution screen is displayed on the touchscreen display, input a first URL related to the first object to the second execution screen.

2. The portable electronic device of claim 1, wherein the first touch input includes at least one of a drag gesture or a touch gesture.

3. The portable electronic device of claim 1, wherein the second touch input includes an edge flick gesture.

4. The portable electronic device of claim 1, wherein the second object includes a thumbnail image corresponding to the first object.

5. The portable electronic device of claim 1, wherein the second application is an application executed prior to the first application.

6. The portable electronic device of claim 1,
- wherein a direction of the second touch input is a right direction, and
- wherein displaying the part of the first execution screen and the part of the second execution screen includes displaying a left part of the first execution screen and right part of the second execution screen together.

7. The portable electronic device of claim 1, wherein the first execution screen and the second execution screen are displayed not to overlap each other.

8. A method for controlling a portable electronic device, the method comprising:
- displaying, on a touchscreen display of the portable electronic device, a first execution screen of a first application, wherein the first execution screen substantially occupies an entirety of a display area, and wherein the first execution screen includes a plurality of objects corresponding to a plurality of uniform resource locator (URL) addresses respectively,
- identifying, on the touchscreen display, a first touch input with respect to a first object among the plurality of objects, wherein the first touch input includes a moving input with respect to the first object,
- in response to the first touch input, displaying, on the touchscreen display, a second object corresponding to the first object on the first execution screen, wherein the second object is displayed at a position on the first execution screen corresponding to a position of the first touch input while the first touch input is maintained on the touchscreen display,
- while the first touch input is maintained on the touchscreen display, identifying a second touch input on the touchscreen display,
- based on a movement of the second touch input, displaying a part of the first execution screen and a part of a second execution screen of a second application, wherein the part of the first execution screen and the part of the second execution screen substantially occupy the entirety of the display area,
- after displaying the part of the first execution screen and the part of the second execution screen in the display area, displaying the second execution screen on the touchscreen display, wherein the second execution screen substantially occupies the entirety of the display area, and wherein the second object is displayed at a position on the second execution screen corresponding to the position of the first touch input while the first touch input is maintained on the touchscreen display, and
- when the first touch input is released while the second execution screen is displayed on the touchscreen display, inputting a first URL corresponding to the first object to the second execution screen.

9. The method of claim 8, wherein the first touch input includes at least one of a drag gesture or a touch gesture.

10. The method of claim 8, wherein the second touch input includes an edge flick gesture.

11. The method of claim 8, wherein the second object includes a thumbnail image corresponding to the first object.

12. The method of claim 8, wherein the second application is an application executed prior to the first application.

13. The method of claim 8,
- wherein a direction of the second touch input is a right direction, and
- wherein displaying the part of the first execution screen and the part of the second execution screen includes displaying a left part of the first execution screen and right part of the second execution screen together.

14. The method of claim 8, wherein the first execution screen and the second execution screen are displayed not to overlap each other.

\* \* \* \* \*